United States Patent [19]

Lalvani

[11] Patent Number: 5,623,790
[45] Date of Patent: *Apr. 29, 1997

[54] BUILDING SYSTEMS WITH NON-REGULAR POLYHEDRA BASED ON SUBDIVISIONS OF ZONOHEDRA

[76] Inventor: Haresh Lalvani, 164 Bank St., Apt. 2B, New York, N.Y. 10014

[*] Notice: The terminal 12 months of this patent has been disclaimed.

[21] Appl. No.: 232,867

[22] Filed: Apr. 25, 1994

Related U.S. Application Data

[63] Continuation of Ser. No. 740,504, Aug. 5, 1991, which is a continuation-in-part of Ser. No. 428,018, Oct. 26, 1989, Pat. No. 5,036,635, which is a continuation of Ser. No. 319,861, Mar. 6, 1989, which is a continuation of Ser. No. 88,308, Aug. 24, 1987.

[51] Int. Cl.$^6$ .................................................. F04H 1/00
[52] U.S. Cl. ...................... 52/81.2; 52/79.1; 52/80.1; 52/81.4; 52/81.5; 52/DIG. 10
[58] Field of Search ..................... 52/81.4, 81.1, 52/81.3, 81.5, DIG. 10, 79.1, 80.1

[56] References Cited

U.S. PATENT DOCUMENTS

| | | | |
|---|---|---|---|
| 3,646,718 | 3/1972 | McKenna | 52/81.1 |
| 3,663,346 | 5/1972 | Schoen | 52/80 |
| 3,663,347 | 5/1972 | Schoen | 52/80 |
| 3,931,697 | 1/1976 | Pearce | 52/80 |
| 3,970,301 | 7/1976 | Lehman | 52/81 |
| 3,974,600 | 8/1976 | Pearce | 52/81.4 |
| 4,133,152 | 1/1979 | Penrose | 52/105 |
| 4,492,723 | 1/1985 | Chadwick | 428/7 |
| 4,620,998 | 11/1986 | Lalvani | 428/33 |

OTHER PUBLICATIONS

The Hyper–Schwartz Surface by D. Brisson (1976) pp. 2,4,5,13,15,18,23,27,28,41,44,46,49,50,52,53 and front cover.

"Mathematical Models" by Martyn Candy et al., 1961, pp. 129–138.

"Order in Space" by Keith Critchlow, 6 Oct. 1972, pp. 32–39, 46–49, 56–57.

*Primary Examiner*—Carl D. Friedman
*Assistant Examiner*—Winnie Yip

[57] ABSTRACT

Nine different classes of polyhedral structures based on surface subdivisions of the infinite class of plane-faced zonohedra. The structures fit together periodically or non-periodically into a variety of orderly and irregular-looking space structures including polyhedra with plane or curved faces, single-, double-, multi-layered and multi-directional space-filling building systems, plane-faced and curved space labyrinths. The surfaces of curved faces could be continuously curved surfaces, or facetted polygonal surfaces or minimal surfaces. The curves surfaces could be flexible nets in tension used by themselves or in combination with space frames, or stiff shell-like surfaces, and the edges could be hinged or fixed to others. The plane faces could be panels or folded plates, and the straight edges could be converted into struts, and the vertices into nodes. Applications of the system include architectural and environmental structures, fixed or retractible space frames, decks or platforms, playground structures, honeycomb structures, educational kits or toys, tiles, saddle polyhedral nodes for space frames, and include constructions on earth or in outer space.

16 Claims, 29 Drawing Sheets

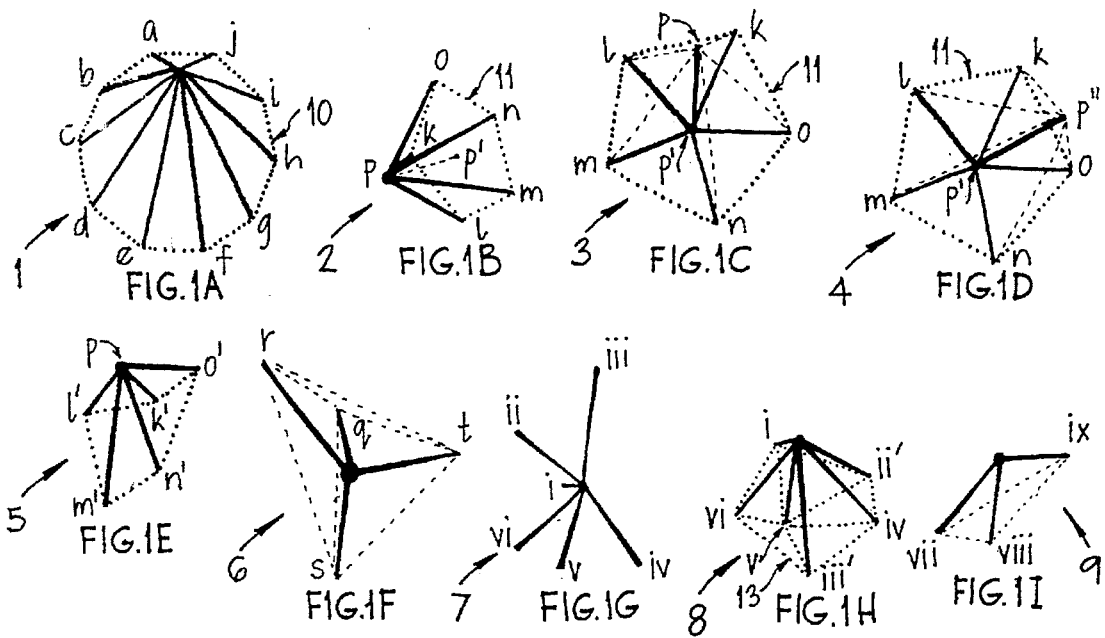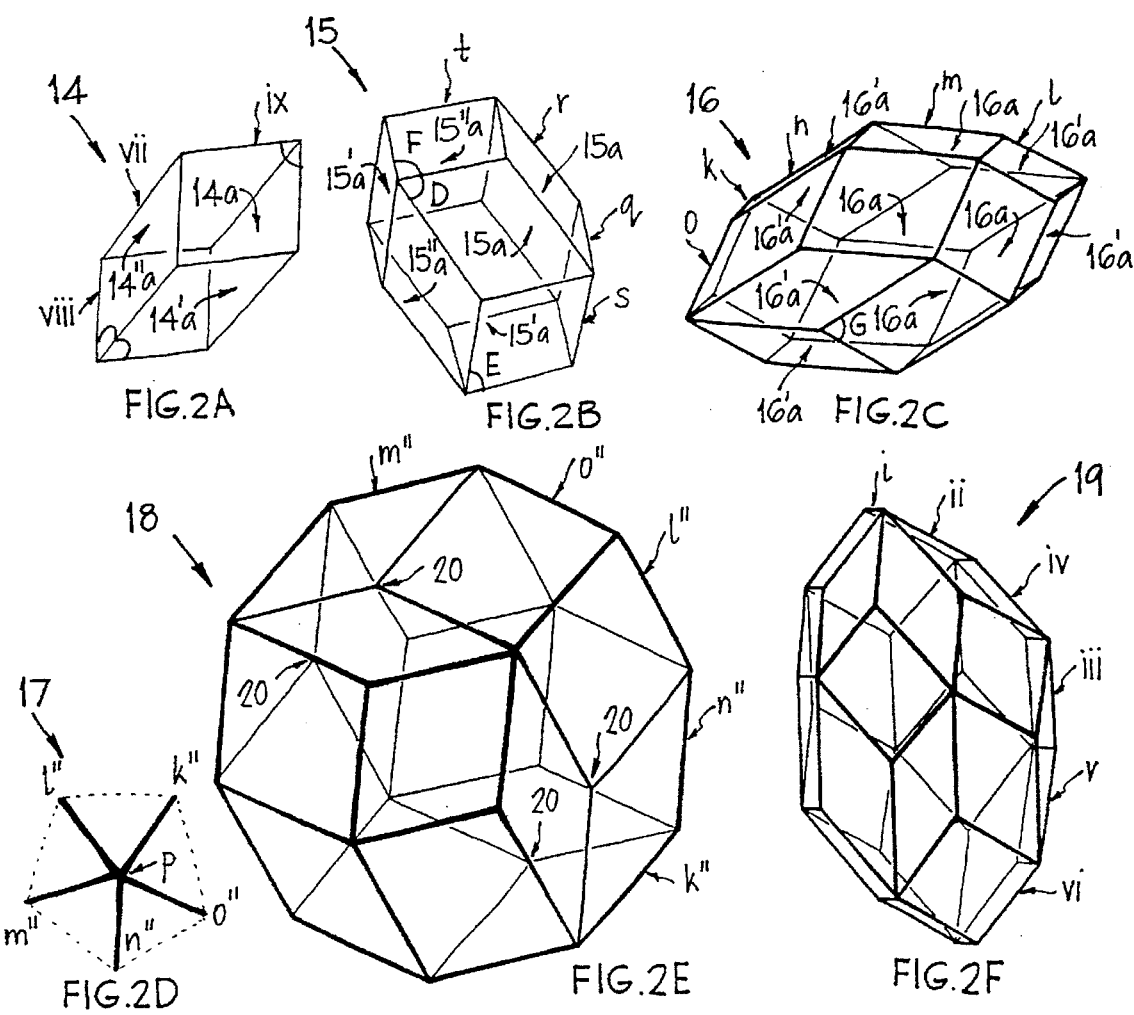

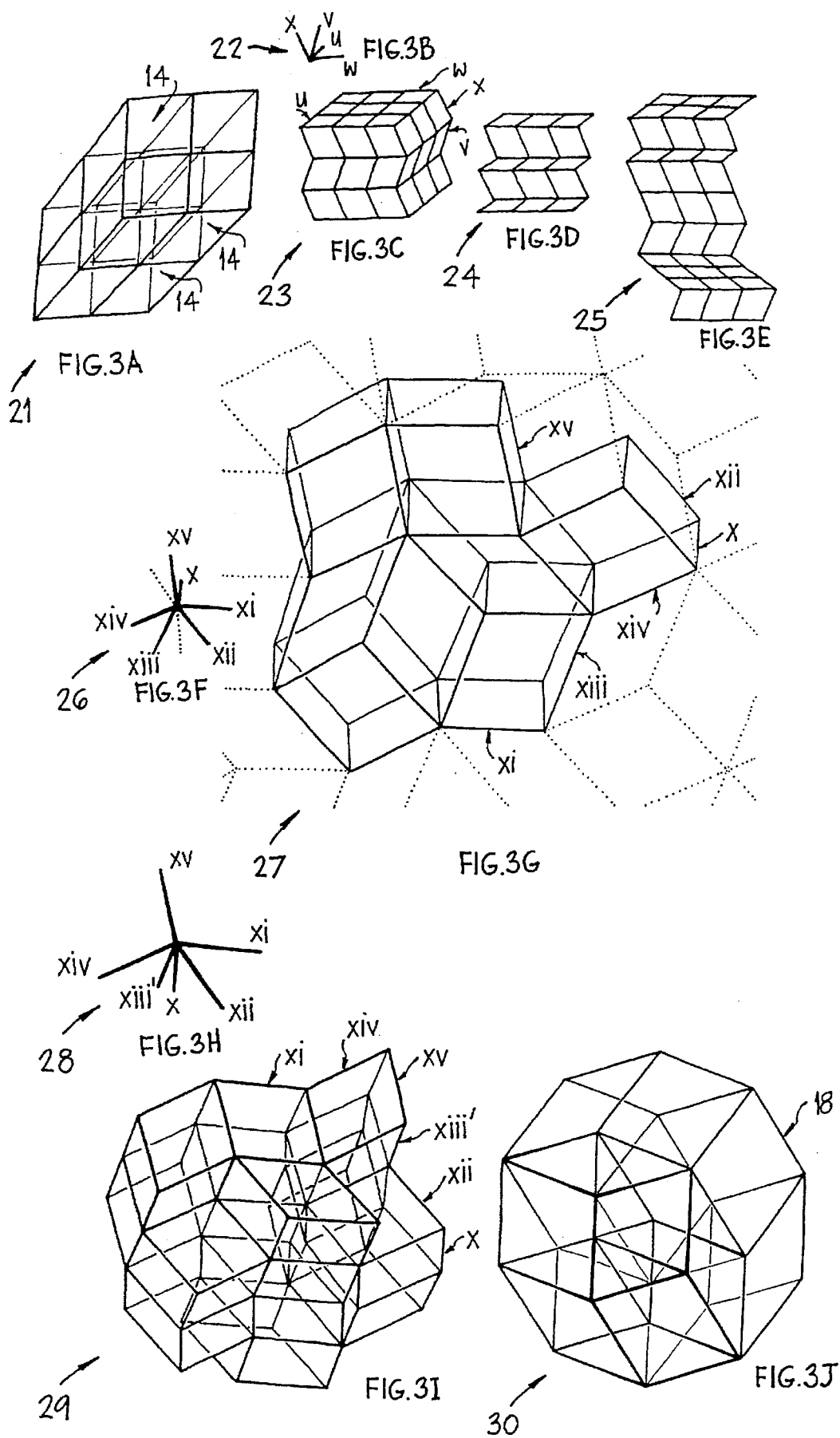

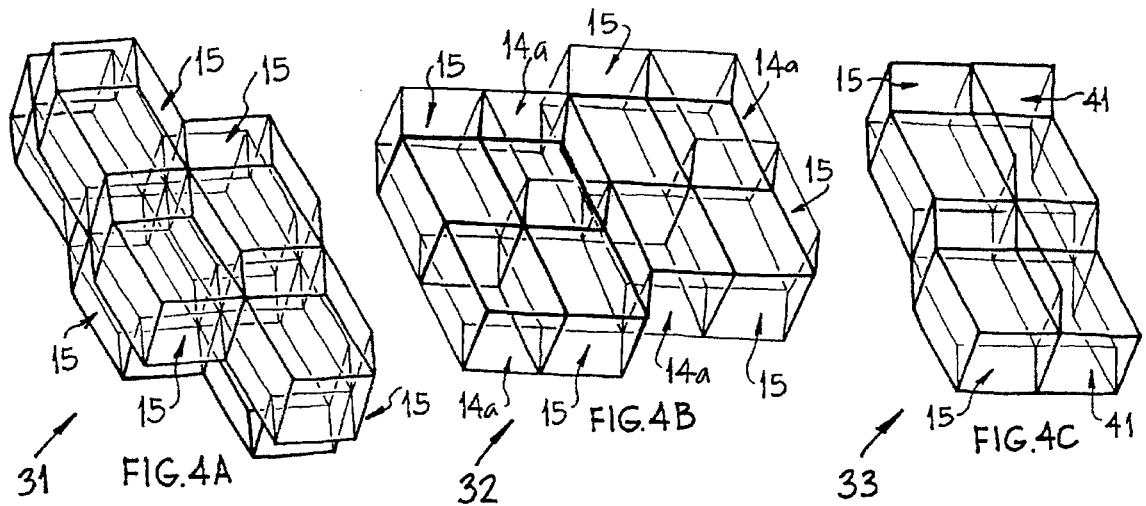
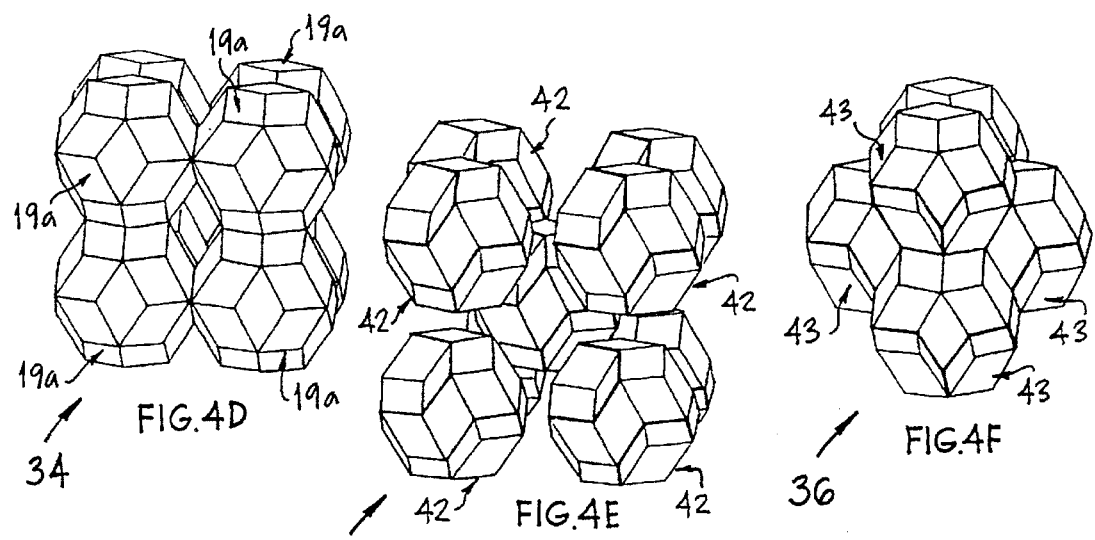
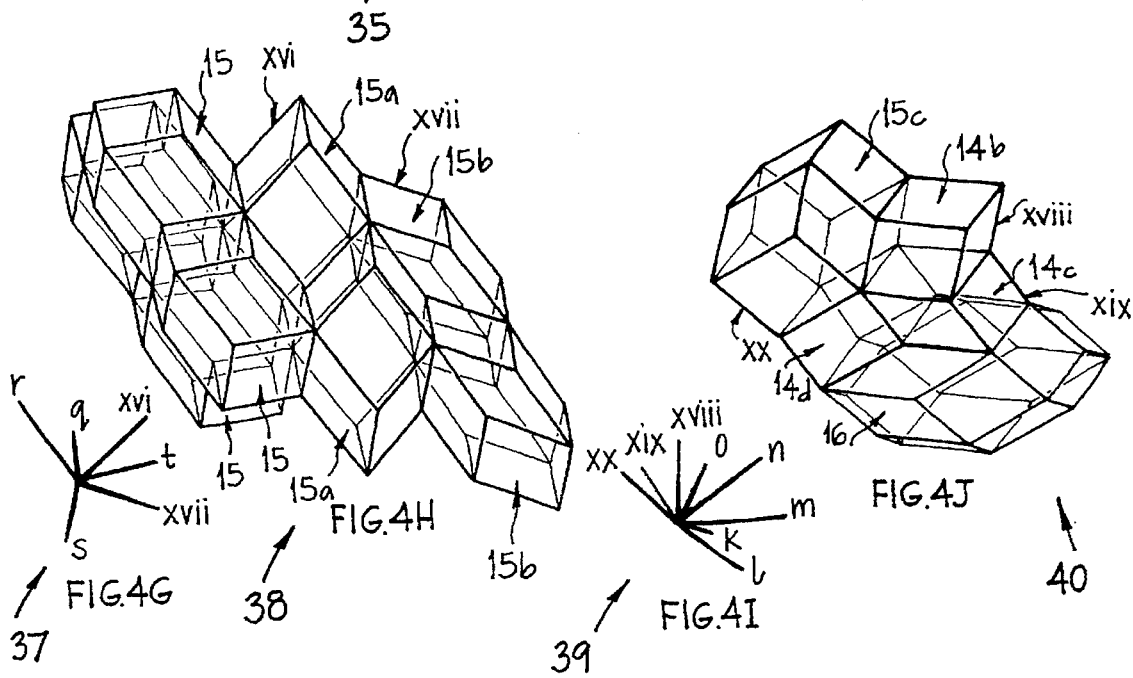

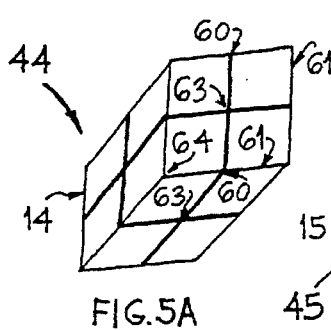
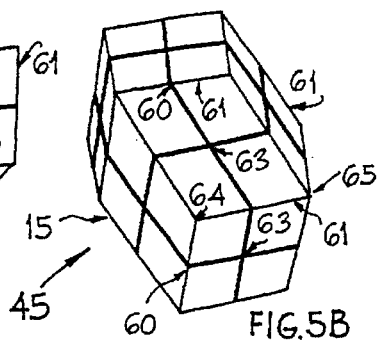
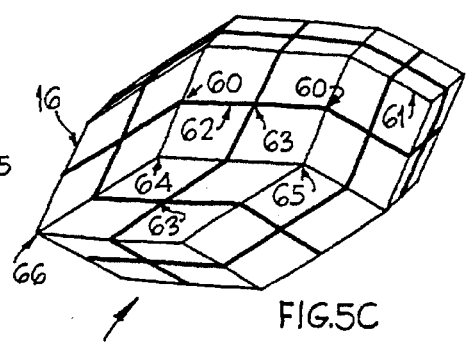
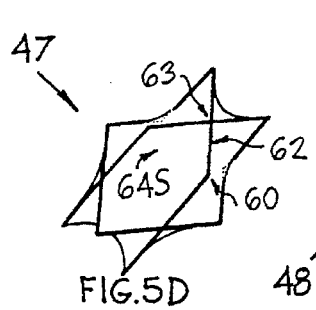
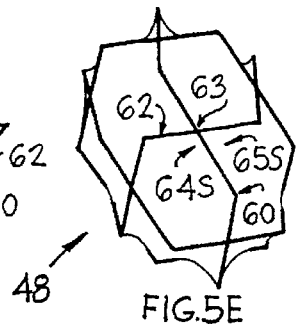
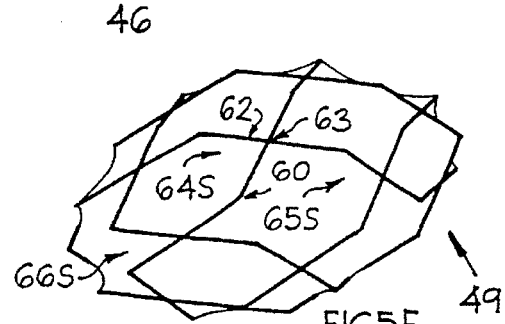
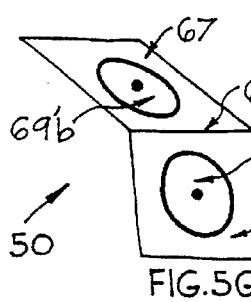
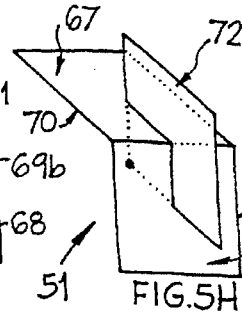
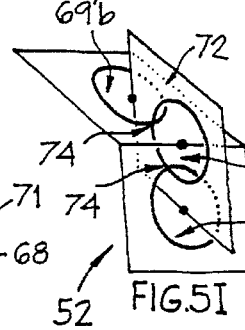
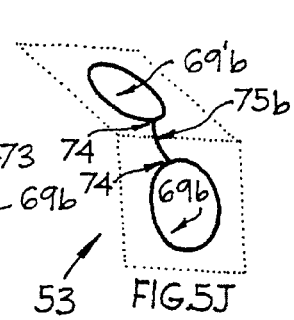
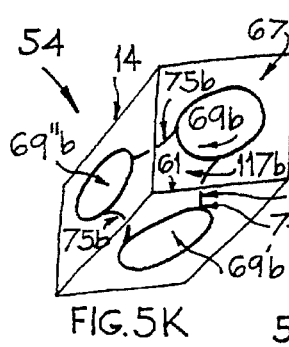
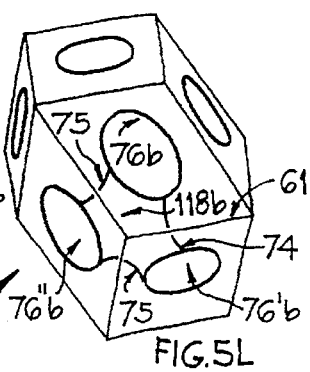
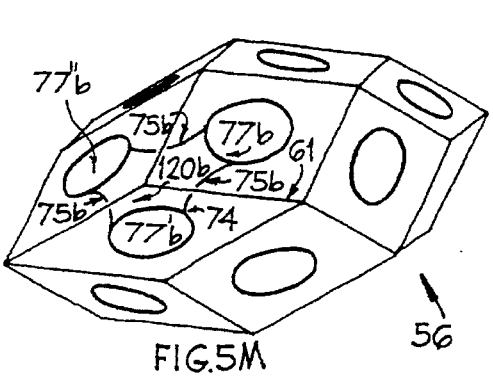
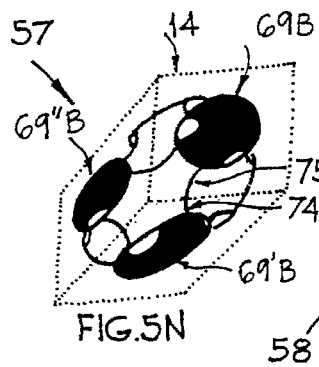
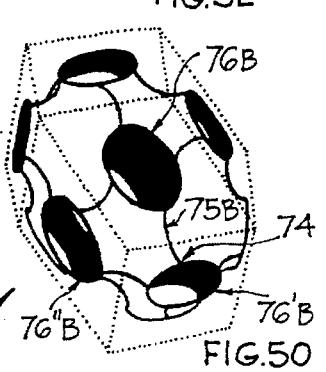
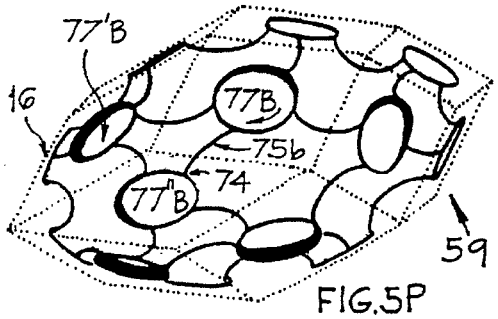

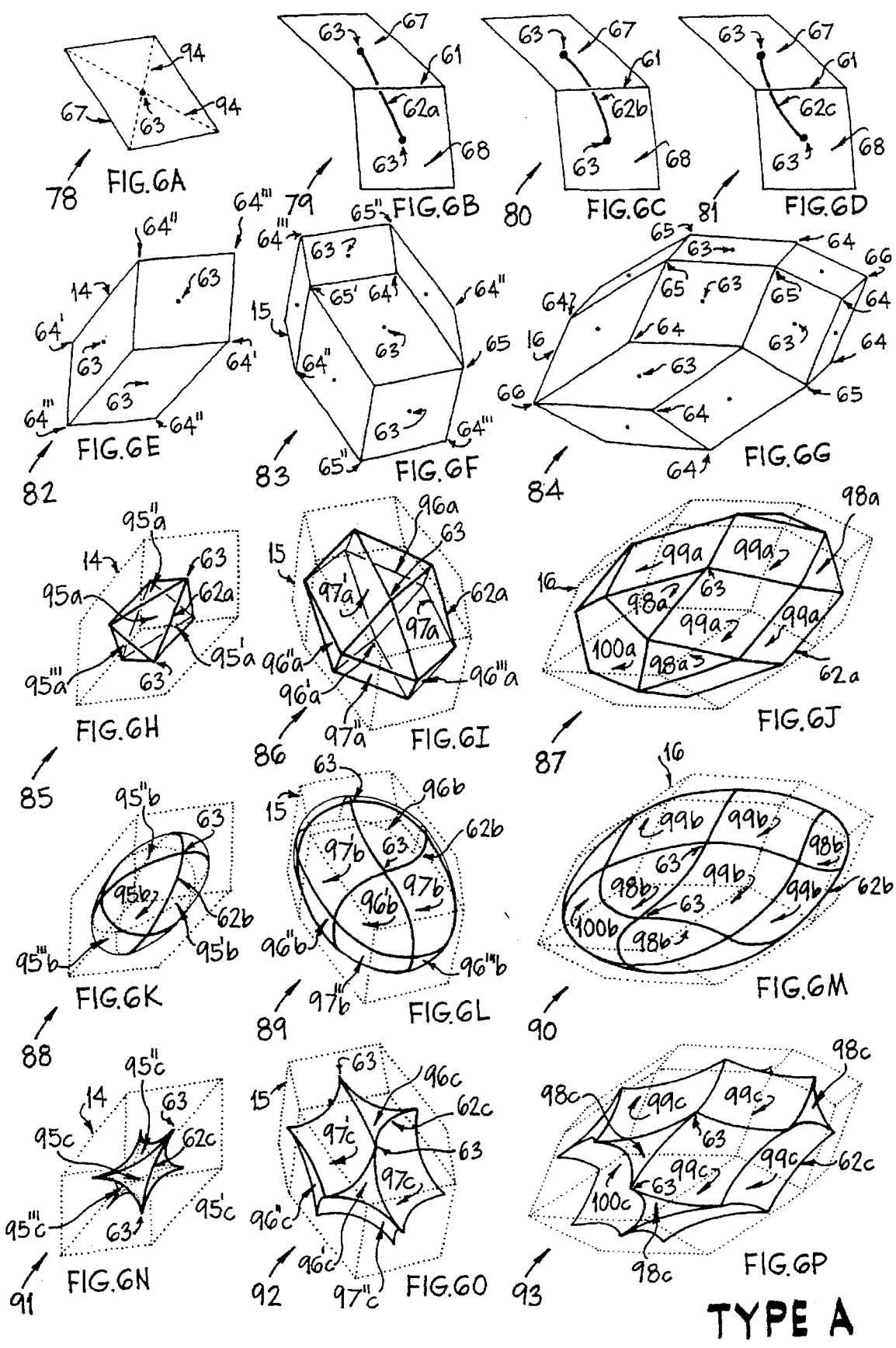

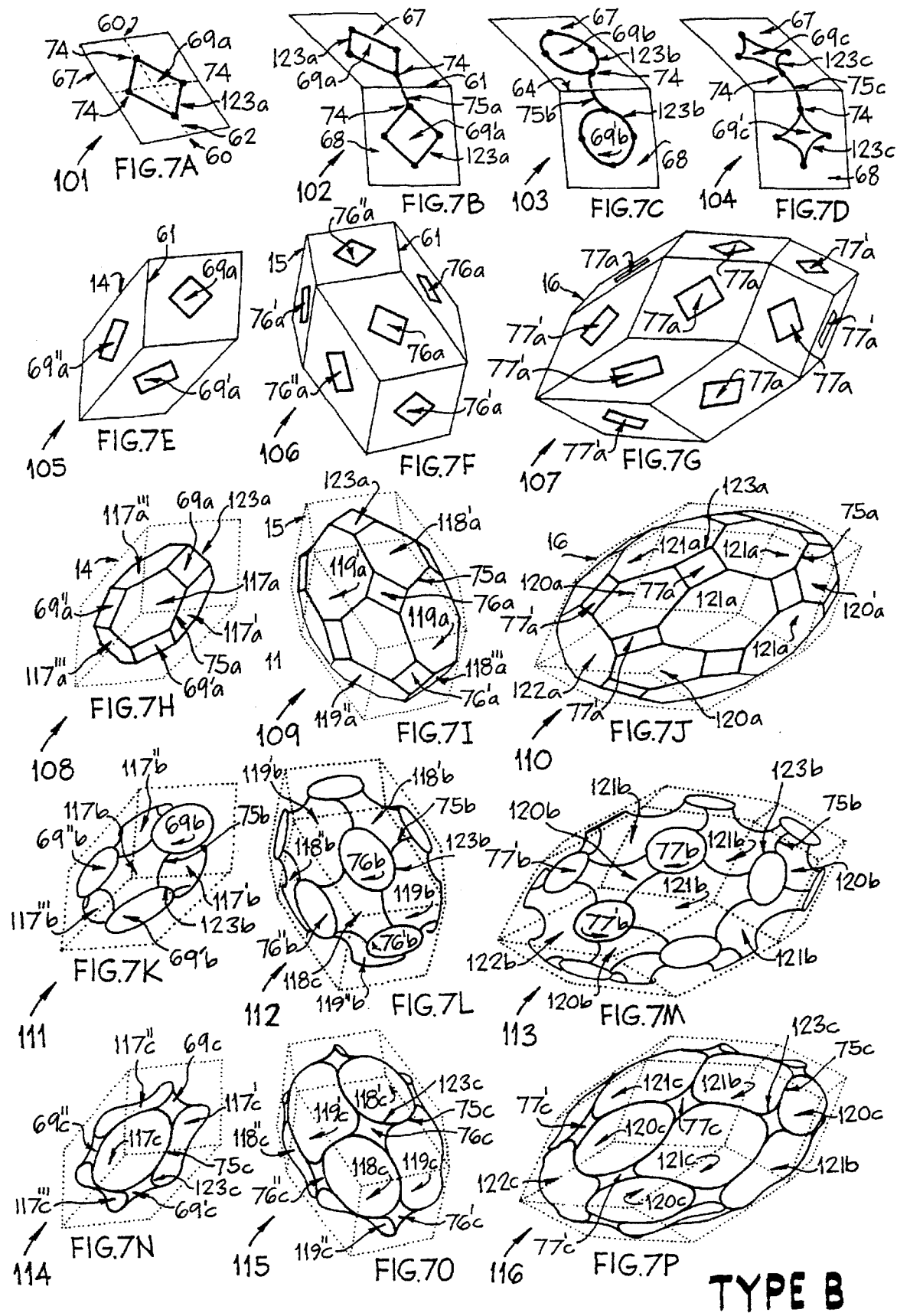

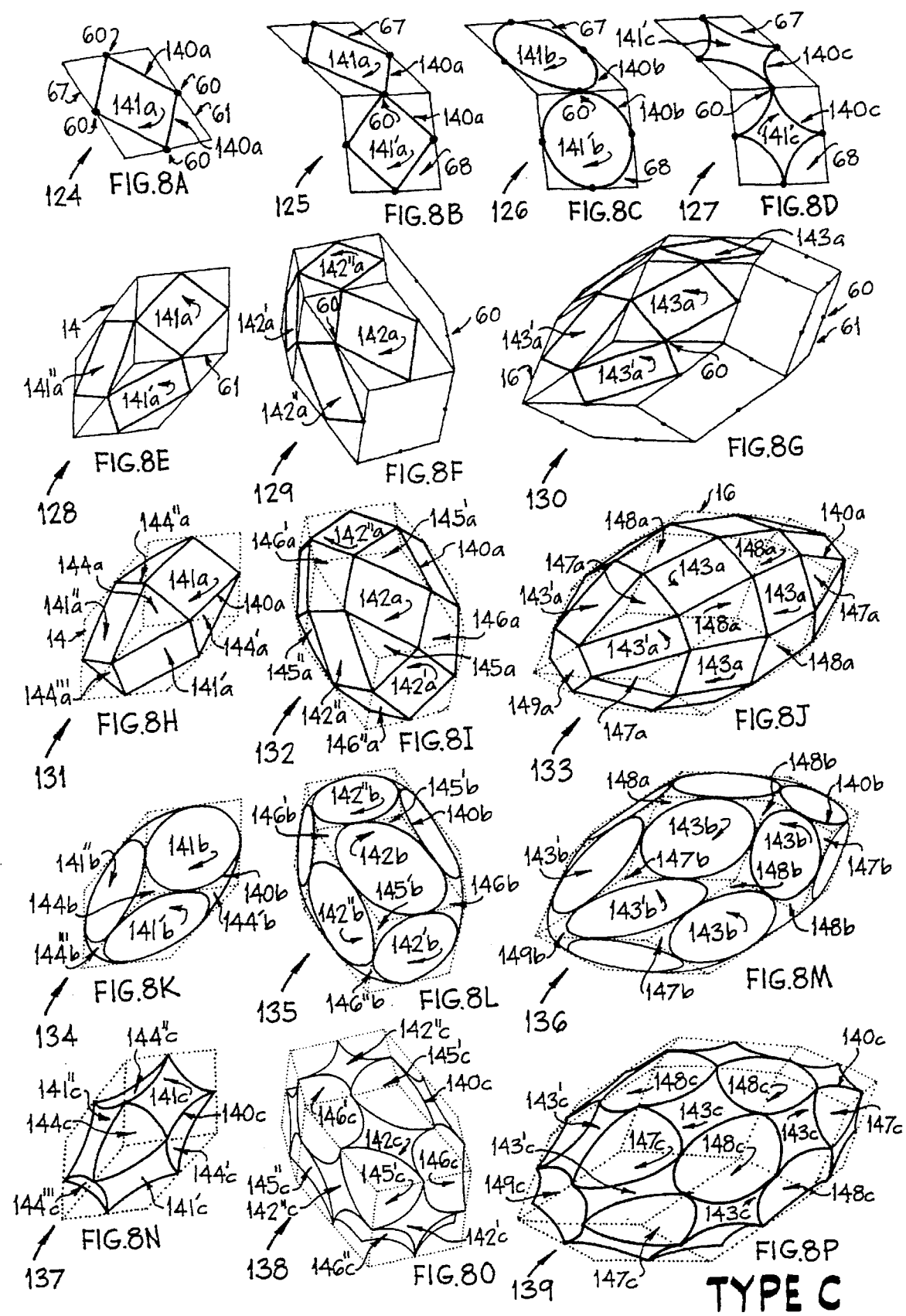

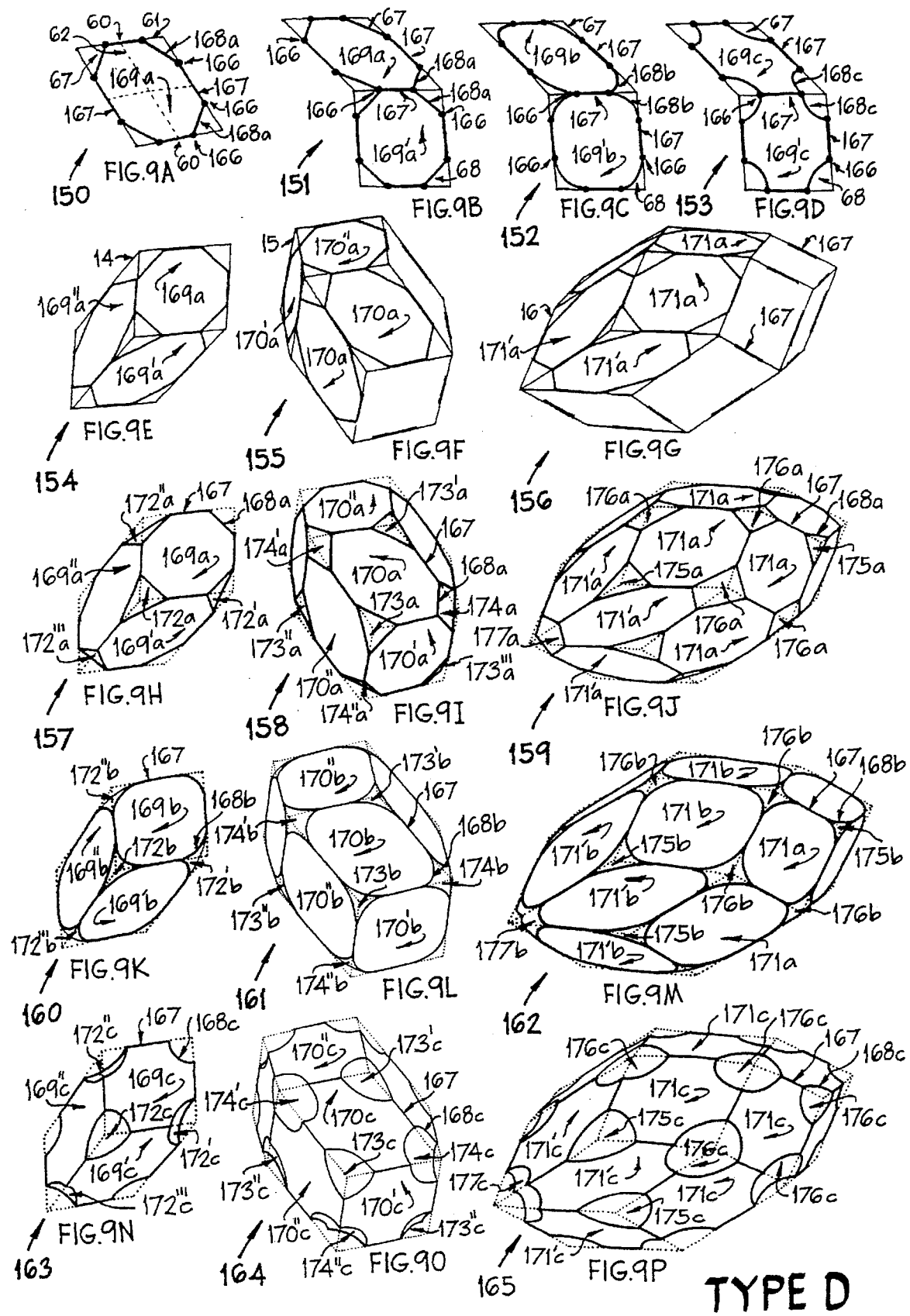

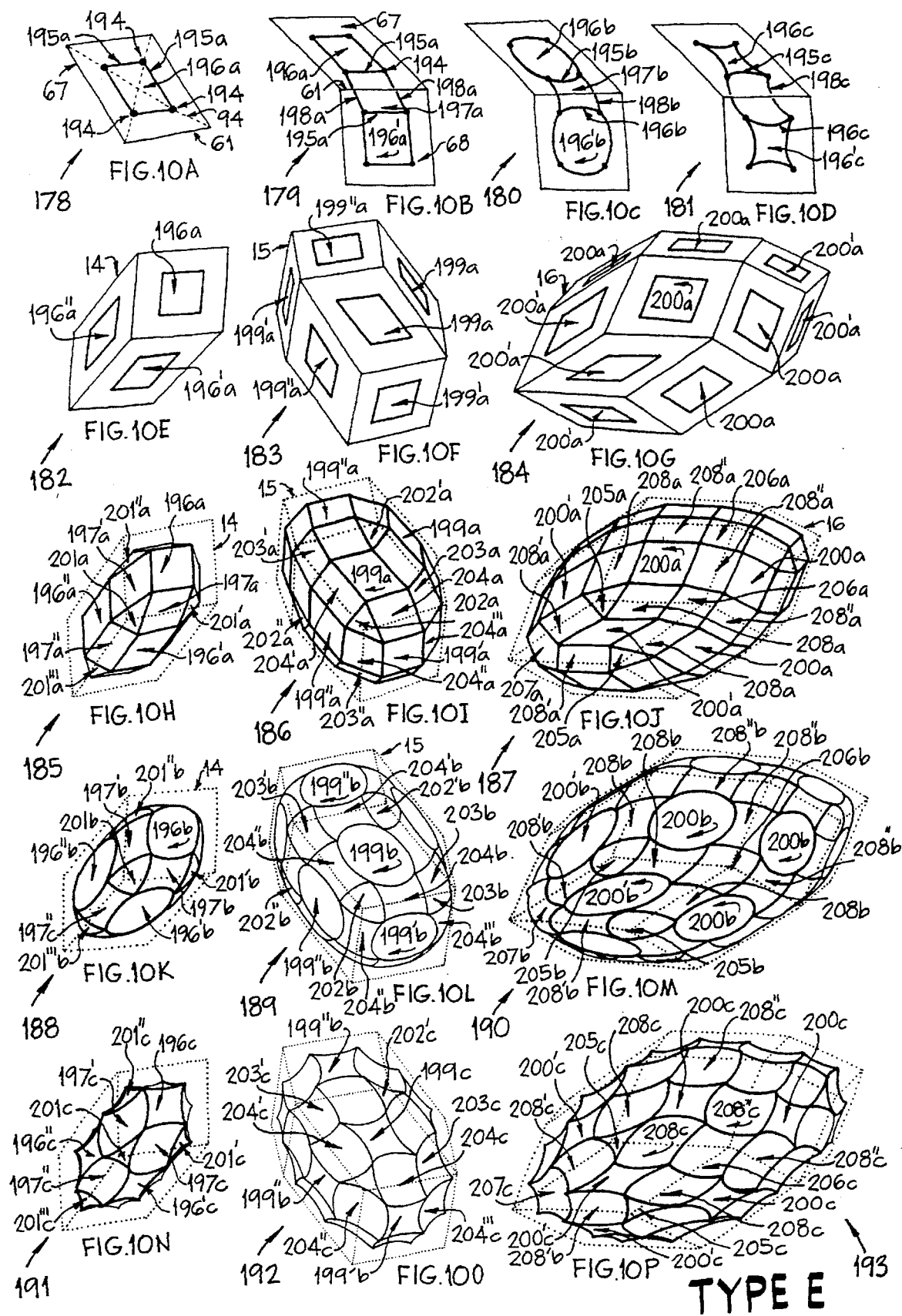

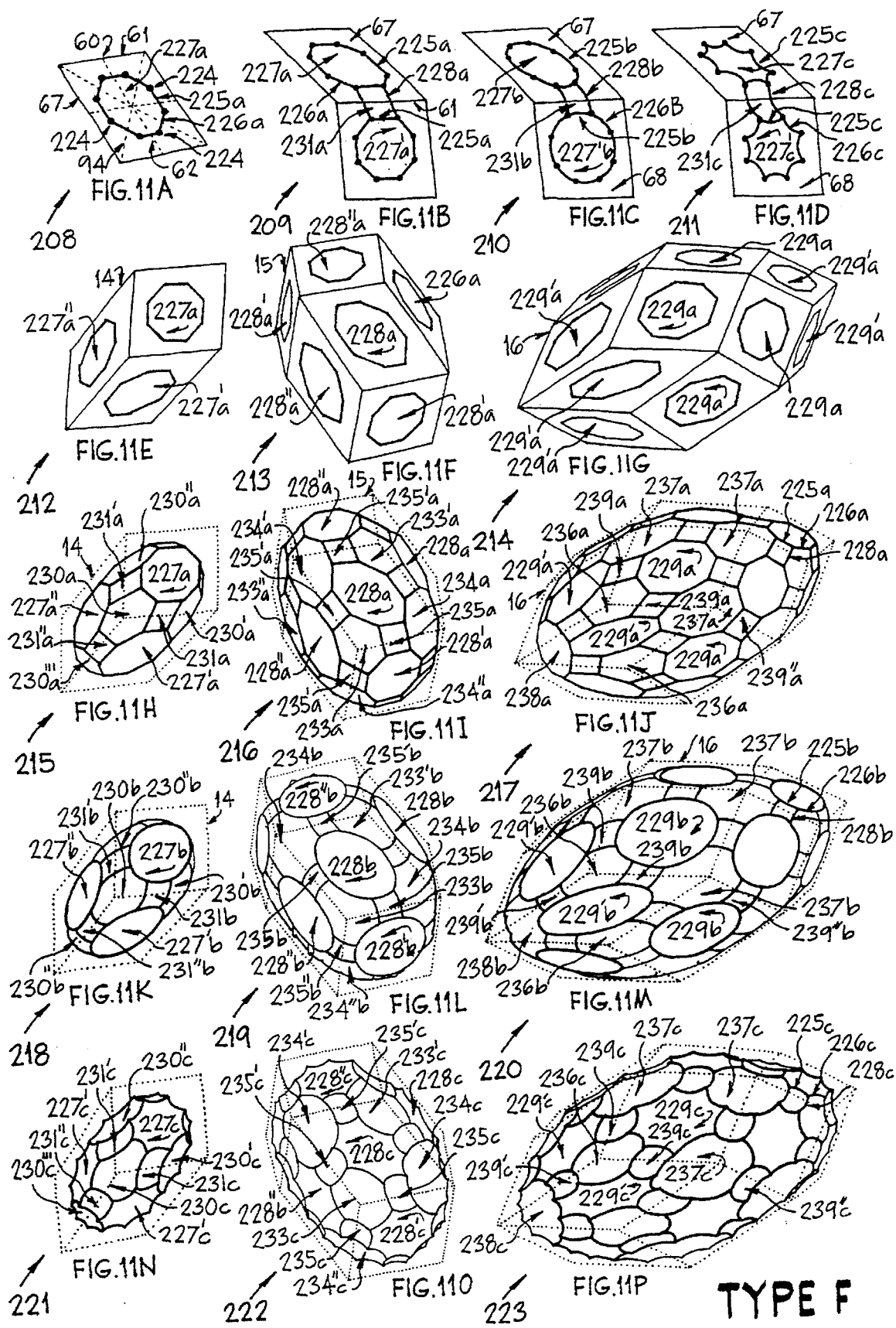

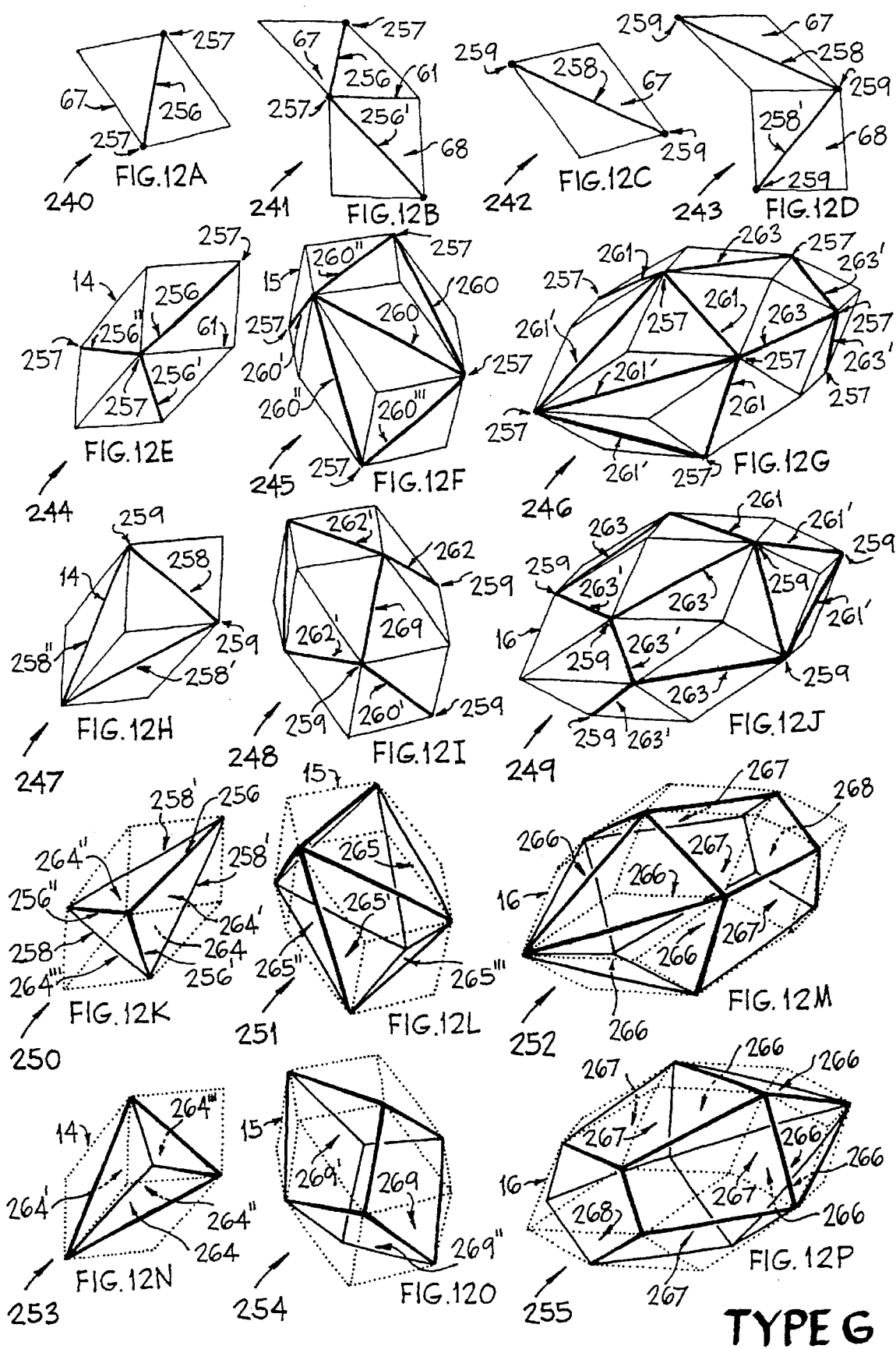
TYPE G

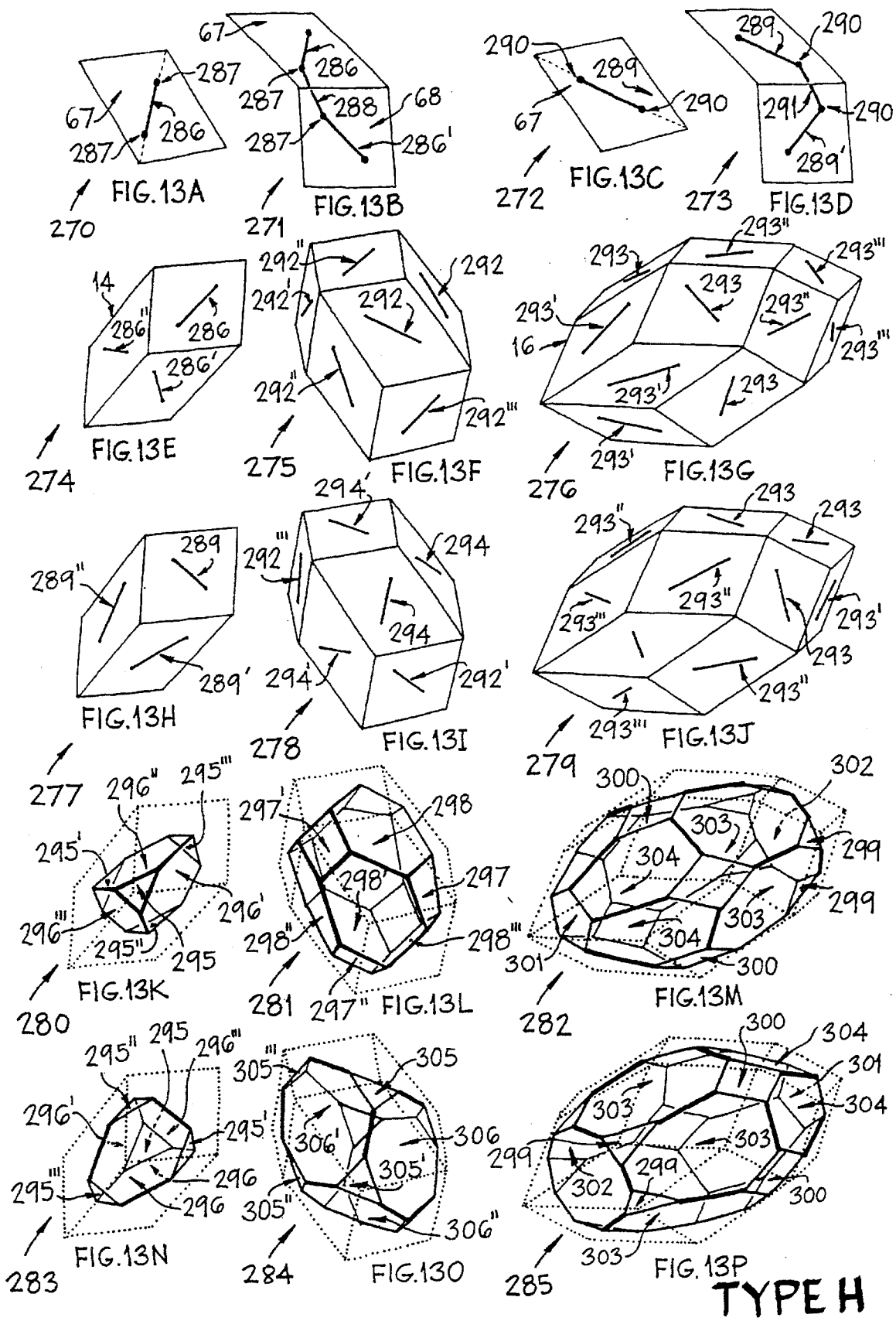
TYPE H

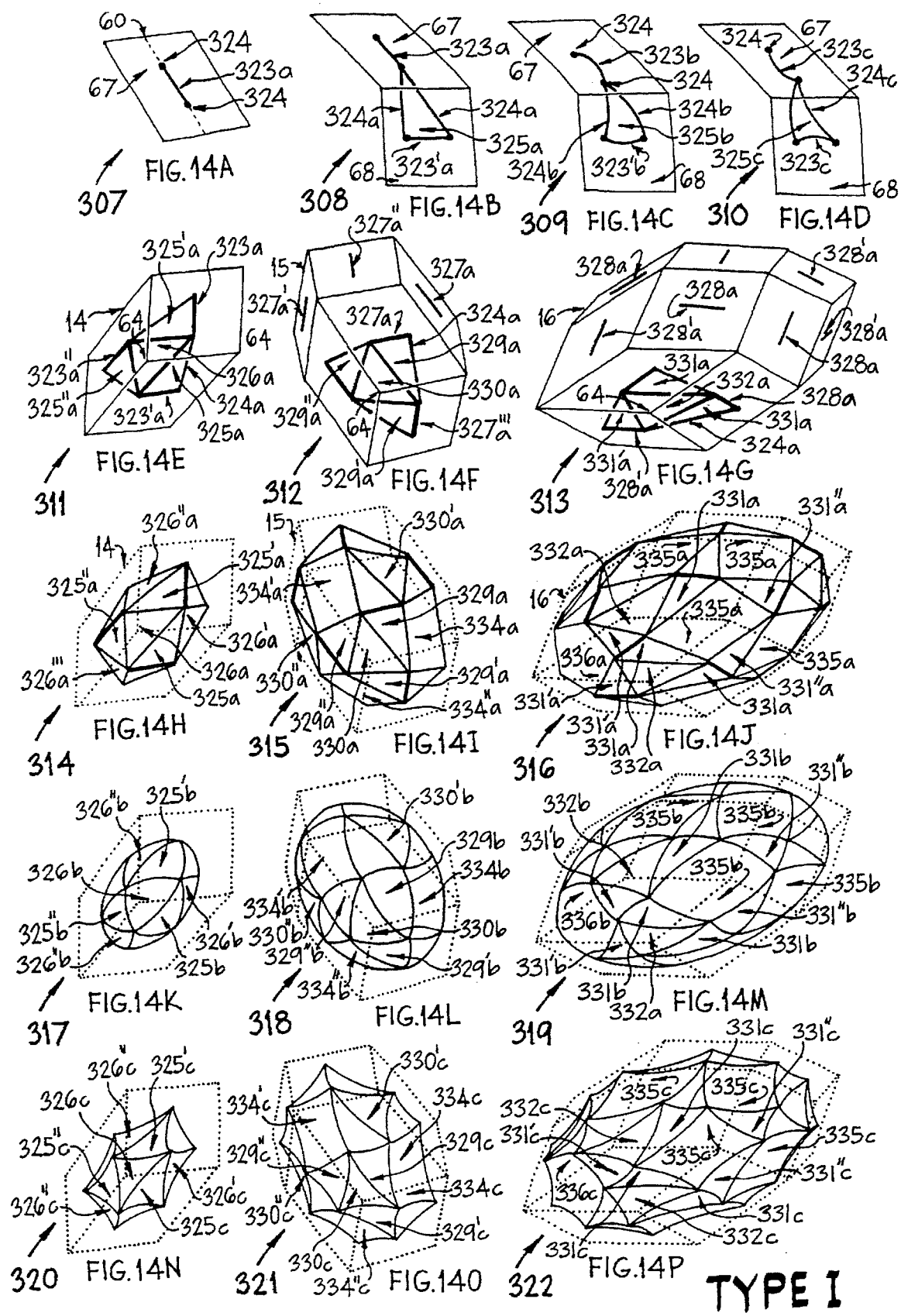

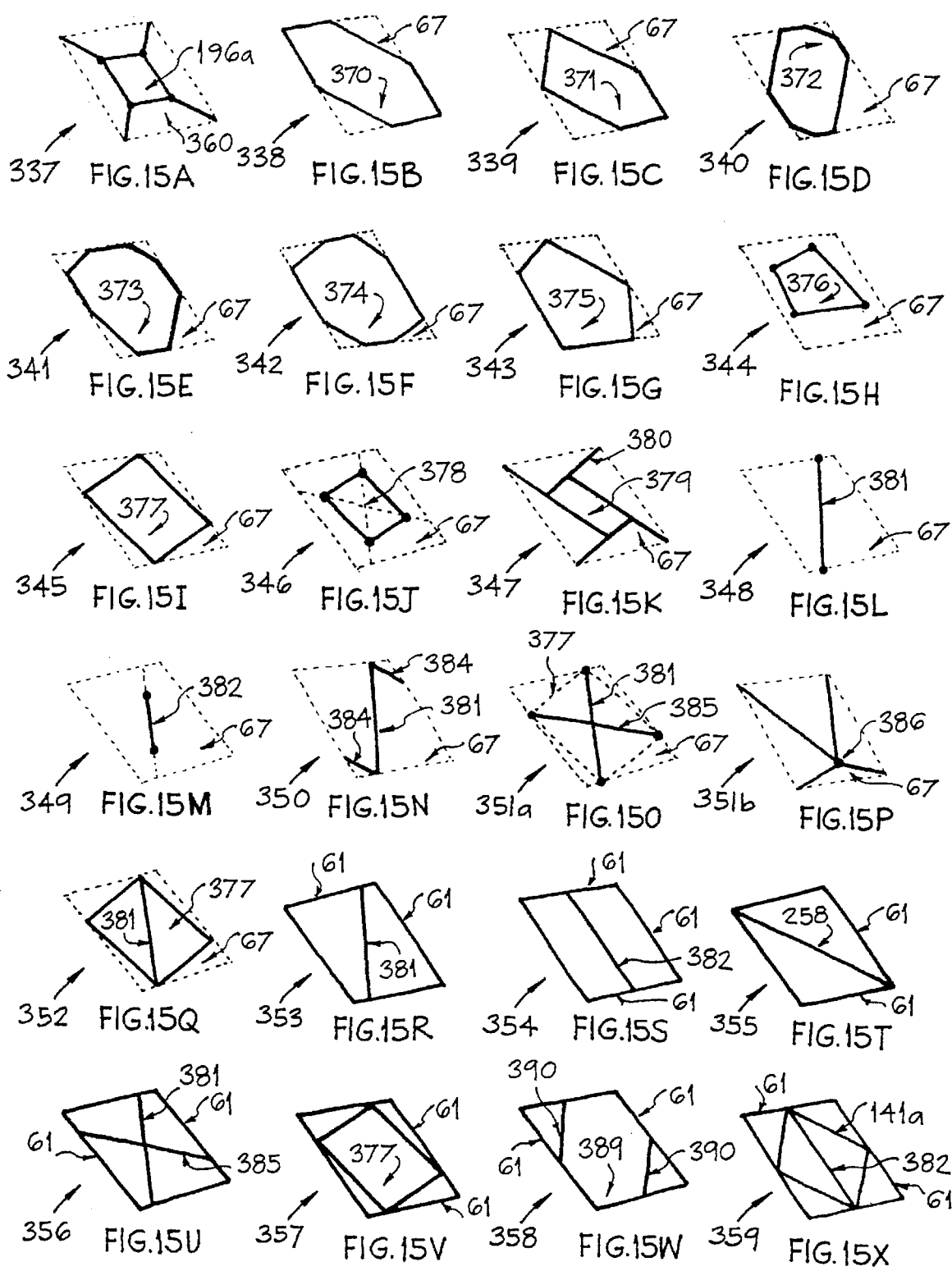

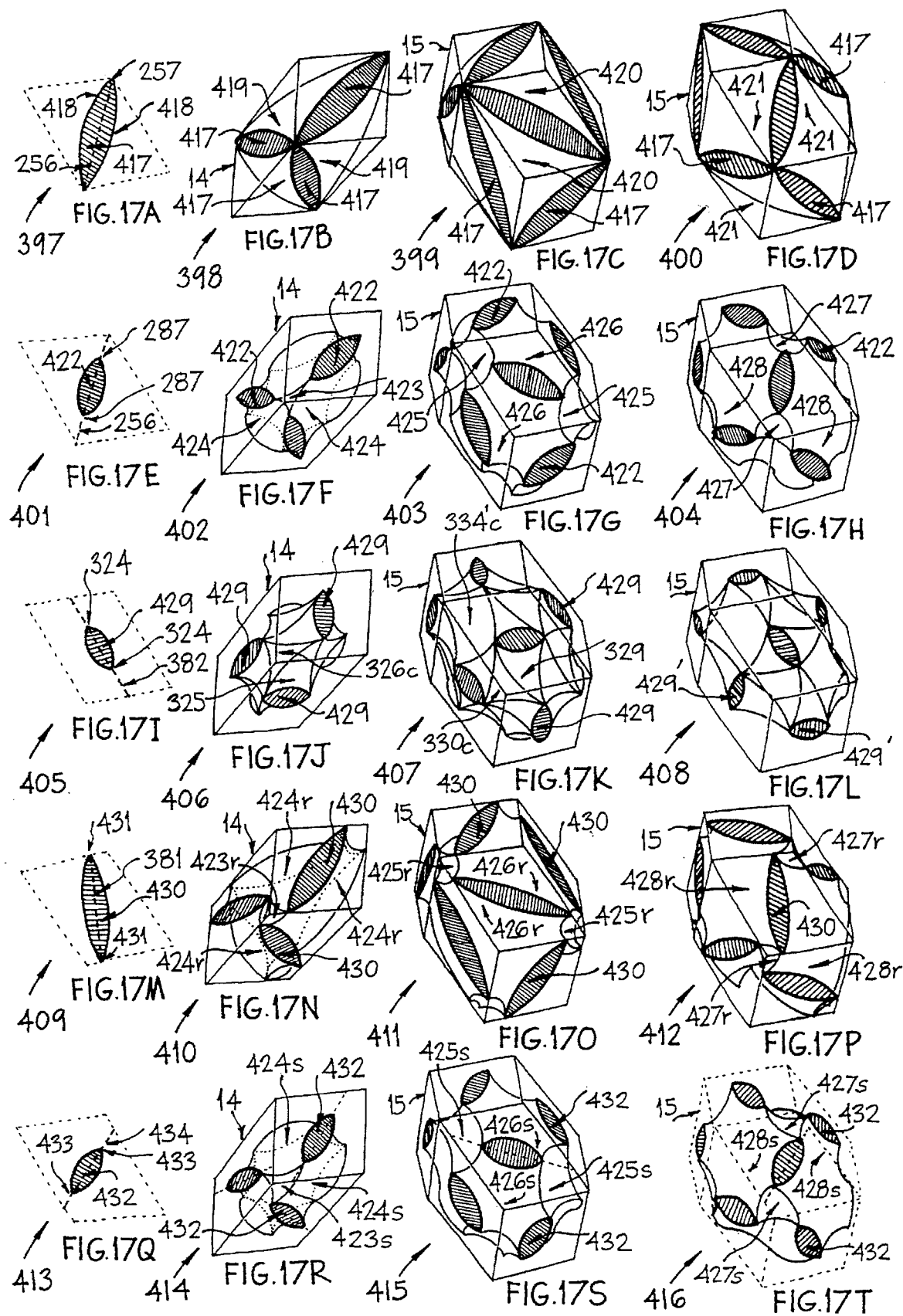

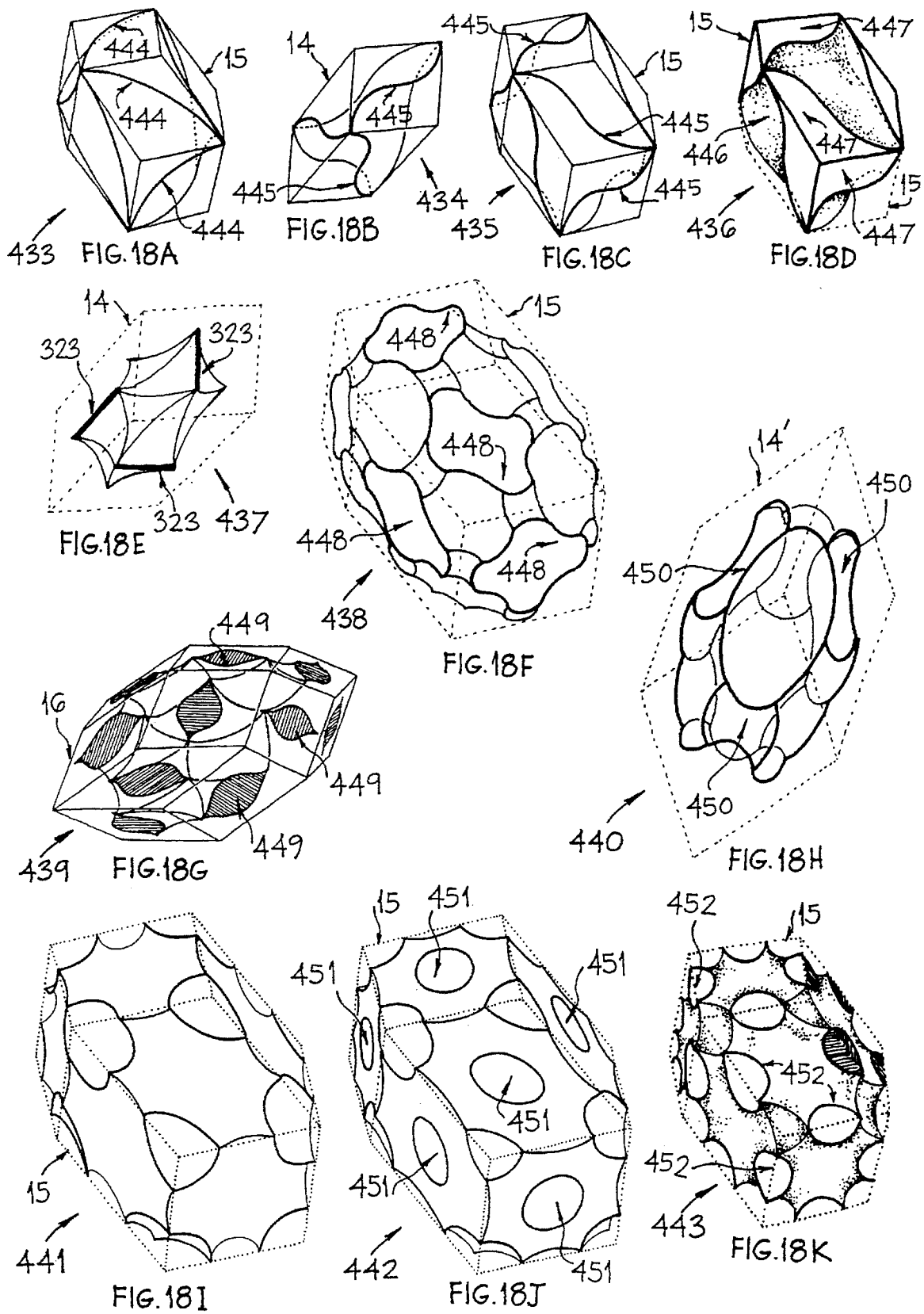

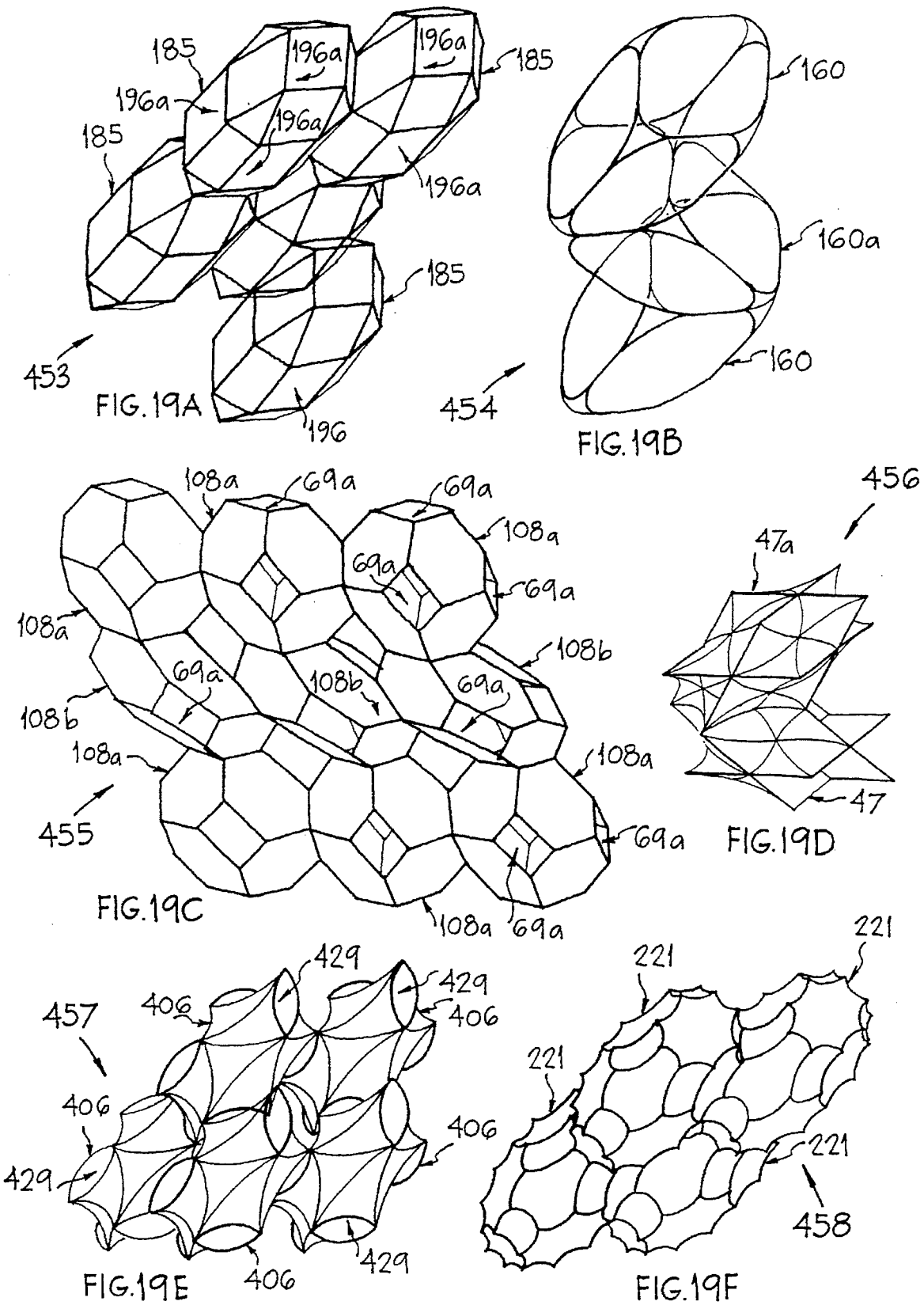

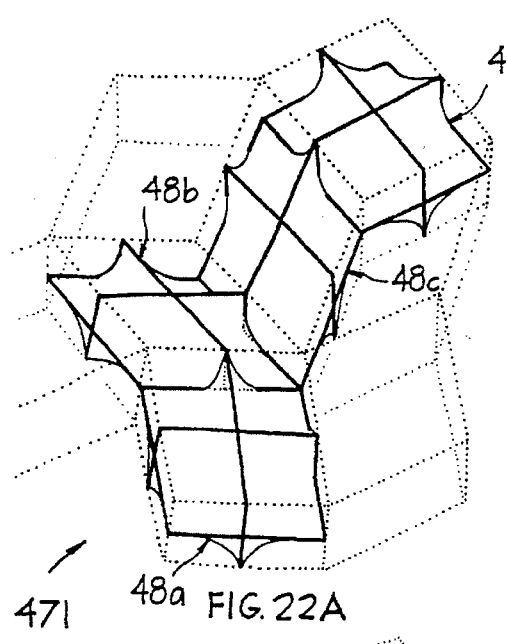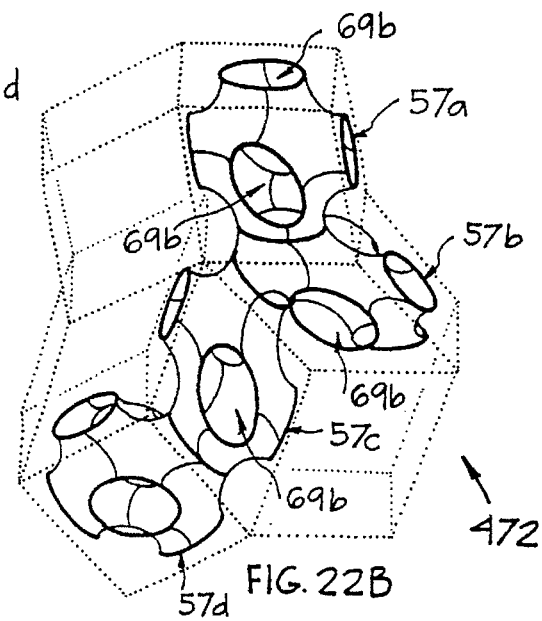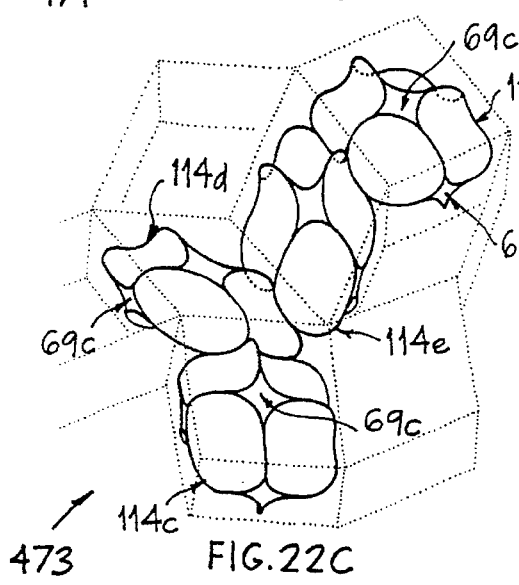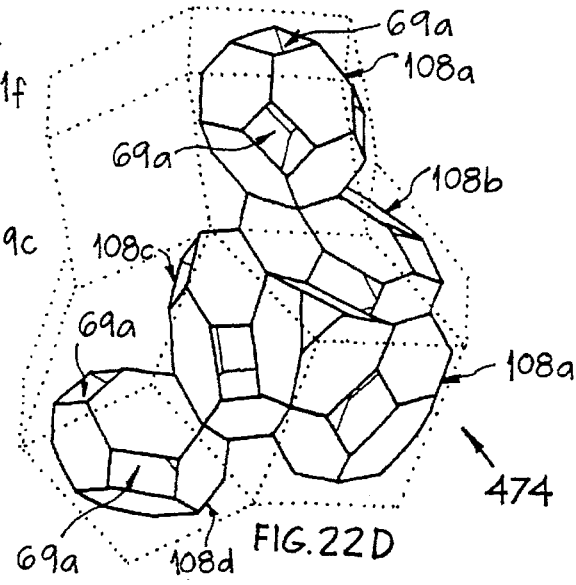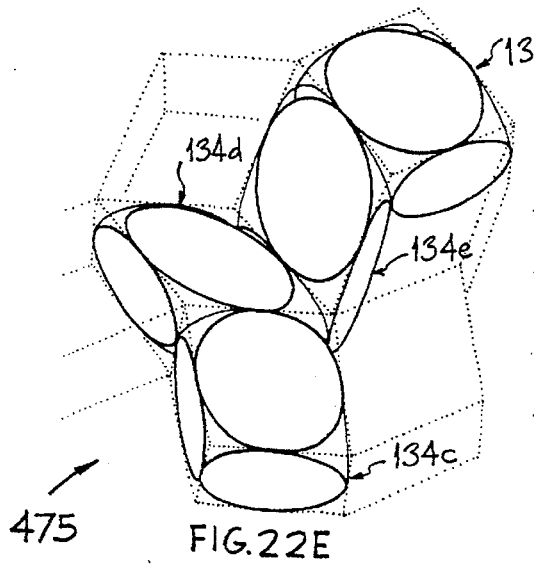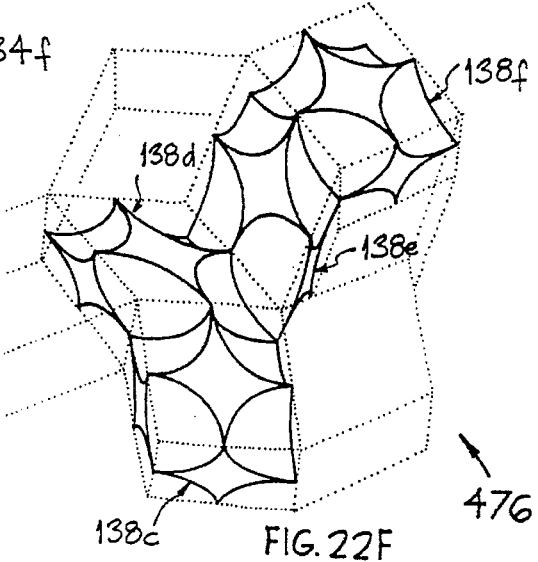

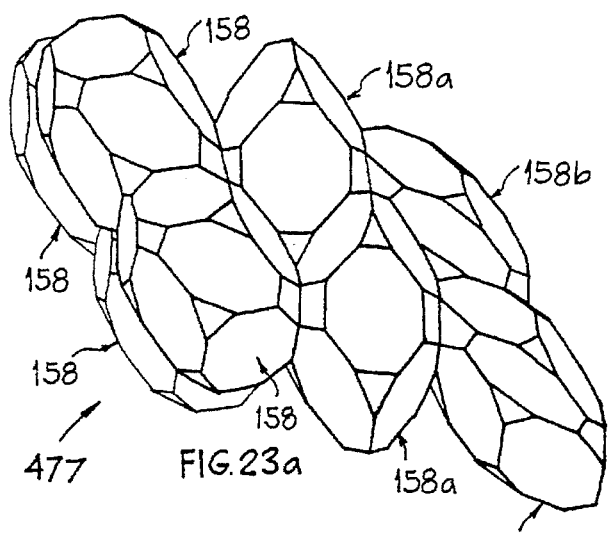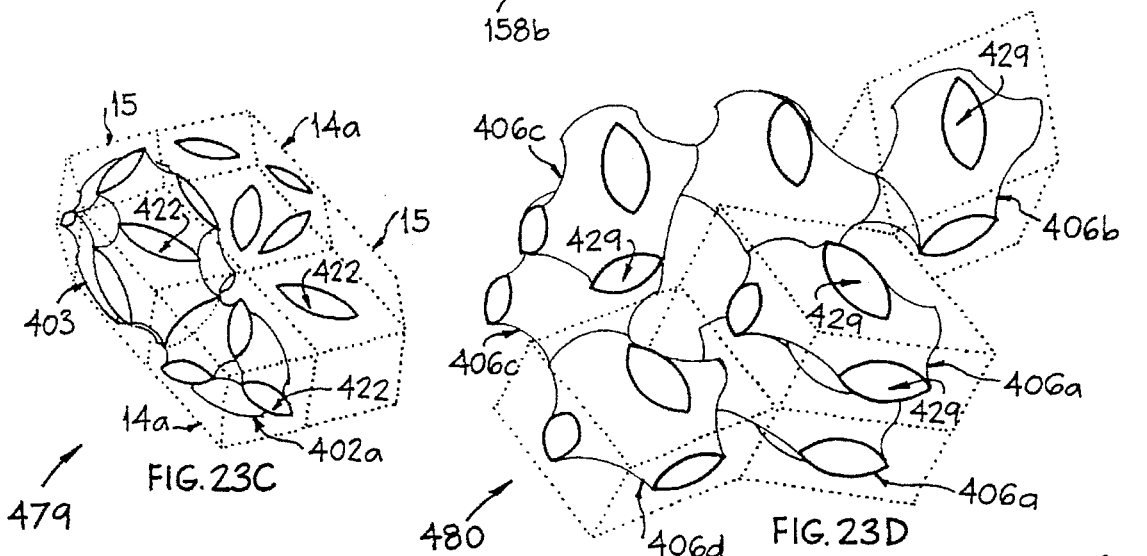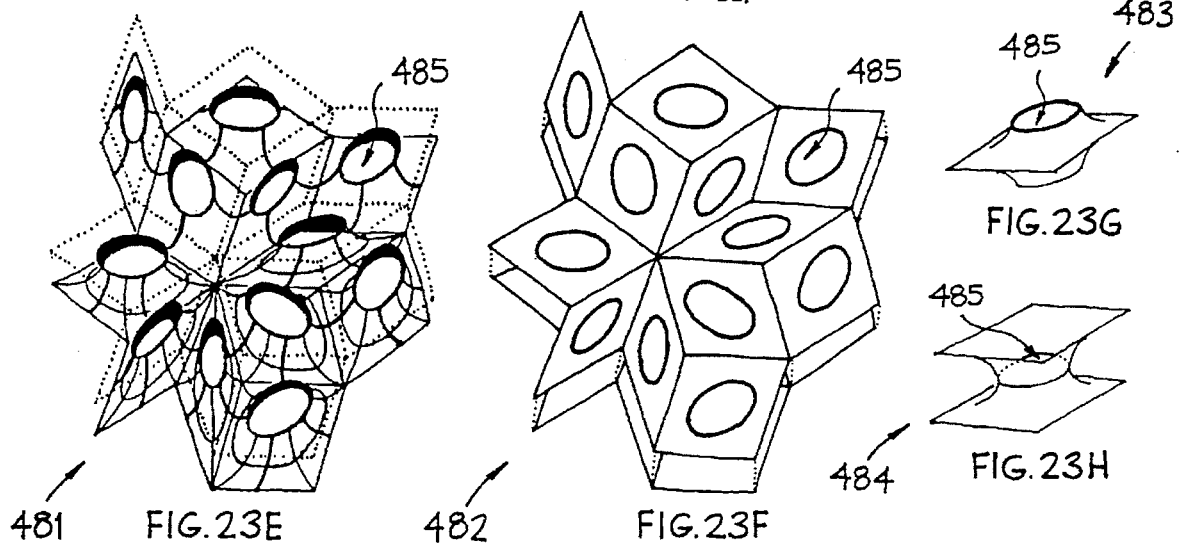

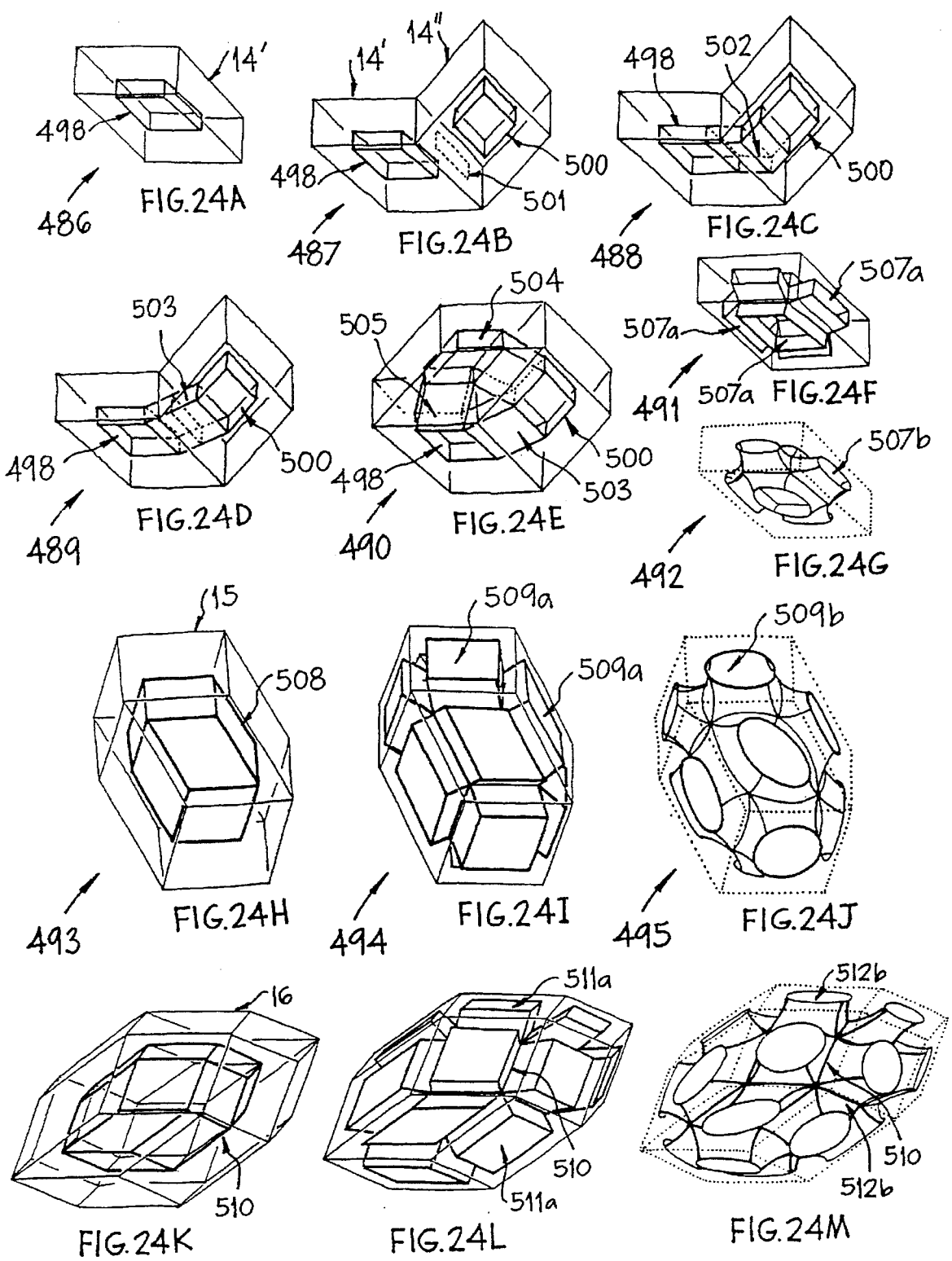

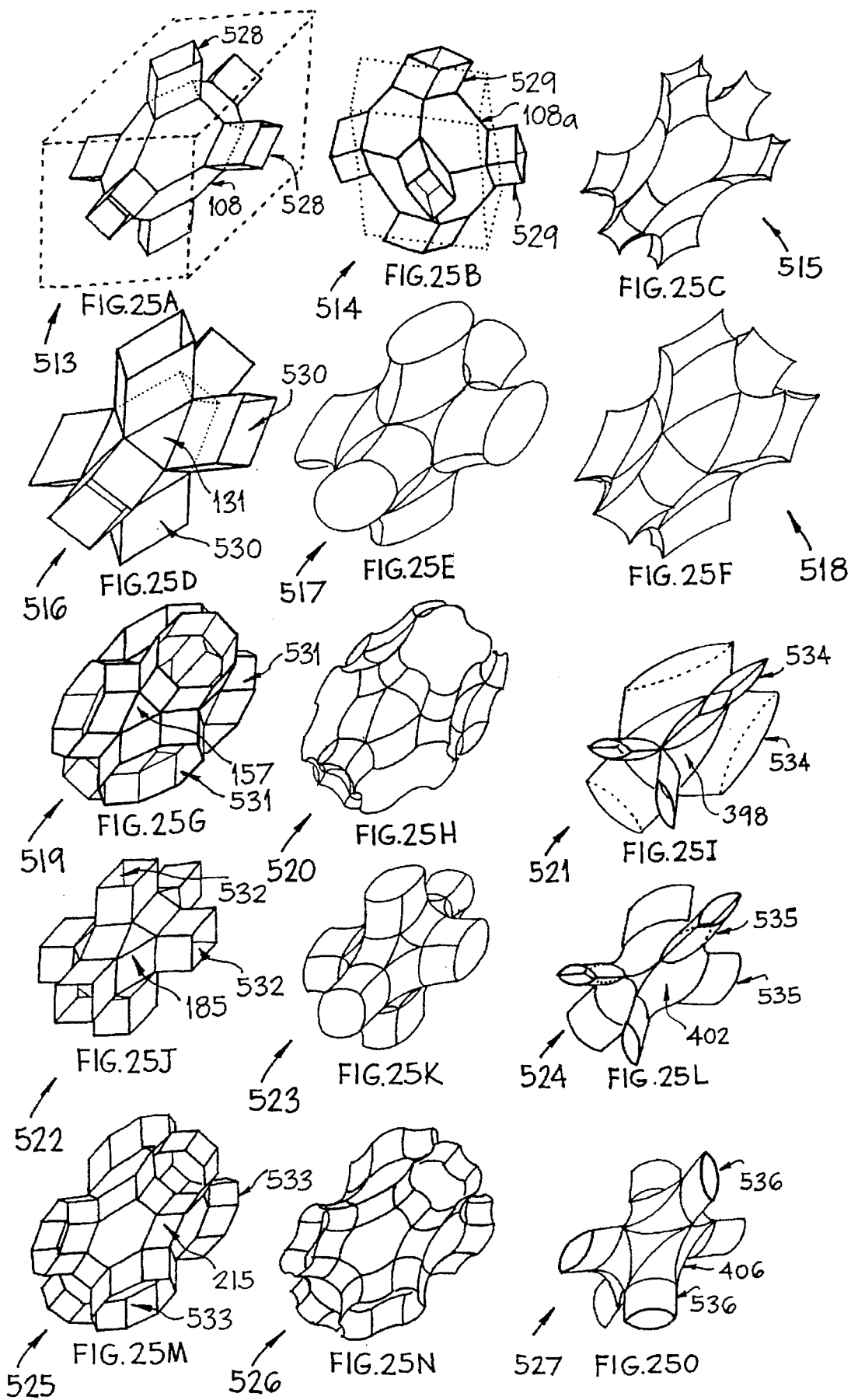

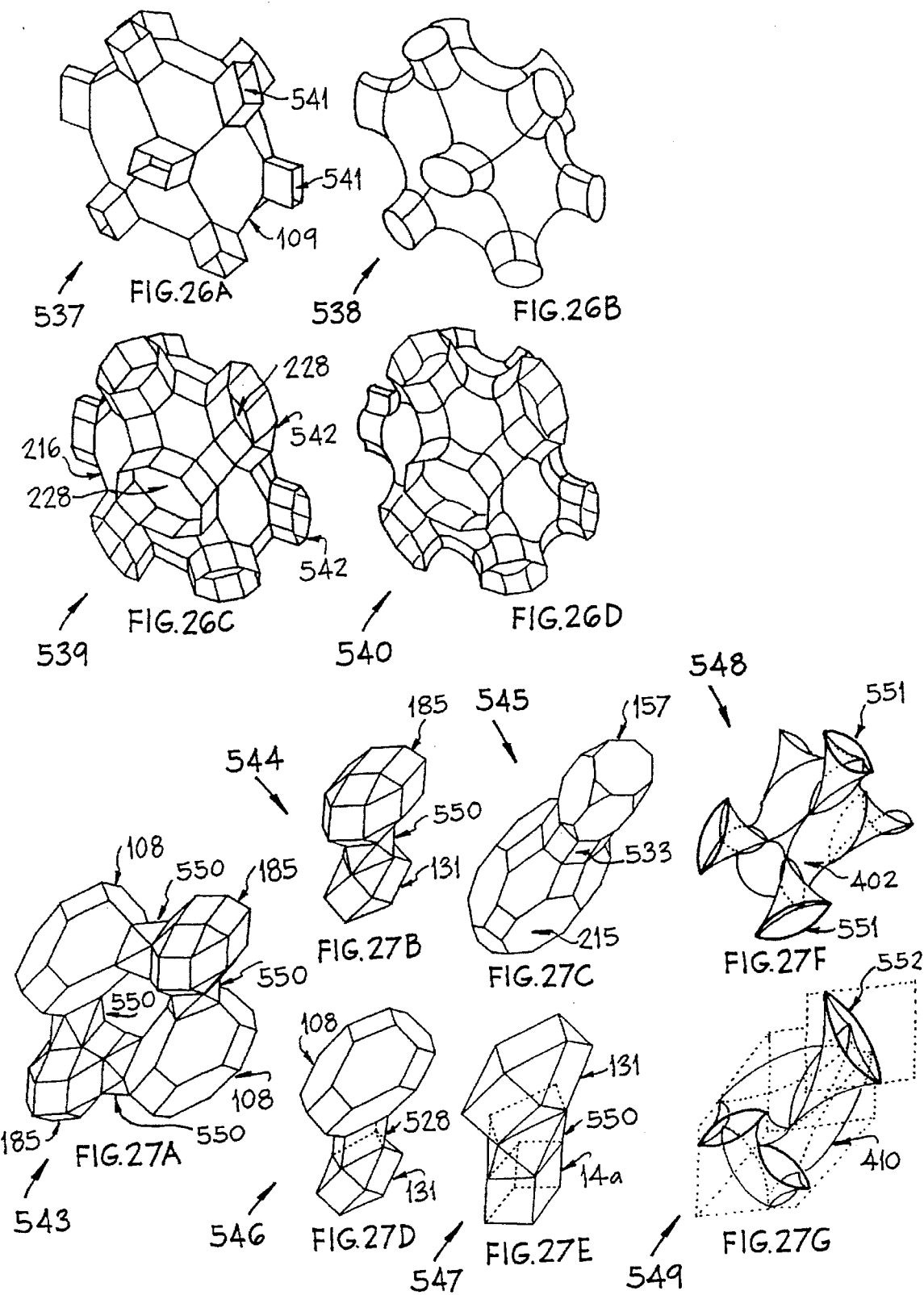

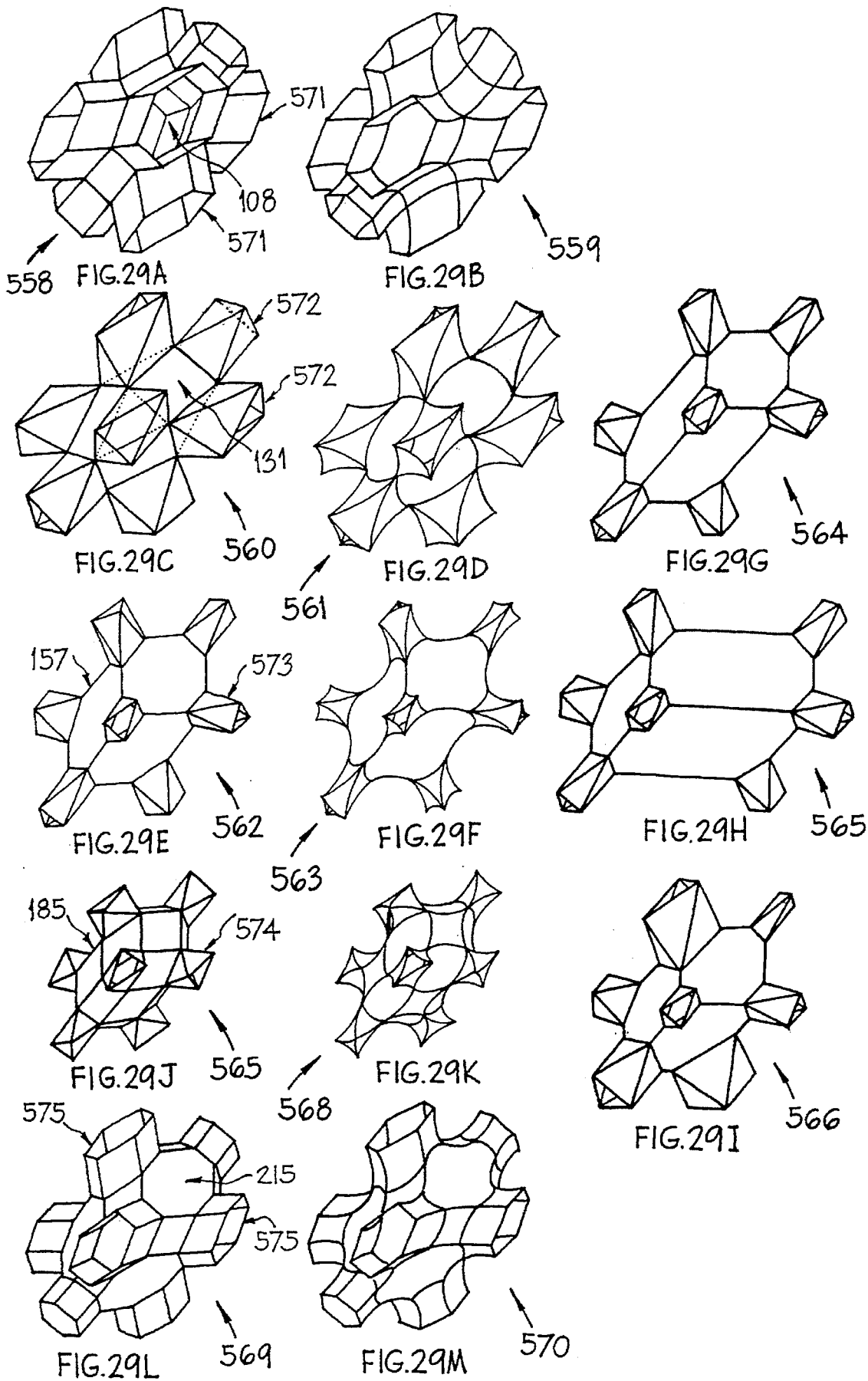

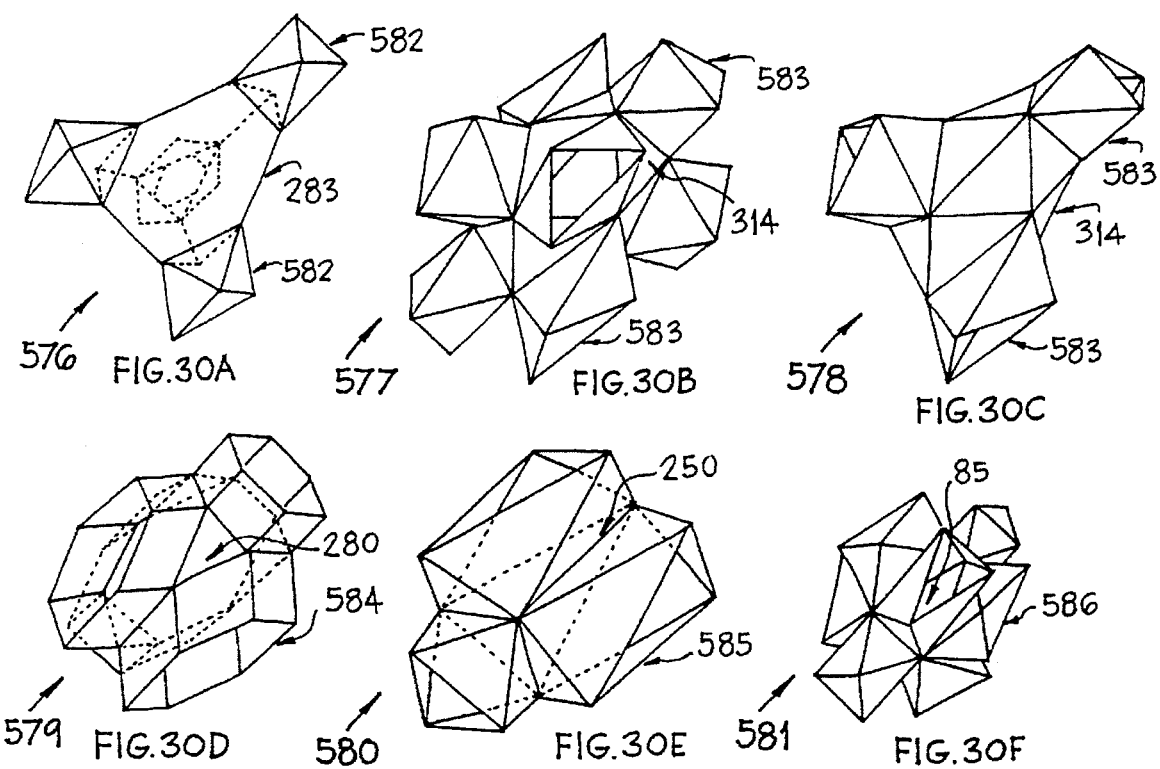
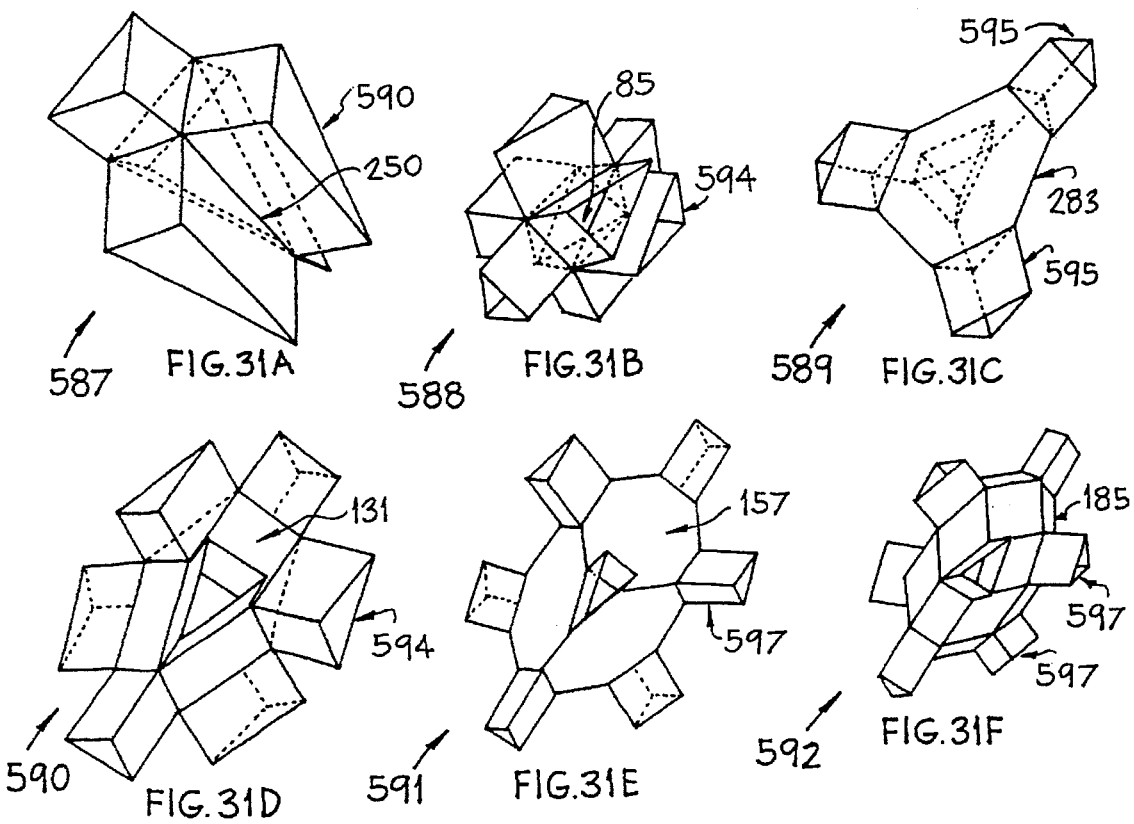

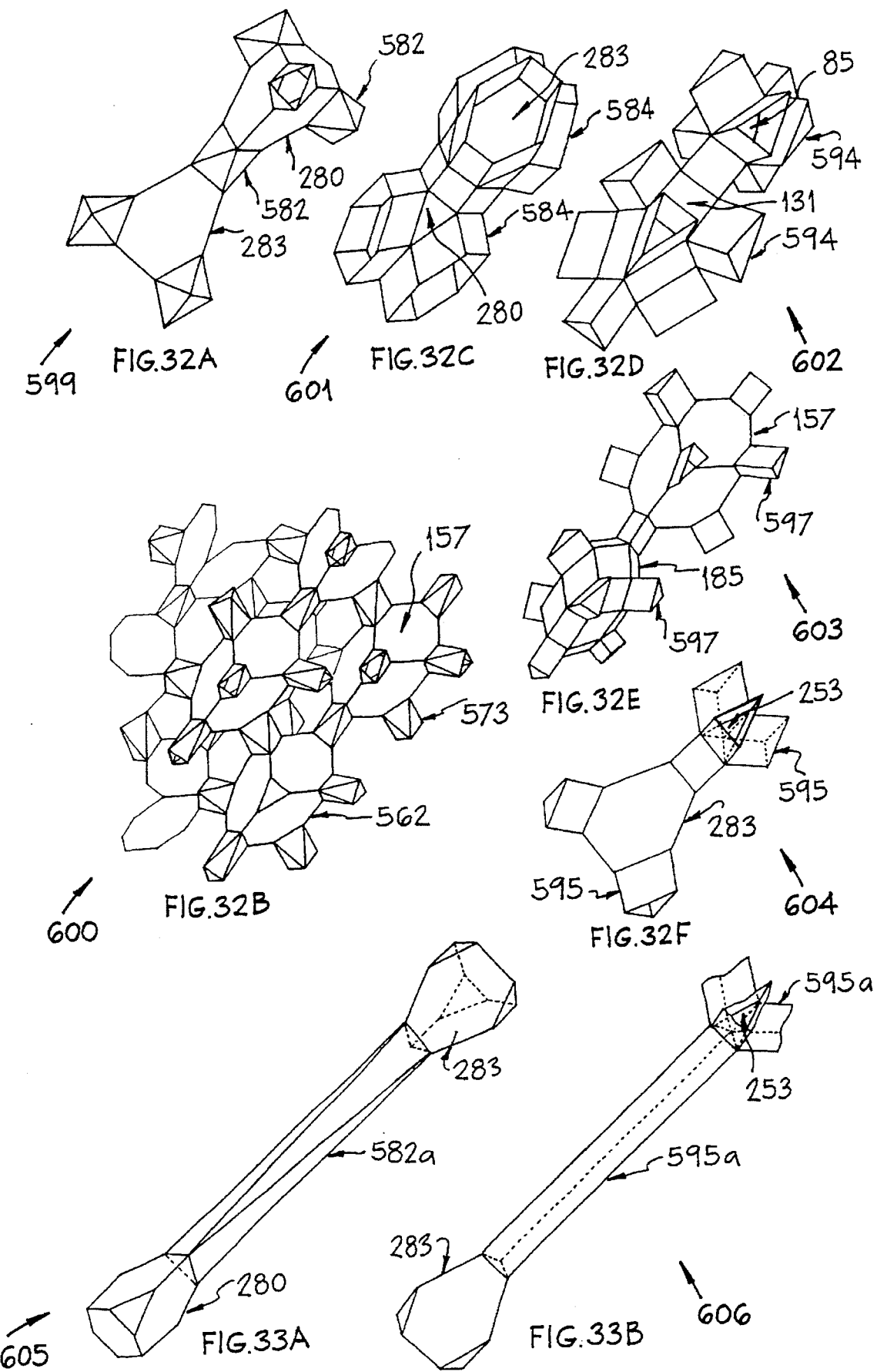

BUILDING SYSTEMS WITH NON-REGULAR POLYHEDRA BASED ON SUBDIVISIONS OF ZONOHEDRA

This is a continuation of application Ser. No. 07/740,504 filed Aug. 5, 1991, abandoned, which is a continuation-in-part of a division of the application Ser. No. 07/428,018, filed Oct. 26, 1989, U.S. Pat. No. 5,036,635, which is a continuation of the application Ser. No. 07/319,861, filed Mar. 6, 1989, which is a continuation of the application Ser. No. 07/088,308, filed Aug. 24, 1987, abandoned.

FIELD OF INVENTION

The invention relates to building systems. More specifically the invention relates to periodic and non-periodic building systems using polyhedral structures having plane or curved faces derived from surface subdivisions of zonohedra. The invention further relates to space labyrinths and space-fillings composed of these structures, and to derivative node-and-strut systems for architectural space frames.

INTRODUCTION AND PRIOR ART

The development of new architectural building systems, space structures and space-defining systems has two leading directions, one dealing with plane surfaces and straight lines and the other with curves and curved surfaces. The two directions are usually seen as separate and lead to researchers, inventors, builders and users who deal with one or the other. This produces a schism within the building profession. Morphology, dealing with underlying principles of form, helps to provide a unified view of these two "fields". That curved space structures and plane-straight space structures are integrated and are a part of the same overview provides the first step towards bridging this schism. Each is a transformation of the other and each has its advantages over the other.

Examples of Euclidean geometry in architecture are many. The architectural environment has been, and it still is, dominated by plane surfaces and straight lines. In the more experimental and advanced area, the examples of the works of Fuller, Mengringhausen, Wachsman, Pearce, Burt, Emmerich, Baracs, and other show numerous examples of space frames and innovative geometries. However, there are fewer examples of non-Eulcidean geometry in architecture, though the built examples keep increasing. Plane curves, as in arches, and curved surfaces in valuted ceilings and domes, have been known for centuries and provide a necessary counterpoint to the rectilinear spaces. The domed surface is an example on a non-Euclidean surface since the sum of the angles of a triangle on this surface is greater than 180°, while in plane geometry this sum is 180°. Such surface has a positive curvature while the plane has zero curvature. In contrast, the well-known hyoperbolic paraboloid, or the hyperboloid of the nuclear power plants, or the pseudo-sphere are examples of negative curvature where the sum of the angles of a triangle is less than 180°.

The Catalan architect, Antonio Gaudi, first recognized its inherent structural potential as a "naturally" stiff or stronger surface. Felix Candela, in Mexico in the fifties, used "hypars" (from hyperbolic paraboloids) as thin shell concrete structures in arrays of squares and a regular undulated octagon. Frei Otto in Germany, also in the fifties, used the minimal surface notion to develop his membrane structures. His studies with tensile fabric used single even-sided regular polygons with zig-zag edges in tension. Michael Burt in Israel, and Peter Pearce in the U.S., independently showed a systematic study of periodic saddle structures based on symmetry. Burt's saddle polyhedra, and their space-fillings are derived from regular and semi-regular polyhedra and their space-fillings, and have equal edges. Pearce's saddle polyhedra and their space-fillings are based on the cubic symmetry of his universal node system and use three lengths of edges. In marked contrast to these, some of Frei Otto's tent structures are non-modular and use iregular plane geometries to achieve architectural flexibility, an idea which is desirable in architecture. The first example of a doubly-curved shell structure based on the one-sided Mobius surface was suggested by the Italian architect, Vittorio Giorgini.

In addition to the saddle polyhedra mentioned above, a new class of continuous periodic minimal surface were independently reported by Alan Schoen, Michael Burt and Peter Pearce. These are continuous saddle surfaces without self-intersections that divide space into two congruent or complementary spaces. The first example of a curve space labyrinth was discovered by Schwartz. A four-dimensional Schwartz surface was developed by David Brisson. A few additional curved labyrinths based on packings of Platonic and Archimedean polyhedra were discovered by Lalvani. The plane-faced and straight-edge structures related to these were reported jointly by Burt, Wachman and Kleinmann and are based on packings of regular and semi-regular polyhedra. These are composed only of regular polygons and are termed "infinite polyhedra". The known curved space labyrinths are based on the high degree of symmetry of periodic space networks from which they are derived and correspond to prismatic, tetrahedral and cubic symmetries where the prismatic symmetries correspond to the space-fillings of regular prisms, and the other two are based on the tetrahedron and the cube, respectively.

Prior art in space structures has two further directions within the two directions already mentioned. The first using the non-modular, custom-tailored approach where the parts of a structure are shaped in response to architectural, functional, structural or aesthetic needs, which neccessitate an inherent flexibility in shaping spaces and where irregular planes, even in rectilinear buildings, are a result. In contrast to this, the thrust of industrialization in building has led to the notion of using mass-produced indentical parts for a built-in economy of design, production, construction, etc. This had led to the use of periodic structures based on symmetry. In the latter again, there are two approaches—one based on regular structures having equal edges and equal angles, as in the case of Burt, and the other developing a "unified" building system using at least three types of edges (lengths) but permitting recombinations of the same parts into a large variety of configurations as in the case of Pearce. Clearly, the latter approach is successful in providing a "flexible" system, and hence a flexibility in the configurations it produces. Both approaches, clearly exploiting the advantages of periodicity to a great extent, have built-in restrictions. Periodicity is forced on the spaces generated, the spaces have "predetermined" proportions based on the symmetry from which they are derived, and many of the spaces have the regularity imposed by spherical or prismatic point groups of symmetry. Clearly, some of the properties may be advantageous in some situations and the experience of a sense of order and beauty that symmetry brings is desirable. But all periodic building systems reinforce the advantages of periodicity and deny irregular planes, or departures in directions of space here and there, and other such devices a designer finds useful. The repetitive nature of periodic structures often removes the element of surprise and intrigue in architecture, resulting in a loss of visual and experiential interest by users and observers.

The art of building would be furthered if all the advantages of periodicity were retained, and yet irregularity and asymmetry was made possible, the proportions and shapes of space were not "dictated" by regular polygons. regular and semi-regular polyhedra, or proportions determined by high symmetry groups. The present disclosure is aimed in this direction. It uses modularity—one length of edge only as one possibility—excludes the use of regular polygons, permits infinite families of structures, permits periodic arrangements, and most important of all, it makes non-periodic, random-looking arrangments possible out of the same modules. The modules are based on plane or curved surface and their deformations and are derived from zonohedra. The curved structures are described as variants of the plane-faced structures, and vice versa. A modular system that permits non-periodic curved space structures is not mentioned in the prior art, and a system that permits both periodic and non-periodic arrangements out of the same curved modules is also not mentioned in prior art. A system that permits irregular yet ordered structural and formal compositions is also not mentioned in priori art. With the advent of computer-aided design, manufacturing and assembly, the advantages of using repeptitive identical parts is eroding. Irregular but ordered structures, like the ones described here, may be easy for the computer to handle.

U.S. Pat. No. 4,133,152 to Roger Penrose is cited for disclosing a non-periodic plane tiling based on pentagonal symmetry. U.S. Pat. No. 4,620,998 to H. Lalvani is cited for disclosing periodic and non-periodic plane tilings using crescent-shaped polygons. U.S. Pat. No. 3,931,697 to Peter Pearce discloses modular curved space structures based on Platonic and Archimedean polyhedra. U.S. Pat. Nos. 3,663, 346 and 3,663,346 to Alan Schoen discloses periodic curved space labyrinths based on known symmetries or regular prisms and polyhedra. U.S. Pat. No. 3,970,301 to Conrad Lehman discloses numerous tensile nets and polyhedra based on Platonic and Archimedean polyhedra. U.S. Pat. No. 4,492,723 to Lee Chadwick discloses polyhedra with digons based on symmetric polyhedra.

SUMMARY OF THE INVENTION

The present application takes two different techniques described in the parent application and show that the two can be derived by a different subdivision of the surface of a zonohedron. These two subdivisions are here extended into a larger family of related space structures. Nine different subdivisions of a zonohedral surface are described in detail. These generate nine different classes of polyhedral structures which can have straight or curved edges, or a combination of both. The curved edges are concave or convex or a combination. As in the parent application, the zonohedra are based on a variety of n-stars, a star of n vectors, which act as generators of the zonohedron. In addition, all zonohedra derived from i-stars which are themselves derived from n-stars such that i equals 3, 4, 5, 6, 7, . . . n, are also included. Zonohedra composed only or regular even-sided polygons and rhombohedra derived from vectors along the axes of symmetry of the five regular polyhedra are excluded. All parallelopipeds, the lowest 3-dimensional zonohedron, made up of combination of different lengths and angles, are included.

The nine classes of polyhedral structures fit together periodically or non-periodically into a variety of orderly and irregular-looking space structures including polyhedra with plane or curved faces, single-, double-, multi-layered and multi-directional space-filling building systems, plane-faced and curved space labyrinths. The latter are derived by using "open-faced" cells, obtained by removing selected faces from the cells. Such labyrinths are continuous space-filling surfaces without self-intersections and which divide space into two complementary spaces. Some examples of space-fillings and labyrinths were disclosed in the parent application and additional examples are shown here. Labyrinths using prismatic and anti-prismatic connectors to join adjacent cells are also disclosed. Nodes and struts based on these nine classes of polyhedra provide alternatives for architectural space frames.

DRAWINGS

Now referring to the drawings which make up a part of this disclosure:

FIGS. 1A–I show various types of n-stars including pyramidal, prismatic and polyhedral stars. These are the generators of the zonohedra and space-fillings.

FIGS. 2A–F show various convex zonohedra based on 3-, 4-, 5- and 6-stars. The edges of these zonohedra are parallel to the vectors of n-stars. In addition, a non-convex zonohedron based on a 5-star is shown.

FIGS. 3A–J show periodic and non-periodic space-fillings of parallelopipeds. Though each parallelopiped is based on a 3-star, the entire space-filling has more edge directions. Associated n-star are shown alongside.

FIGS. 4A–J show periodic and non-periodic space-fillings of 4-zonohedra, 6-zonohedra, and combinations of different zonohedra. Associated n-star are shown alongside.

FIGS. 5A–P show two classes of structures composed of saddle polygons and based on three zonohedra of FIGS 2A–C. These two are taken from the parent application. One is a class of saddle zonohedra, and the other is a class of cells for curved space labyrinths.

The next nine sets of figures show examples of nine different types of subdivision of zonohedra. These are termed subdivision Types A–I and are shown for three zonohedra, n=3, 4 and 5 cases, from FIGS. 2A–C.

FIGS. 6A–P show surface structures of subdivision Type A with straight, convex and concave edges, and obtained by reciprocating vertices and faces with the parent zonohedron. The derived structures are topological duals of the zonohedron.

FIGS. 7A–P show surface structures of subdivision Type B with straight, convex and concave edges, and obtained by a special truncation of Type A surfaces such that the new vertices lie on the lines joining the mid-point of the faces to the mid-points of the edges of the parent zonohedron.

FIGS. 8A–P show surface structures of subdivision Type C with straight, convex and concave edges, and obtained by truncating the vertices of the parent zonohedron at mid-points of its edges.

FIGS. 9A–P show surface structures of subdivision Type D with straight, convex and concave edges, and obtained by truncating the vertices of the source zonohedron at any point between the vertex and the mid-point of the edge of the parent zonohedron.

FIGS. 10A–P show surface structures of subdivision Type E with straight, convex and concave edges, obtained by truncating the vertices and edges of the source zonohedron such that the new vertices lie anywhere on the lines joining the mid-points of the faces to the vertices of the parent zonohedron.

FIGS. 11A–P show surface structures of subdivision Type F with straight, convex and concave edges, obtained by a special truncation of the edges and vertices of the parent zonohedron such that the new vertices lie anywhere on the face of the parent zonohedron within each region defined by the two lines, one joining the mid-point of the face to the vertices, and the other to the mid-point of the edges of the parent zonohedron.

FIGS. 12A–P show two types of surface structures obtained by subdivision Type G with straight edges composed of the diagonals of the parallelograms faces of the parent zonohedron such that the resulting structure has contiguous edges. The two types are reciprocals of each other.

FIGS. 13A–P show two types of surface structures obtained by subdivision Type H composed of straight edges defined by a truncation of the surfaces of Type G such that the new vertices lie on one of the diagonal line joining the mid-points of the face to the vertex of the parent zonohedron.

FIGS. 14A–P show one of the two types of surface structures of subdivision Type I having straight, convex and concave edges, and obtained by placing and interconnecting a shrunken edge on every face of the parent zonohedron in a cyclic manner around the parent vertices. The new vertices lie between the mid-points of the faces and the edges along a line joining a pair of opposite edges.

FIGS. 15A–X show miscellaneous different types of subdivisions. Twenty-four examples are shown and include combinations and variants.

FIGS. 16A–F show the application of six different subdivisions to a non-convex zonohedron from FIG. 2E.

FIGS. 17A–T show five different examples of polyhedra having digonal faces. The subdivisions correspond to Type G, H and I and some variants.

FIGS. 18A–K show miscellaneous other examples of polyhedral structures not included before.

FIGS. 19A–F show an assortment of six examples of portions of periodic space-fillings composed of n=3 derivative polyhedra. Four examples also correspond to labyrinths of Class 1a.

FIGS. 20A–F show an assortment of six examples of portions of periodic space-fillings based on the space-fillign of rhombic dodecahedra. Four examples also correspond to labyrinths of Class 1a.

FIGS. 21A–F show an assortment of six examples of portions of non-periodic space-fillings composed of n=4 derivative polyhedra and based on the space-filling in FIG. 3G. Four examples also correspond to labyrinths of Class 1a.

FIGS. 22A–F show an assortment of six examples of portions of non-periodic space-fillings composed of n=3 derivative polyhedra and based on the space-filling of parallelopipeds. Three examples also correspond to labyrinths of Class 1a.

FIGS. 23A–H show five miscellaneous examples based on the space-filling of different types of cells. One example of a layered honeycomb is also shown.

FIGS. 24A–M show the step-by-step derivation of a space labyrinth of Class Ib and composed of parallelopipeds. Other cells are also shown.

FIGS. 25A–O show the cells with affixed connector prisms as modules of space labyrinths of Class Ib. The cells are derived from a parallelopiped (n=3 case). Curved variants shown alongside.

FIGS. 26A–D show examples of cells and curved variants with affixed connector prisms as modules of labyrinths of Class Ib. The cells are derived from a rhombic dodecahedron (n=4 case).

FIGS. 27A–G show examples of units for labyrinths of Class Ic composed of two different types of cells connected by an anti-prism.

FIGS. 28A–E show miscellaneous examples of labyrinths of Class Ib and Ic.

FIGS. 29A–M, 30A–F and 31A–F show examples of cells with connector prisms for labyrinths on Class II.

FIGS. 32A–F show examples of portions of labyrinths of Class II.

FIGS. 33A–B show examples of nodes and space frames based on the subdivisions. The cells are used as nodes, and the connector pieces used in labyrinths are struts.

DETAILED DESCRIPTION OF THE INVENTION

Figure 16A:
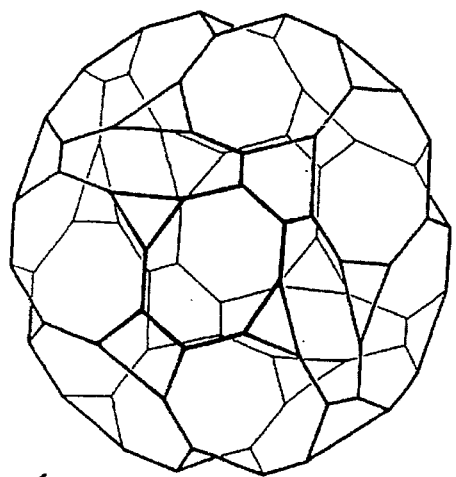
Figure 16B:
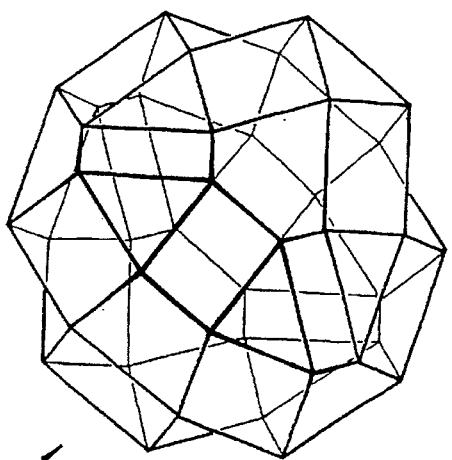
Figure 16C:
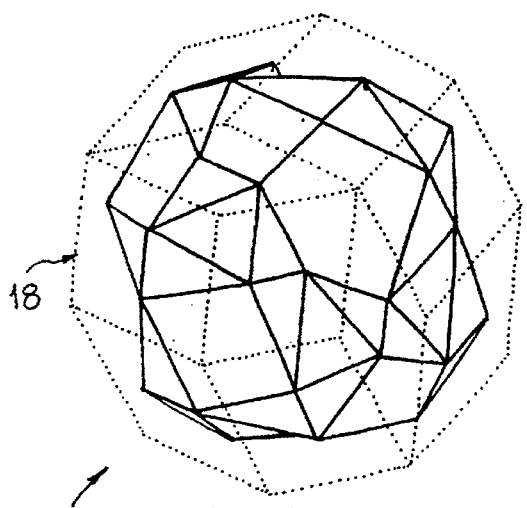
Figure 16D:
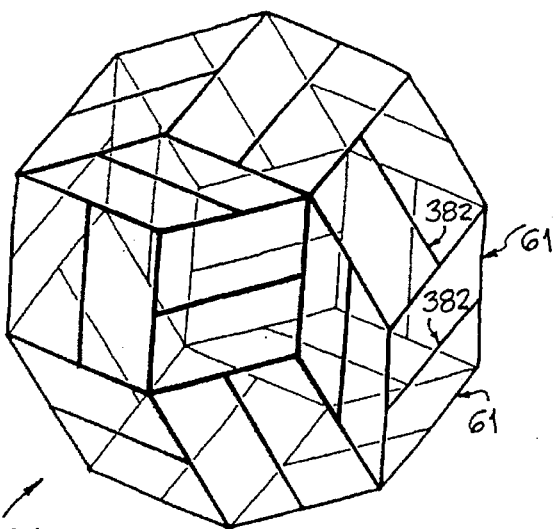
Figure 16E:
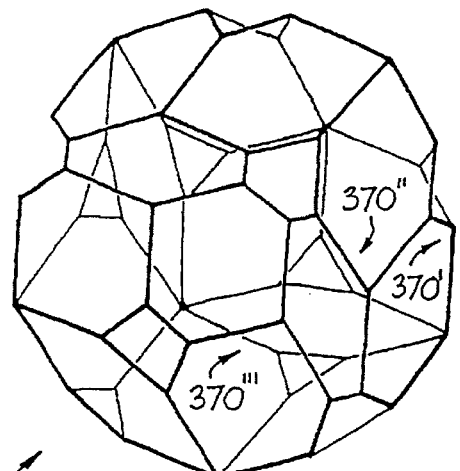
Figure 16F:
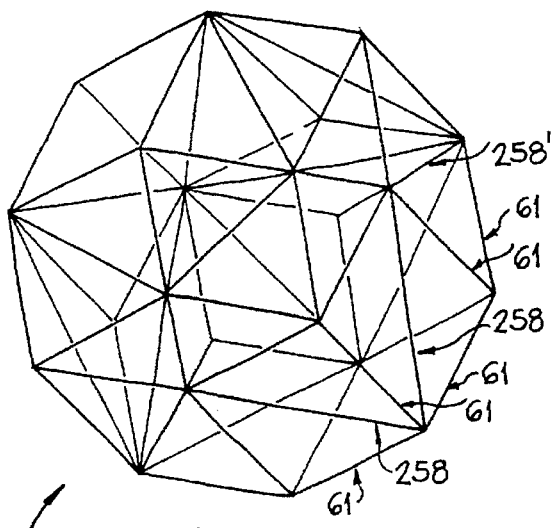

This invention discloses new polyhedral structures derived from zonohedra. Zonohedra comprise a class of known polyhedra with even-sided polygonal faces arranged in pairs of opposite and parallel faces. The faces of zonohedra are zonogons or parallelograms, where zonogons are even-sided polygons with pairs of opposite and parallel edges. The edges are parallel to n-directions, and thus the more specific term 'n-zonohedra' is sometimes used. The general term zonohedra will be used here to describe 'plane-faced' zonohedra composed of flat faces. These zonohedra are used as source structures for deriving new structures and are thus termed 'parent zonohedra'. The terms parent vertex, parent edge, parent face refer to the vertex, edge and face of the parent zonohedron.

The zonohedra are derived from a star of n vectors, termed n-star, which prescribed lengths and angles between vectors. These determine the edge-lengths, face angles and dihedral angles of zonohedra. The various types of n-stars, taken from the parent application, are briefly described first. The zonohedra and space-fillings based on n-stars are briefly described next. The nine types of subdivisions of zonohedra are then described in detail for n=3,4 and 5 cases and can be extended to any higher values. The term 'subdivision' is here used to define a technique of geometric transformation for deriving a new structure from a source structure. The derived structures for the n=3 case are irregular or affine variants of the regular and semi-regular polyhedra related to the tetrahedron, the n=4 case are non-regular variants of the regular and semi-regular polyhedra related to the octahedron. The n=6 case provide examples of non-regular polyhedra which are topologically identical to the regular and semi-regular polyehdra related to the icosahedron. The structures are shown with straight edges and convex faces for each case. Curved variants obtained by curving the edges, are shown with convex and concave edges. In most curved cases, the faces are also convex or concave. Some examples generate smooth surfaces.

Examples of periodic and non-periodic space-fillings and labyrinths using the structures obtained from the nine different subdivisions are describe next. The space-fillings use the derived structures "as is", while in the case of the labyrinths selected faces are removed to permit an interconnection between adjacent cells. Additional labyrinths which use prismatic and anti-prismatic connectors to link the open cells are shown. The plane-faced labyrinths, in the periodic cases, are non-regular or affine variants of the known regular-faced infinite polyhedra. The extension to related node-strut building system is proposed.

The faces of curved variants could be continuously curved surfaces, or facetted polygonal surfaces or minimal surfaces. The curved surfaces could be flexible nets in tension used by themselves or in combination with space frames, or stiff shell-like surfaces, and the edges could be hinged or fixed to others. The plane faces could be panels or folded plates, and the straight edges could be converted into struts, and the vertices into nodes. Applications of the system include architectural and environmantal structures, fixed or retractible space frames, decks or platforms, playground structures, honeycomb structures, educational kits or toys, tiles, saddle polyhedra nodes for space frames, and include constructions on earth or in outer space. Though selected examples are shown, it is clear that many variations could be made without departing from the scope of the invention.

1. n-stars

FIGS. 1A–I shows various spatial n-stars 1–9. These include pyramidal, prismatic and polyhedral stars derived respectively from the geometry of pyramids, prisms or polyhedra. This distinction is convenient though, in a strict sense, pyramidal and prismatic stars are also polyhedral.

The 10star 1 (n=10; from FIG. 4 of parent application) is based on a 10-sided pyramid with a regular decagonal base 10. It is composed of ten vectors a–j. When the ten vectors are extended across the apex of the pyramid to form a configuration of twenty radial lines, the outer ends of these radii define a 10-sided prism. Thus even-sided pyramidal n-stars can also be derived from the 2n vertices of a n-sided prism. The 5star 2 (n=5 case; related to star 87 in FIG. 9 of parent application) is based on a 5-sided pyramid of any height and has a regular pentagonal base 11. The line joining the apex p to the mid-point p' of the base is perpendicular to 11. When the five vectors u'–y' are extended across the apex, the outer ends of the ten radii define a pentagonal anti-prism. Thus all odd-sided pyramidal n-stars are also defined by the vectors joining the center of n-sided anti-prisms to its 2n vertices.

The 6-star 3 (n=6 case; from FIG. 6 of parent application) is based on a 5-sided regular pyramid but is obtained in a different way. Five vectors k–o are defined by the lines joining p' to the five vertices of 11, and the remaining vector p protrudes from this plane at right angles to the five vectors. The 6-star 4 (also from FIG. 6 of parent application) is a variant of 3 and is based on an inclined pyramid with five base vectors k–o, as in 3, and the sixth vector p" is inclined at any angle to the base. The pentagonal pyramid could be replaced by any (n-1)-gonal pyramid to generate an n-star. A variant would be to have vectors of unequal length and at unequal angles. The 5-star 5 has five unequal vectors k'–o' at arbitrary angles. It is a variant of 3 and is based on an irregular pyramid with a non-planar base.

The irregular star 5 can be obtained in an alternative way from a 10-vertexed deltahedron, a polyhedron with triangular faces and ten vertices, by joining its center to the vertices. Thus 5 is also an example of an n-star based on an arbitrary polyhedral star. A variant of this would be to have an arbitrary star of n equal vectors, where the outer points of the vectors lie on a sphere. Alternatively, any semi-regular polyhedron, its dual, any spherical subdivision of any frequency, or any superimposition of regular and semi-regular polyhedron could be used as generators for n-stars. The n-stars 6–8 (from FIG. 9 of parent application) are respectively based on an arbitrary tetrahedron, octahedron and icosahedron. The 4-star 6 (n=4 case) is composed of four vectors q–t defined by the tetrahedron 12, the 6-star 7 (n=6 case) is composed of six vectors i–vi, and the 6-star 8 can be obtained by re-arranging the vectors from the star 7. The dotted lines 13 in star 8 show one pentahedral cap of an incomplete icosahedron. The star 9 is based on an irregular triangular pyramid and is composed of three vectors vii–ix along its inclined edges; it is similar to stars 1 and 2.

2. Zonohedra based on n-stars

FIGS. 2A–F show various zonohedra based on n-stars. The convex zonohedra 14–16 (FIGS. 2–C correspond to n=3, 4 and 5 cases, and are referred to as 3-zonohedron, 4-zonohedron and 5-zonohedron, respectively. In each zonohedron shown here, one set of edges parallel to the vectors are appropriately marked and all other edges are parallel to these. In each case the distinct face angles are identified. The precise values of the face angles of each parallelogram are determined by the angles between distinct vector pairs of the generating star. The angles are thus determined by the geometry of the n-stars selected from the types described in the last section. The lengths of the edges of the zonohedra are equal to the lengths of the vectors of the n-star.

The 3-zonohedron 14, a parallelopiped, is based on the 3-star 9. It is composed of three pairs of different parallelograms 14a, 14'a and 14"a, with acute face angles A, B and C, respectively. Alternatively, 3-zonohedra used herein can be composed of one or two types of parallelograms or rhombii, excluding the regular cube.

The 4-zonohedron 15, a rhombic dodecahedron (a variant of the zonohedron 85 in FIG. 9 of parent application), is based on the 4-star 6. It is composed of three different types of parallelograms 15a, 15'a and 15"a with acute face angles D, E and F, respectively. Alternatively, 4-zonohedra can be composed of one or more types of parallelograms or rhombii depending on the angles between the vectors of the generating star.

The 5-zonohedron 16, a rhombic icosahedron (similar to 89 in FIG. 9 of parent application), is based on the 5-star 2. It is composed of two differnt types of rhombii 16a and 16'a with acute angles G and H, respectively. Alternatively, 5-zonohedra can comprise more rhombii or parallelograms.

The non-convex 5-zonohedron 18 (FIG. 2E) is based on a 5-star 17 (FIG. 2D) which is similar to 2. The pentagonal pyramid of the star 17 has a shorter height, and is shown in a view along its 5-fold axis of symmetry. This axis is along the line joining p and p' in 2. In 18, the two concave vertices 20 lie on the front side, and the two concave vertices marked 20' lie on the back side. The convex 6-zonohedron 19 (FIG. 2F), a non-regular rhombic triacontahedron (similar to 94 in FIG. 9 of parent application), is based on the 6-star 7.

The number of faces F in a n-zonohedron equals the known expression n(n-1), the number of edges E equals 2F or 2n(n-1) and the number of vertices V equals F+2 or n(n-1)+2. In addition, the Euler relation holds, i.e. V+F=E+2. These zonohedra provide the geometric skeleton for deriving new polyhedral structures by various subdivisions of the zonohedral surfaces. The source zonohedra will thus be termed 'parent zonohedra'. The number of vertices, edges and faces of the derived polyhedra will be given in terms of n and in terms of V, E and F, thus relating the Euler count to the parent zonohedron.

3. Space-fillings based on n-stars

FIGS. 3A–J and 4A–J show portions of periodic and non-periodic space-fillings of zonohedra based on n-stars. These space-fillings, here termed 'parent space-fillings' provide geometric skeletons for space-fillings of structures obtained by subdivisions of zonohedra. FIGS. 3A–J show space-fillings of parallelopipeds and rhombohedra, and FIGS. 4A–J show space-fillings of higher (n>3) zonohedra. Appropriate n-stars are shown alongside and the edges parallel to the vectors are marked in the space-fillings.

In FIG. 3A, 21 is a periodic space-filling (n=3) composed of parallelopipeds 14. 13 (FIG. 3C) is a periodic space-filling for the n=4 case based on the star 22 shown alongside. 21 uses translation of a single cell along the three vector directions, while 23 uses reflection and translation along one of the directions to produce a zig-zag space-filling of parallelopipeds. 24 (FIG. 3D) shows an elevational view of a periodic zig-zag space-filling similar to 23 but composed of two different cells. 25 (FIG. 3E) is an elevational view of a space-filling of two cells arranged non-periodically in the "vertical" plane, but it repeats periodically in the "horizontal" plane. 27 (FIG. 3G) is a portion of a multi-directional non-periodic space-filling based on the 6-star 26 (FIG. 3F). This particular example has no planar layers. 29 (FIG. 3I) is an example of a multi-layered non-periodic space-filling based on the 6-star 28 (FIG. 3H) which is a slight variant of 26. This example has parallel planar layers, like horizontal floors, and can be periodic or non-periodic in the vertical plane.

The configuration 30 (FIG. 3J), based on the pyramidal 5-star 17, is a decomposition of the zonohedron 18 into close-packed rhombohedra. The opposite of this idea would be to fuse close-packed parallelopipeds into higher zonohedra (higher than 3) and thus generate a space-filling of higher zonohedral cells. These are shown next.

In FIGS. 4A, 31 is a periodic space-filling of tilted rhombic dodecahedra 15. In 32 (FIG. 4B), the cells 15 are combined with parallelopipeds 14a, variants of 14, in a periodic arrangement of two types of convex cells. In 33 (FIG. 4C), the convex zonohedron 15 is combined with a non-convex cell 40. Configurations 34–36 (FIGS. 4D–F) are periodic space-fillings of n=6 based on a variant of the 6-star 7. In 34, the rhombic triacontahedron 19a, a variant of 19, is packed leaving gaps which can be filled with other cells. 35 is composed of a non-convex rhombic triacontahedron 42 which fills space by itself. 36 is an alternative space-filling using a different non-convex rhombic triacontahedron 43. 38 (FIG. 4H) is a non-periodic space-filling based on the 6-star 37 (FIG. 4G) and composed of three different rhombic dodecahedra, 15, 15a and 15b. Any two or more such cells can be stacked periodically or non-periodically along one direction. 40 (FIG. 4J) is a portion of an irregular configuration based on the 8-star (FIG. 4I) and composed of 3-cells, a 4-cell and a 5-cell.

Other known space-fillings based on zonohedra include rhombohedral lattices composed of one type of rhombohedron or a rhombic prism, hexagonal lattice defined by the vertices and edges of a space-filling of hexagons, a diamond lattice, etc. In the present application, all regular lattices are excluded. However, lattices derived from the packing of non-regular hexagonal prisms, non-regular diamond lattices, layered carbon lattice (a flattened version the diamond lattice), etc. are included as source lattices and space-fillings to derive the structures disclosed herein.

4. Subdivisions of Zonohedra

FIGS. 5A–P shows the derivation of two types of saddle polyhedra from the parent application. This derivation is first summarized as previously disclosed. These two types of structures can be alternatively described in terms of subdivisions of zonohedral surfaces. This description will follow and will be subsequently extended to show additional structures related to these two types of saddle polyhedra. In addition, eight more types of subdivisions, along with their associated space structures will be shown.

Illustrations 44–59 show the technique for deriving the saddle polyhedra 47–49 (FIGS. 5D–F; illustrations are from FIG. 10 of parent application). 44–46 (FIGS. 5A–C) show the 3-zonohedron 14, 4-zonohedron 15 and 5-zonohedron 16, respectively, as parent zonohedra. In each case, the points 60 lying on the opposite pair of edges 61 are joined by a new edge line 62, and this process is repeated on every pair of opposite edges to produce an intersection point 63 on every parent face. The points 60 are conveniently the mid-points of the parent edges, though this condition can be relaxed to pick any point on the parent edge. The saddle polyhedra 47–49, obtained by removing the edges of the parent zonohedron, are composed of saddle polygons defined by contiguous new edges. As disclosed in the parent application, these saddle polygons are even-sided and the number of sides is twice the valency of the corresponding vertices of the source zonohedra. That is, a 3-valent parent vertex 64 produces a 6-sided saddle face 64', a 4-valent parent vertex 65 produces a 8-sided saddle 65', a 5-valent parent vertex 66 produces a 10-sided saddle 66', and so on. Note that in the three examples shown, the saddle polygons have different face angles.

In the present application, the edges 62 of the saddle polyhedra 47–49 are defined as "bent" or "kinked" edges since a 2-valent vertex is topologically considered "false". Thus alternatively speaking, 47–49 can be obtained by joining the mid-points 63 of the faces of the parent zonohedra with the new edges 62. This process will be re-defined here as a subdivision of Type A.

Illustrations 50–59 (FIGS. 5G–P) show the technique for deriving the saddle polyhedral cells 57–59 (FIGS. 5N–P) used to obtain curved space labyrinths (illustrations are same as FIGS. 12 and 13 of parent application). 50 (FIG. 5G) shows the technique of placing closed curves, say ellipses, on each face of any parent zonohedron. This is shown here with two ellipses 69b and 69'b placed on two adjacent faces 67 and 68 meeting at an edge 61. This method is repeated over all faces in 54–56 which shows the application to parent zonohedra 14, 15 and 16. Each pair of adjacent ellipses is then connected by the method shown in 51–53. In 51 (FIG. 5H), a radial plane 72 (described in the parent application as a dual plane) with edges parallel to the two parent edges 70 and 71, respectively, defines the plane of the edge joining the two ellipses. In 52 (FIG. 5I), a new ellipse 73 lying on the plane 72 intersects the ellipses 69b and 69'b at the points 74. In 53 (FIG. 5J), the points 74 are the vertices of the derived saddle polyhedron, the portion 75b of the ellipse 73 is its edge, and the ellipses 69b and 69'b are its faces. This process is applied over all faces of the three parent zonohedra in 54–56 (FIGS. 5K–M). The number of different ellipses correspond to the number of different faces. In 54, the three different ellipses 69b, 69'b and 69"b are needed. In 55 also three different ellipses 76b, 76'b and 76"b are needed. In 56, two ellipses 77b and 77'b are necessary. The derivation of one saddle hexagon around a 3-valent vertex is shown for each; the saddle hexagons are marked 117b, 118b and 120b in the three cases. When extended over the entire zonohedron, the saddle polyhedra 57–59 are obtained.

In 57–79 the elliptical faces are shown as "holes" or "empty faces". The face suffix 'b' is replabed by 'B' to indicate the open faces, e.g. the closed face 77b is replaced by the open face 77B, and so on. Such polyhedra with faces removed are here termed 'open cells' in contrast with normal polyhedra which are 'closed cells'. Open cells are modules of curved space labyrinths. In the present application, this distinction between zonohedral surfaces and space-fillings using closed cells, and labyrinths which use open cells is important. The two types lead to different types of space structures. In either case, the two types of cells have the same number of vertices, edges, faces, and vertex valencies, though in one case some faces are holes. The process of deriving polyhedral cells 57–59, both open and closed, is re-defined here as subdivision Type B.

The next nine sets of figures show the nine types of subdivision of zonohedra, Subdivision Types A–I. Subdivision Types A and B are re-defined. In each case the derivation of the subdivision is shown with a single parent face, which is then extended to two adjacent parent faces followed by the subdivision of the entire parent zonohedron. In each Type, the parent zonohedra are 14,15 and 16 and correspond to n=3, 4 and 5 cases, respectively. For each subdivision three variants are shown, one with straight edges, the other two with curved edges, one convex and the other concave. Combinations of straight and curved edges are possible. For each type, the number of vertices, edges and faces are given in terms of n, and alternatively in terms of F, the number of faces in the parent zonohedron. From the latter, expressions in terms of V and F can be easily derived based on the relations between V, E and F described earlier.

5. Subdivision Type A

Subdivision Type A (FIGS. 6A–P) is obtained by converting the faces of the parent zonohedron into vertices and keeping the number of edges unchanged. In doing so, the vertices of the parent zonohedron are converted to the new faces. Thus in this type of subdivision, the new structure is the topological dual or reciprocal of the parent zonohedron.

Illustration 78 (FIG. 6A) shows a parallelogram or rhombic parent face 67. The diagonals 94 intersect at the mid-point 63, here derived in an alternative way from 44 in FIG. 4. In 79 (FIG. 6B), two adjacent faces 67 and 68 of the parent zonohedron meet at the edge 61. The mid-points 63 of each face are joined by a new edge 62a, a straight line variant of the kinked edge 62 in 44. In 80 (FIG. 6C), the mid-points 63 are joined by a convex edge 62b, and in 81 (FIG. 6D) the mid-points are joined by a concave edge 62c. 82–84 (FIGS. 6E–6G) show the location of the mid-points 65 on each visible face of the zonohera 14, 15 and 16, respectively. These are the vertices of a new structure. 14 and 15 each have eight 3-valent vertices comprising a pir each of 64, 64', 64" and 64''', in addition 15 has six 4-valent vertices 65, 65' and 65" comprising a pair of each, and 16 has two 5-valent vertices 66, ten 4-valent vertices 64 and ten 3-valent vertices 64. The procedure 79 of joining a pair of adjacent vertices 63 by a straight edge 62a is applied to all faces of the parent zonohedron to obtain the new structures 85–87 (FIGS. 6H–J); the parent zonohedra are shown in dotted lines. This process is here defined as subdivision Type A. The variants 88–90 (FIGS. 6K–M) are obtained by applying the procedure 80 to produce convex polyhedra with convex curved edges, and the variants 91–93 (FIGS. 6N–P) are obtained by applying the procedure 81 to obtain polyhedra with concave edges.

The structures 85 (FIG. 6H), 88 (FIG. 6K) and 91 (FIG. 6N; n=3 cases) are composed of six vertices, eight triangular faces, and twelve edges. The eight triangular faces correspond to the eight 3-valent vertices of 14. 85 is a non-regular octahedron and is a deformation of the familiar regular octahedron composed of equilateral triangles. It is composed of four pairs of triangular faces 95a, 95'a, 95"a and 95'''a corresponding to the 3-valent vertices (q=3) shown in 82. The corresponding faces in the polyhedron 88 having convex curved edges 62b are marked with a suffix 'b' which replaces 'a', e.g. 95'a changes to 95'b. Similarly, in the polyhedron 91 with concave edges 62c, the face suffix is changed to 'c', e.g. 95'a becomes 95'c. In 88, the face polygons form a continuous smooth surface to make an ellipsoid.

The structures 86 (FIG. 6I), 89 (FIG. 6L) and 92 (FIG. 6O; n=4 cases) are composed of twelve vertices, twenty-four edges and fourteen faces. The faces comprise eight triangular faces corresponding to the 3-valent vertices (q=3) and six quadrilateral faces or 4-gons corresponding to the eight 4-valent vertices (q=4) of 15 shown in 83. In 86, the triangular faces 96a, 96'a and 96"a are flat, and the 4-gons 97a, 97'a and 97"a may be flat or saddle-shaped depending on the angles between the vectors. All faces are bound by straight edges 62a. In 89, the 3-sided faces and 4-sided faces are portion of a continuous smooth surface formed by convex curved edges 62c. The curved polygonal faces correspond to the plane faces of 86 and the suffix 'a' is replaced by 'b'. In 92, the face polygons are concave curved surfaces bound by concave curved edges 62c and the face suffix is changed to 'c'.

The structures 87 (FIG. 6J), 90 (FIG. 6M) and 93 (FIG. 6P; n=5 cases) are composed of twenty vertices, forty edges, and twenty-two faces. The faces correspond to the twenty vertices of 16. The number of sides of the faces correspond to q. In 87, the ten triangular faces 98a replace the ten 3-valent (q=3) vertices 64 of 16, the ten 4-gons 99a replace the ten 4-valent (q=4) vertices 65, and two pentagonal faces 100a replace the two 5-valent (q=5) vertices 66. In this particular example all faces are flat, but when different vector angles are used, the 4-gons and 5-gons are saddle-shaped. In 90, all faces are part of a smooth continuous convex surface, the edges change to curved convex edges 62b, and the faces are curved surface variants of the plane faces of 87. In the corresponding faces of the two structures, the suffix 'a' is replaced by 'b'. In 93, composed of concave polygons and concave edges 62c, the face suffix for corresponding faces is replaced by 'c'.

In general, structures obtained by subdivision Type A are composed of n(n-1) vertices, 2n(n-1) edges and n(n-1)+2 faces. Alternatively, the number of vertices equals F, the number of edges equals 2F and the number of faces equals F+2.

6. Subdivision Type B

In this type of subdivision (FIGS. 7A–P), each face of the parent zonohedron is converted into a parallelogram which is oriented such that each new vertex lies on any position between the line joining the mid-point of the parent face to the mid-point of the parent edge. Variants could be produced by placing four points in any symmetric or asymmetric four positions on the parent parallelogram.

In 101 (FIG. 7A), four new vertices 74 are placed at lines which join mid-points 60 of opposite edges of the parent parallelogram 67. The four vertices are then connected to make a new parallelogram 69a composed of edges 123a which are parallel to the diagonals of 67. In 102 (FIG. 7B), this is extended to two adjacent parent faces 67 and 68. The two new 4-sided polygons 69a and 69'a are connected by a new edge straight 75a. This edge is parallel to the edge 62a in subdivision Type A. In 103 (FIG. 7C), the new polygons 69b and 69'b are made of convex curved edges 123b and joined to each other by a concave curved edge 75b. In 104 (FIG. 7D), the new polygons 69c and 69'c are made of concave curved edges 123c and are joined by a convex curved edge 75c.

In 105–107 (FIGS. 7E–G), new parallelogram faces are placed as shown on each face of the parent zonohedra 14–16 following the procedure in 102. In 105, the new faces are 69a, 69'a and 69"a, corresponding to the three original faces of 14. In 106, the new faces are 76a, 76'a and 76"a corresponding to the original faces of 15. In 107, the new faces are 77a and 77'a corresponding to the original faces of 16. In 108–110 (FIGS. 7H–J), the new faces are joined by straight edges 75a making a polyhedron composed of F parallelograms and V 2q-sided polygons, where q is the vertex valency of the parent zonohedron. When q=3, all 3-valent parent vertices are converted to new 6-sided polygons, when q=4 all 4-valent parent vertices are converted into new 8-sided polygons, and when q=5 all 5-valent parent vertices are converted to new 10-sided polygons.

The polyhedra 108 (FIG. 7H), 111 (FIG. 7K) and 114 (FIG. 7N) are composed of twenty-four vertices, thirty-six edges and fourteen faces. They are deformed variants of truncated octahedron, the familiar Archimedean semi-regular polyhedron. The faces of 108 comprise six parallelograms, two each of 69a, 69'a and 69"a joined by straight edges 75a, and eight non-regular hexagons marked 117a, 117'a, 117"a, and 117'"a. In the variant polyhedra 111 and 114, the face and edge suffix 'a' is placed by 'b' and 'c', respectively. The polyhedron 111 (similar to 57) is composed of "4-sided" ellipses 69b, 69'b and 69"b joined by concave curved edges 75b, and saddle-shaped hexagons 117b, 117'b, 117"b and 117'"b bound by edges 75b and 123b. The polyhedron 114 is composed of 4-sided concave polygons 69c, 69'c and 69"c joined by convex edges 75c, and saddle-shaped hexagons 117c, 117'c, 117"c and 117'"c bound by edges 75c and 123c.

The polyhedra 109 (FIG. 7I), 112 (FIG. 7L) and 115 (FIG. 7O) are composed of forty-eight vertices, seventy-two edges, and twenty-six faces. The faces are composed of six octagons, eight hexagons and twelve parallelograms. They are deformed variants of truncated cuboctahedron, the familiar Archimedean semi-regular polyhedron. The polyhedron 109 has non-planar octagons 119a, 119'a and 119"a, non-regular hexagons 118a, 118'a, 118"a and 118'"a, and parallelograms 76a, 76'a and 76'a joined by edges 75a. The polyhedron 112 (similar to 58) is composed of saddle octagons 119b, 119'b and 119"b, saddle hexagons 121b, 121'b, 121"b and 121'"b, and 4-sided ellipses 76b, 76'b and 76"b. It is bound by curved edges 75b and 123b. The polyhedron 115 is composed of saddle octagons 119c, 119'c and 119"c, saddle hexagons 121c, 121'c and 121"c and 121'"c, and 4-sided polygons 76c, 76'c and 76"c. It is bound by curved edges 76c and 123c.

The polyhedra 110 (FIG. 7J), 113 (FIG. 7M) and 116 (FIG. 7P) are composed of eighty vertices, one hundred and twenty edges, and forty-two faces. The faces are composed of two decagons, ten octagons, ten hexagons, and twenty 4-sided polygons. The polyhedron 110 is composed of decagons 122a, non-planar octagons 121a, planar non-regular hexagons 120a, and parallelograms 77a and 77'a, all bounb by straight edges 75a and 123a. The polyhedron 113 (similar to 59) is composed of saddle decagons 122b, saddle octagons 121b, saddle hexagons 120b, and 4-sided ellipses 77b and 77'b, all bound by curved edges 75b and 123b. The polyhedron 116 is composed of saddle decagons 122c, saddle octagons 121c, saddle hexagons 120c, and 4-sided polygons 77c and 77'c, all bound by curved edges 75c and 123b.

In general, structures obtained by subdivision Type B are composed of 4n(n-1) vertices, 6n(n-1) edges and 2n(n-1)+2 faces, where n is any number greater than two. Alternatively, the number of vertices equals 4F, the number of edges equals 6F and the number of faces equals 2F+2.

7. Subdivision Type C

In this type of subdivision (FIGS. 8A–P) each parent zonohedral face is converted into a parallelogram by joining the mid-points of the adjacent edges. This type of subdivision is equivalent to a truncation at mid-edge. This is shown in 124 (FIG. 8A) with a single parent parallelogram 67, as in the previous example. The mid-points 60 of the parent edges 61 are joined to each other as shown by new edges 140a to make a new face 141a. The new edges 140a are parallel to the diagonals of 67 and also to the edges 69a of subdivision Type B, though this condition can be relaxed to obtain a less regular face. In 125 (FIG. 8B), this principle is extended to two adjacent parent faces 67 and 68, as before. The subdivision of both faces produces two new faces 141a and 141'a joined vertex-to-vertex at 60. In the curved variant 126 (FIG. 6C), the two new faces 141b and 141'b are ellipses that touch at 60 ann have convex curved edges 140b. In the other curved variant 127 (FIG. 8D), the new faces 141c and 141'c are composed of concave edges 140c.

In 128–130 (FIGS. 8E–G), the technique shown in 125 is extended over the 3-, 4- and 5-zonohedra 14, 15 and 16, respectively (the subdivision of the latter two surfaces is shown in part only), producing new parallelogram faces as marked. 14 is composed of 141a, 141'a and 141"a, 15 is composed of faces 142a, 142'a ans 142"a, and 16 is composed of faces 143a and 143'a. The corresponding derived polyhedra with straight edges are shown in 131–133 (FIGS. 8H–J). The corresponding derived polyhedra with curved edges using the technique in 126 are shown in 134–136 (FIGS. 8K–M) and polyhedra with concave edges using the technique in 127 are shown in 137–139 (FIGS. 8N–P). By this subdivision proces, the q-valent parent vertices are converted to q-sided faces in the derived structure, 3-valent vertices yield 3-sided faces, 4-valent vertices yield 4-sided faces, and so on.

Polyhedra 131 (FIG. 8H), 134 (FIG. 8K) and 137 (FIG. 8N) are composed twelve vertices, twenty-four edges and fourteen faces. They are variants of the familiar cuboctahedron. Polyhedron 131 of four types of new triangular faces 144a, 144'a, 144"a and 144'"a in addition to the parallelogram faces mentioned above. The edges 140a are straight and have six different lengths in the example shown. With a less irregular star, the variety of edge-lengths can be reduced. The curved variant 134 is composed of corresponding flat ellipses and convex triangles bound by edges 140b, and the variant 137 is composed of flat 4-sided concave polygons and concave triangles bound by edges 140c. In the curved variants, the face suffix 'a' is changed to 'b' and 'c', respectively, as before.

Polyhedra 132 (FIG. 8I), 135 (FIG. 8L) and 138 (FIG. 8O) are composed of twenty-four vertices, forty-eight edges and twenty-six faces. The three polyhedra are deformations of the familiar rhombicuboctahedron, a semi-regular Archimedean polyhedron. However, here the faces are non-regular, and in the curved variants, the edges and some faces are curved. The polyhedron 132 with straight edges 140a is composed of triangular faces 145a, 145'a, 145"a and 145'"a, and 4-sided polygonal faces 146a, 146'a and 146"a, in addition to the three types of parallelogram faces already mentione above. In the curved variant 135 bound by convex curved edges 140b, and variant 143 bound by concave curved edges 140c, the suffixes of corresponding faces are changed from 'a' to 'b' and 'c', respectively.

Polyhedra 133 (FIG. 8J), 136 (FIG. 8M) and 139 (FIG. 8P) are composed of forty vertices, eighty edges and firty-two faces. 133 is composed of two pentagonal faces 149a, twenty parallelogram faces 143a and 143'a, ten quagrilateral faces 148a and ten triangular faces 147a. In the variants 136 and 139, the corresponding face suffixes are changed from 'a' to 'b' and 'c', respectively, as before.

In general, structures obtained by subdivision Type C are composed of 2n(n-1) vertices, 4n(n-1) edges and 2n(n-1)+2 faces. Alternatively, the number of vertices equals 2F, the number of edges equals 4F and the number of faces equals 2F+2.

8. Subdivision Type D

This type of subdivision (FIGS. 9A–P) is obtained by placing two new vertices on every parent edges and joining adjacent vertices by new edges thereby converting the parent parallelogram face into a non-regular octagon. In 150 (FIG. 9A), on every edge 61 of the parent face 67 two new vertices 166 are placed and joined by edges 167 along the parent edge, and 168a parallel to the diagonals, to obtain a new face 169a. The new vertices can be conveniently placed symmetrically around the mid-point 60 of the parent edge, though this condition can be relaxed to obtain a less regular octagon. The new inclined edges 168a are parallel to the diagonals of 67 and also to the edges 69a and 140a of subdivision Types B and C. The process is similar to a truncation of the vertices of a zonohedron. In 151 (FIG. 9B), this principle is extended to two parent faces as before. The two new faces 169a and 169'a share a common edge 67. In 152 (FIG. 9C), the two new faces have convex curved edges 168b alternating with the straight edges 167. In 153 (FIG. 9D), concave curved edges 168a alternate with the straight edges 167.

The principle is extended to all faces of the zonohedra 14, 15 and 16 in 154–156 (FIGS. 9E–G; shown partially in 155 and 156). In 154 (FIG. 9E), the new faces 169a, 169'a and 169"a are introduced, in 155 (FIG. 9F) the new faces 170a, 170'a and 170"a are introduced, and in 156 (FIG. 9G) faces 171a and 171'a are introduced. These faces carry over to the derived polyehdra 157–159 (FIGS. 9H–J) composed of straight edges 167 and 168a, and where additional q-sided faces are introduced at positions corresponding to the parent vertices. In the curved variants 160–162 (FIGS. 9K–M) bound by straight edges 167 and convex curved edges 168b, the suffix 'a' is replaced by 'b' in corresponding faces. In the variants 163–165 (FIGS. 9N–P) bound by straight edges 167 and concave curved edges 168c, 'a' is again replaced by 'c' in corresponding faces. This type of subdivision converts parent faces into octagons, and parent q-valent vertices into q-sided polygons.

The polyhedra 157 (FIG. 9H), 160 (FIG. 9K) and 163 (FIG. 9N; n=3 derivatives), are composed twenty-four vertices, thirty-six edges and fourteen faces. The faces are non-regular and comprise six octagons and eight triangles. The polyhedron 157 is a deformation of the familiar truncated cube, but here the faces are non-regular and the lengths unequal. Further, in the variants 160 and 163, the some edges and triangular faces are curved. The polyhedron 157 is composed of four types of triangles 172a, 172'a, 172"a and 172"a in addition to the three types of octagons already mentioned above. In the curved variants 160 and 163, the face suffix 'a' is replaced by 'b' and 'c', respectively.

The polyhedra 158 (FIG. 9I), 161 (FIG. 9L) and 164 (FIG. 9O); n=4 derivatives) are composed of forty-eight vertices, seventy-two edges and twenty-six faces. The faces comprise twelve octagons corresponding to the parent faces, six 4-sided polygons corresponding to the parent 4-valent vertices (q=4), and eight triangles corresponding to the parent 3-valent vertices (q=3). The polyhedron 158 is composed of non-regular octagons 170a, 170'a and 170"a, non-planar quadrilaterals 174a, 174'a and 174"a, and scalene triangles 173a, 173'a, 173"a and 173"a. In the curved variants 161 and 164, the face suffix 'a' is replaced by 'b' and 'c', respectively, in the corresponding faces.

The polyhedra 159 (FIG. 9J), 162 (FIG. 9M) and 165 (FIG. 9P; n=5 derivatives) are composed of eighty vertices, one hundred and twenty edges, and fifty-two faces. The faces comprise twenty octagons corresponding to the parent faces, two decagons corresponding to the parent 5-valent vertices (q=5), ten 4-sided polygons corresponding to the parent 4-valent vertices (q=4), and ten triangles corresponding to the parent 3-valent vertices (q=3). The polyhedron 159 is composed of non-regular octagons 171a and 171'a, quadrilaterals 176a and isoceles triangles 175a. In the curved variants 162 and 165, the face suffix 'a' is replaced by 'b' and 'c', respectively, in the corresponding faces.

In general, structures obtained by subdivision Type D are composed of 4n(n-1) vertices, 6n(n-1) edges and 2n(n-1)+2 faces. The faces comprise n(n-1) octagons and n(n-1)+2 q-sided polygons. Alternatively, the number of vertices equals 4F, the number of edges equals 6F and the number of faces equals 2F+2 which includes F octagons and F+2 q-sided polygons.

9. Subdivision Type E

Subdivision Type E (FIGS. 10A–P) is obtained by shrinking the original parallelogram face to a new face, and then connecting the adjacent new faces to produce a contiguous structure. In 178 (FIG. 10A), the new face 196a is bound by four new edges 195a and four new vertices 194. The new vertices lie along the diagonal of the parent face 67, anywhere between the parent vertex and mid-point of the parent face. In 179 (FIG. 10B), this principle is extended to two adjacent parent faces 67 and 68. The faces 196a and 196'a are joined by another new face 197a bound by two pairs of opposite and parallel edges 195a and 198a. The edges 198a are parallel to the edges 62a in subdivision Type A and 75a in Type B. The face 197a corresponds to a truncation of the parent edge 61. In the curved case 180 (FIG. 10C), the faces 196b and 196'b are ellipses composed of convex curved edges 196b, and the connecting convex face 197b is bound by edges 197b and 198b. In the curved case 181 (FIG. 10D), the faces 196c and 196'c are 4-sided concave polygons bound by edges 196c, and the connecting concave face 197c is bound by edges 196c and 198c.

In 182–184 (FIGS. 10E–G), the shrunken parallelogram faces are placed over the entire zonohedra 14, 15 and 16. Thus there is one shrunken parallelogram face for every parent face in this type of subdivision. These faces are marked and carried over to the derived structures in 185–187 (FIGS. 10H—J). In addition to these faces, each parent edge is converted into a new parallelogram face, and each q-valent vertex is converted into a q-sided face. The structures 185–187 are bound by straight edges 195a and 198a and the faces are maked with a suffix 'a'. The curved variants in 188–190 (FIGS. 10K–M) are bound by edges 196b and 198b and the corresponding face suffix is changed to 'b'. The curved variants 191–193 (FIGS. 10N–P) are bound by edges 196c and 198c, and the corresponding face suffix is changed to 'c'.

The polyhedra 185 (FIG. 10H), 188 (FIG. 10K) and 181 (FIG. 10N; n=3 derivatives) are composed of twenty four vertices, forty-eight edges and twenty-six faces. The faces comprise eight triangles and remaining eighteen faces are 4-sided polygons in two sets, one containing six and the other containing eight polygons. These polyhedra are analogous to the rhombi-cuboctahedron, a familiar Archimedean polyhedron, with the difference that here the faces are non-regular and the lengths unequal. The polyhedron 185 is composed of triangles 201a, 201'a, 201"a and 201"'a, parallelograms 196a, 196'a and 196"a, and another set comprising pairs of six different parallelograms 197a, 197'a, 197"a, . . . . In the curved variants 188 and 191, the face suffix is changed from 'a' to 'b' and 'c', repectively, in corresponding faces. 188 is composed of flat and convex curved faces having convex edges, and 191 is composed of flat and concave faces having concave edges.

The polyhedra 186 (FIG. 10I), 189 (FIG. 10L) and 192 (FIG. 10O; n=4 derivatives) are composed of forty-eight vertices, ninety-six edges and fifty faces. The faces comprise eight triangles corresponding to the parent 3-valent vertices (q=3), six 4-sided polygons corresponding to the parent 4-valent vertices (q=4), twenty-four parallelograms corresponding to the parent edges, and twelve parallelograms corresponding to the parent faces. The polyhedron 186 is composed of triangles 202a, 202'a, 202"a and 202'"a, quadrilaterals 203a, 203'a and 203"a, parallelograms 199a, 199'a, and 199"a, and another set of six types of parallelograms comprising 204a, 204'a, 204"a, . . . . In the curved variants 189 and 192, the face suffix is changed from 'a' to 'b' and 'c', repectively, in corresponding faces. 189 is composed of flat and convex curved faces having convex edges, and 192 is composed of flat and concave faces having concave edges.

The polyhedra 187 (FIG. 10J), 190 (FIG. 10M) and 193 (FIG. 10P; n=5 derivatives) are composed of one hundred vertices, one hundred and sixty edges and eighty-two faces. The faces comprise ten triangles corresponding to the parent 3-valent vertices (q=3), ten 4-sided polygons corresponding to the parent 4-valent vertices (q=4), two pentagons corresponding to the parent 5-valent vertices, forty parallelograms corresponding to the parent edges, and twenty additional parallelograms corresponding to the parent faces. The polyhedron 187 is composed of triangles 205a, 205'a, 205"a and 205'"a, quadrilaterals 206a, parallelograms 208a, 208'a and 208"a, parallelograms 200a and 200'a, and pentagons 207a. In the curved variants 190 and 193, the face suffix is changed from 'a' to 'b' and 'c', repectively, in corresponding faces. 190 in composed of flat and convex curved faces having convex edges, and 193 is composed of flat and concave faces having concave edges.

In general, structures obtained by subdivision Type E are composed of 4n(n-1) vertices, 8n(n-1) edges and 4n(n-1)+2 faces. The faces comprise 3n(n-1) 4-sided polygons, n(n-1)+2 q-sided polygons. Alternatively, the number of vertices equals 4F, the number of edges equals 6F and the number of faces equals 2F+2 which includes 3F 4-sided polygons and F+2 q-sided polygons.

10. Subdivision Type F

Subdivision Type F (FIGS. 11A–P) is obtained by placing a shrunken octagon having edges parallel to the parent edges and diagonals of parent faces, and then connecting the adjacent octagons with new faces to produce a contiguous structure. In 208 (FIG. 11A), the new face 227a, a non-regular octagon, is bound by two sets of four edges, one set 225a parallel to the parent edge 61, and the other set 226a parallel to the parent diagonal 94. The edges connect eight vertices 224 where each vertex is located anywhere within one-eighth triangular segment of the parent face shown here by the dotted lines. The shrunken octagon is similar to the octagonal faces 169a obtained by subdivision Type D. In 209 (FIG. 11B), this principle is extended to two adjacent parent faces 67 and 68. The faces 227a and 227'a are joined by another new face 231a bound by two pairs of opposite and parallel edges 225a and 228a. The edges 228a are parallel to the edges 62a in subdivision Type A, and also to 75a in Type B and 198a in Type E. The face 231a corresponds to a truncation of the parent edge 61 and is similar to 197a in Type E. In the curved case 210 (FIG. 11C), the faces 227b and 227'b are ellipses composed of convex curved edges 225b and 226b, and the connecting convex face 228b is bounded by edges 225b and 228b. In the curved case 211 (FIG. 11D), the faces 227c and 227'c are 4-sided concave polygons bound by concave edges 225c and 226c, and the connecting concave face 231c is bound by edges 225c and 228c.

In 212–214 (FIGS. 11E–G), the shrunken octagons are placed over the entire zonohedra 14, 15 and 16, one on each parent face. These faces are marked and carried over to the derived structures in 215–217 (FIGS. 11H–J). In addition to these faces, each parent edge is converted into a new parallelogram face, and each q-valent vertex is converted into a 2q-sided face. The structure 215–217 are bound by three types of straight edges 225a, 226a and 228a and the faces are maked with a suffix 'a'. The curved variants in 218–223 (FIGS. 11K–M) are bound by convex curved edges and the corresponding face and edge suffixes are changed to 'b'. The curved variants 221–223 (FIGS. 11N–P) are bound by concave edges 196c and 198c, and the corresponding face and edge suffixes are changed to 'c'.

The polyhedra 215 (FIG. 11H), 218 (FIG. 11K) and 221 (FIG. 11N; n=3 derivatives) are composed of forty-eight vertices, seventy-two edges and twenty-six faces. The faces comprise six octagons, eight hexagons and twelve 4-sided polygons. These polyhedra are analogous to truncated cuboctahedron, a familiar Archimedean polyhedron, with the difference that here the faces are non-regular and the lengths unequal. The polyhedron 215 is composed of octagons 227a, 227'a and 227"a, hexagons 230a, 230'a, 230"a and 230'"a, and six different parallelograms 231a, 231'a, 231"a, . . . . In the curved variants 218 and 221, the face suffix is changed from 'a' to 'b' and 'c', repectively, in corresponding faces. 218 is composed of flat and convex curved faces having convex edges, and 221 is composed of flat and concave faces having concave edges.

The polyhedra 216 (FIG. 11I), 219 (FIG. 11L) and 222 (FIG. 11O; n=4 derivatives) are composed of ninety-six vertices, one hundred and forty-four edges and fifty faces. The faces comprise eight hexagons corresponding to the parent 3-valent vertices (q=3), six non-planar octagons corresponding to the parent 4-valent vertices (q=4), twenty-four parallelograms corresponding to the parent edges, and twelve planar octagons corresponding to the parent faces. The polyhedron 216 is composed of hexagons 233a, 233'a, 233"a and 233'"a, octagons 228a, 228'a and 228"a, and another set of six types of parallelograms comprising 235a, 235'a, 235"a, . . . . In the curved variants 219 and 222, the face suffix is changed from 'a' to 'b' and 'c', repectively, in corresponding faces. 219 is composed of flat and convex curved faces having convex edges, and 222 is composed of flat and concave faces having concave edges.

The polyhedra 217 (FIG. 11J), 220 (FIG. 11M) and 223 (FIG. 11P; n=5 derivatives) are composed of one hundred and sixty vertices, two hundred and forty edges and eighty-two faces. The faces comprise ten hexagons corresponding to the parent 3-valent vertices (q=3), ten non-planar octagons corresponding to the parent 4-valent vertices (q=4), two decagons corresponding to the parent 5-valent vertices, forty parallelograms corresponding to the parent edges, and twenty planar octagons corresponding to the parent faces. The polyhedron 217 is composed of decagons 238a, octagons 237a, 229a and 229'a, hexagons 236a, 236'a, 236"a and 236'"a, and parallelograms 239a, 239'a and 239"a. In the curved variants 220 and 223, the face suffix is changed from 'a' to 'b' and 'c', repectively, in corresponding faces. 220 is composed of flat and convex curved faces having convex edges, and 223 is composed of flat and concave faces having concave edges.

In general, structures obtained by subdivision Type F are composed of 8n(n-1) vertices, 12n(n-1) edges and 4n(n-1)+2 faces. The faces comprise n(n-1) octagons, 2n(n-1) 4-sided polygons, n(n-1)+2 q-sided polygons. Alternatively, the number of vertices equals 8F, the number of edges equals 12F and the number of faces equals 4F+2 which includes F octagons, 2F 4-sided polygons, F+2 q-sided polygons.

11. Subdivision Type G

Subdivision Type G (FIGS. 12A–P) is obtained by placing a diagonal on each parent face such that the diagonals make up a contiguous structure. This procedure is equivalent to joining all alternating vertices of a zonohedron. Since each parallelogram has two diagonals, this subdivision has two types: G1 and G2. Type G1 is shown in 240 (FIG. 12A) where the diagonal 256 connects a pair of opposite vertices 256 of the parent face 67. In 241 (FIG. 12B), the procedure is extended to two adjacent parent faces 67 and 68 such the diagionals 256 and 256' are connected. Type G2 is shown in 242 (FIG. 12C) where the second diagonal 258 connects the second pair of vertices 259. In 243 (FIG. 12D), the procedure is extended to two adjacent faces to generate diagonals 258 and 258' connected as shown. The two procedures are further extended to the visible faces of the zonohedra 14, 15 and 16. This is shown in 244–246 (FIGS. 12E—G) for Type G1, and in 247–249 (FIGS. 12H–J) for Type G2. The full derived structures for the two types are shown in 250–252 (FIGS. 12K–M) and 253–255 (FIGS. 12N–P), respectively. The structures derived from the two types are reciprocal polyhedra or topological duals of one another. The number of vertices and faces in the two are interchanged but the number of edges remain unchanged.

Type G1: 244 (FIG. 12E) shows three diagonals 256, 256' and 256" placed on the three visible faces of the 3-zonohedron 14. These three edges, along with the three from the opposite diagonals (shown later in 247) make up the six types of edges of the derived structure 280. 245 (FIG. 12F) shows four types of diagonals 260, 260', 260" and 260'" placed on the visible faces of the 4-zonohedron 15. These are the four different edges of the derived structure 251 (FIG. 12L). 246 shows four types of diagonals 261, 261', 263 and 263' placed on the visible faces of the 5-zonohedron 16. These make up the four different edges of the derived structure 252 (FIG. 12M).

The structure 250 (FIG. 12K), a non-regular tetrahedron (n=3 derivative), is composed of four different triangles 264, 264', 264" and 264'" corresponding to the four different 3-valent vertices of 14. It is composed of six edges 256, 256' and 256" towards the front and 258, 258' and 258" in the back. The structure 251 (n=4 derivative) is a non-regular octahedron composed of pairs of four types of faces 265, 265', 265" and 265'". The structure 252 (FIG. 12M; n=5 derivative is composed of eleven vertices, twenty edges and eleven faces. The faces comprise five triangles 266 corresponding to the parent 3-valent vertices, five quadrilaterals 267 corresponding to the parent 4-valent vertices, and one pentagon 268 corresponding to the parent 5-valent vertex.

Type G2: 247 (FIG. 12H) shows three other diagonals 258, 258' and 258" placed on the three faces of 14. These three, along with the three edges shown earlier in 271 make up the six edges of the derived structure 253 (FIG. 12N). 248 shows four types of diagonals 260', 260'", 262 and 262' placed on the faces of 15. These four make up the edges of the derived structure 254 (FIG. 12O). 249 shows four types of diagonals 261, 261', 263 and 263' placed on the faces of the 5-zonohedron 16. These four make up the edges of the derived structure 255 (FIG. 12P).

The structure 253, the dual of 250, is the same non-regular tetrahedron composed of the same four triangles and same six edges as 250, though arranged in a different orientation. 253 and 250 are self-duals. The structure 251, the dual of 251, is a non-regular hexahedron composed of faces 4-sided polygonal faces 269, 269' and 269". It is also composed of six different diagonals, 262, 262', 262", . . . . The structure 252 is also self-reciprocal and is composed of the same types of faces and edges as 252.

In general, subdivision Type G produces two dual sets of structures with edges equal to n(n-1) or F. The number of faces and vertices depend on the topology of the zonohedron, i.e. the number and types of vertex-valencies, but the sum of faces and vertices in the two types remains the same.

12. Subdivision Type H

Subdivision Type H (FIGS. 13A–P) is obtained by placing a shrunken diagonal on every parent face and joining adjacent vertices to make a contguous structure. As in Type G, the two sets of diagonals lead to two types of corresponding subdivisions, Types H1 and H2. This type of subdivision is equivalent to a truncation of the vertices of the structures derived by Type G and converts one set of alternating parent q-valent vertices into q-sided polygons and the second set of alternating parent q-valent vertices into 2q-sided polygons.

The technique of derivation of Type H1 is shown in 270 (FIG. 13A). A new shrunken diagonal 286 bound by new vertices 287 is placed on the parent face. In 271 (FIG. 13B), the concept is extended to two parent faces 67 and 68. The two new edges 286 and 286' are connected by a third new edge 288. 288 is parallel to the edge 62a in Type A and to corresponding edges in Types B, E and F. The technique for Type H2 is shown in 272 (FIG. 13C). A new edge 289 bound by two new vertices 290 are placed on the opposite diagonal of 67. In 273 (FIG. 13D), the two new edges 289 and 289' are joined by 291 which is parallel to 288. These two techniques are applied to the visible faces of zonohedra 14, 15 and 16 in 274–279 (FIGS. 13E–G) to derive the two sets of structures in 280–285.

Type H1: 274 (FIG. 13E) shows three shrunken diagonals 286, 286' and 286" placed on the three visible faces of the 3-zonohedron 14. These three edges, along with the three from the opposite diagonals (shown later in 277) make up the six types of edges of the derived structure 280 (FIG. 13K). 275 (FIG. 13F) shows four types of diagonals 292, 292', 292" and 292'" placed on the visible faces of the 4-zonohedron 15. These are the four different edges of the derived structure 281 (FIG. 13L). 276 (FIG. 13G) shows four types of diagonals 292, 293', 293 and 293' placed on the visible faces of the 5-zonohedron 16. These make up the four different edges of the derived structure 282 (FIG. 13M).

The structure 280 (n=3 derivative), a non-regular truncated tetrahedron, is composed of twelve vertices, eighteen edges and eight faces. The faces comprise four triangles 295, 295', 295" and 295'" corresponding to the four parent 3-valent vertices and hexagons 296, 296', 296" and 296'" corresponding to the alternating 3-valent vertices of 14.

The structure 281 (n=4 derivative) is a non-regular truncated octahedron composed of twenty-four vertices, thirty-six edges and fourteen faces. The faces comprise six quadrilaterals of type 297, 297" and 297" corresponding to the parent 4-valent vertices and eight hexagons of type 298, 298', 298" and 298'" corresponding to the alternating parent 3-valent vertices.

The structure 282 (n=5 derivative) is composed of forty vertices, sixty edges and forty-two faces. The faces comprise two sets of polygons, one from each set of alternating vertices. The first set includes q-sided polygons for q-valent vertices, i.e. five triangles 299 corresponding to the parent 3-valent vertices, five quadrilaterals 300 corresponding to the parent 4-valent vertices and one pentagon 301 corresponding to the parent 5-valent vertex. The second set includes 2q-sided polygons corresponding to the alternating q-valent vertices, i.e. one decagon 302 for the 5-valent vertex, five non-regular non-planar octagons 303 for the 4-valent vertices and five hexagons 304 for the 3-valent vertices.

Type G2: 277 (FIG. 13H) shows three opposite diagonals 289, 289' and 289" placed on the three faces of 14. 278 (FIG. 13I) shows four types of diagonals 292', 292", 294 and 294' placed on the faces of 15. These four make up the edges of the derived structure 284 (FIG. 13O). 279 (FIG. 13J) shows four types of diagonals 293, 293', 293" and 293" placed on the faces of the 5-zonohedron 16. These four make up the edges of the derived structure 285 (FIG. 13P).

The structure 283 (FIG. 13N), the reciprocal of 280, is the same non-regular truncated tetrahedron composed of the same four triangles and four hexagons arranged in a different orientation. The structure 284, the reciprocal of 281, is a non-regular truncated cube composed of eight triangles 305, 305', 305" and 305'" corresponding to the parent 3-valent vertices and six non-regular non-planar octagons 306, 306' and 306" corresponding to the parent 4-valent vertices. The structure 285 is self-reciprocal with 282 and is composed of the same number and types of vertices, edges and faces as 282.

In general, structures obtained by subdivision Type G are composed of 2n(n-1) vertices, 3n(n-1) edges and n(n-1)+2 faces. Alternatively, the number of vertices equals 2F, the number of edges equals 3F and the number of faces equals F+2.

13. Subdivision Type I

Subdivision Type I (FIGS. 14A–P) is obtained by placing a shrunken edge on every face of a zonohedron along the line joining the mid-point of the opposite edges of each face. The shrunken edges are bound by two vertices and are placed in a cyclic order, clockwise or counter-clockwise, around the parent vertices. A vertex on one face is joined to two vertices on an adjacent face. The structure obtained has a cyclic order of edges and faces with respect to the parent zonohedron.

In 307 (FIG. 14A), a shrunken edge 323a bound by two vertices 324 is placed along the line 62 joining the mid-points 60 of the parent edge 61. In 308 (FIG. 14B), this procedure is applied over two adjacent parent faces 67 and 68 by placing new edges 323a and 323'a, one on each face. One vertex of edge 323a is connected to two vertices of the edge 323'a by two new edges 324a making a new triangular face 325a. In 309 (FIG. 14C), a curved variant of with convex edges is shown. The edge and face suffixes 'a' are replaced by 'b'. In the variant 310 (FIG. 14D), composed of concave edges the corresponding suffixes are replaced by 'c'. Note that in 309, the curved edge 323b is at a tangent to the face 67 and the vertices 324' are below the parent face planes. In 323c, the vertices remain co-planar with 67 and the edge 323c sags in the middle. Interesting variants would be to use combination of straight edges 323a and curved edges 324b or 324c.

In 311–313 (FIGS. 14E–G), the procedure is applied to all visible faces of the 2-, 4- and 5-zonohedra and the edges are connected around one q-valent vertex. In each case, the edges are arranged in a counter-clockwise manner. In 311 (FIG. 14E), three edges 323a, 323'a and 323"a are placed on three faces of 14 and connected by edges 324a to produce a new triangular face 326a surrounded by three additional triangular faces 325a, 325'a and 325"a arranged cyclically. The face 326a corresponds to the parent 3-valent vertex 64. In 312 (FIG. 14F), four new edges 327a, 327'a, 327"a and 327"'a are placed on the faces of 15. In one region corresponding to the 3-valent parent vertex 64, the new edges are connected in a clockwise manner by edges 324a to produce a new triangular face 330a surrounded by three triangular faces 329a, 329'a and 329"a. In 313 (FIG. 14G), two new edges 328a and 328'a are placed on the faces of 16. In one region corresponding to the 3-valent parent vertex 64, the new edges are connected in a clockwise manner by edges 324a as before to produce a new triangular face 332a surrounded by three triangular faces 331a and 331'a. When the procedure is extended over the entire zonohedron, the structures 314–316 (FIGS. 14H–J) are generated. The corresponding curved variants 317–322 (FIGS. 14K–P) are obtained by applying the procedure shown in 309 and 310.

The polyhedra 314, 315 and 316 (n=3 derivatives) are composed of twelve vertices, thirty edges and twenty faces and are deformed variants of the well-known regular icosahedron. The faces comprise eight triangles corresponding to the parent 3-valent vertices and twelve additional triangle corresponding to the parent edges. The non-regular icosahedron 314 (FIG. 14H) is composed of pairs of triangles 326a, 326'a, 326"a and 326"'a, and pairs of six different triangles 325a, 325'a, 325"a, . . . . It is bound by edges six edges 323a and twenty-four edges 324a. In the curved variants 317 (FIG. 14K) and 320 (FIG. 14N) the suffixes of corresponding elements are changed from 'a' to 'b' and 'c', repectively. 317 is composed convex curved faces having convex edges, and is an ellipsoidal icosahedron inscribed within a parallelopiped. 320 is composed of concave faces having concave edges.

The polyhedra 315 (FIG. 14I), 318 (FIG. 14L) and 321 (FIG. 14O; n=4 derivatives) are composed of twenty-four vertices, sixty edges and thirty-eight faces. The faces comprise eight triangles corresponding to the parent 3-valent vertices (q=3), six 4-sided polygons corresponding to the parent 4-valent vertices (q=4), twenty-four triangles corresponding to the parent edges. These polyhedra are analogoue to the known snub cube. The polyhedron 315 is composed of four types of triangles 330a, 330'a, 330"a and 330'"a, six quadrilaterals 334a, 334'a and 334"a, and another set of triangles comprising 329a, 329'a, 329"a, . . . . In the curved variants 318 and 321, the face suffix is changed from 'a' to 'b' and 'c', repectively. 318 is composed of convex curved faces having convex edges and is an example of a smooth surface inscribed within a rhombic dodecahedron. 321 is composed of concave faces having concave edges.

The polyhedra 316 (FIG. 14J), 319 (FIG. 14M) and 322 (FIG. 14P; n=5 derivatives) are composed of forty vertices, one hundred edges and sixty-two faces. The faces comprise ten triangles corresponding to the parent 3-valent vertices (q=3), ten 4-sided polygons corresponding to the parent 4-valent vertices (q=4), two pentagons corresponding to the parent 5-valent vertices, and an additional eighty triangles corresponding to the parent edges. The polyhedron 316 is composed of triangles 332a, 332'a, 332"a and 332"'a, quadrilaterals 335a, pentagons 336a, and a set of triangles 331a, 331'a and 331"a. In the curved variants 319 and 322, the face suffix is changed from 'a' to 'b' and 'c', repectively. 319 is composed of convex curved faces having convex edges and defines a smooth surface inscribed within a rhombic icosahedron. 322 is composed of concave faces having concave edges.

In general, structures obtained by subdivision Type I are composed of 2n(n-1) vertices, 5n(n-1) edges and 3n(n-1)+2 faces. The faces comprise n(n-1)+2 q-sided polygons and 2n(n-1) triangles. Alternatively, the number of vertices equals 2F, the number of edges equals 5F and the number of faces equals 3F+2 which includes F+2 q-sided polygons and 2F triangles.

14. Other Subdivisions

Though nine different types of subdivisions have been described in detail, a large number of alternative subdivisions can be derived using similar or variant techniques. Miscellaneous examples are shown in FIGS. 15A–X for a single parallelogram face of a zonohedron. This enlarges the scope of the present invention.

337 (FIG. 15A) is an edge-truncated case where the small parallelogram 196a, corresponding to Type E, is surrounded by four half-hexagonal faces 360. In 338 (FIG. 15B), the parent face 67 is truncated at two opposite ends to produce the non-regular hexagon 370. In 339 (FIG. 15C), the parent face 67 is truncated at three corners as shown to produce a non-regular pentagon 371. 340–342 (FIGS. 15D–F) are alternative ways to truncate all four corners of parent face 67 producing non-regular octagons and are variants of the octagon 169a of Type D. 372 and 374 retain the parallelism of the opposite edges but the edge lengths are unequal. In 373, the parallelism is lost. 343 (FIG. 15G) is a variant of 339 showing a pentagon 375 with non-parallel edges. 344 (FIG. 15H) shows a quadrilateral as a variant of the parallelogram face 196a of Type E. 345 (FIG. 15I) shows a rotated parallelogram 377 as a rotary variant of 141a of Type C. 346 (FIG. 15J) shows a rotated parallelogram 378 as a variant of 196a of Type E. 347 (FIG. 15K) shows a rotated parallelogram 379 with extended edges 380 as a rotary variant of 337.

348 (FIG. 15L) shows a rotated edge 381 on the parent face 67. 349 (FIG. 15M) shows a rotated shrunken edge 382 on the parent face 67 as a rotary variant of th ecorresponding edge in Types H and I. 350 (FIG. 15N) shows the rotated edge 381 with arms 384 in a 2-fold symmetry. 351a (FIG. 15O) shows rotated edge 381 overlaid with a second rotated edge 385 superimposed such that the outer vertices define the rotated parallelogram 377. 351 (FIG. 15P) shows vertex 386 located at an arbitrary position on the parent face 67 and connected to the four parent vertices.

352–359 (FIGS. 15Q–X) show combinations obtained by superimposing two different types. In 352 (FIG. 15Q), the rotated parallelogram 377 is combined with the edge 381. In 353–359, the outer edges 61 of the parent face are used as elements of the new subdivision. In 353–355 (FIGS. 15R–T), the edges 61 are combined with 381, 382 and 258, respectively. 355 is especially useful since it triangulates every prallelogram face of the zonohedron, a requirement for stabilizing hinged zonohedral space frames. In 356 (FIG. 15U), the rotated cross edges 381 and 385 are superimposed over 61. In 357 (FIG. 15V), the rotated parallelogram 377 is superimposed over 61. In 358 (FIG. 15W), new edges 390 are superimposed over 61 and define a hexagon 389. In 359 (FIG. 15X), the mid-edge 382 and the parallelogram 141a of Type C are superimposed over 61 producing an alternative triangulation of the parallelogram face.

FIGS. 16A–F show a few different subdivisions of the non-convex zonohedron 18 of FIG. 2E. 391 (FIG. 16A) is obtained by applying subdivision Type D over the entire front and back surfaces. In this example, 3-sided, 4-sided and 5-sided polygons are produced by the vertex truncation, and the parent face are converted to various octagons. 392 (FIG. 16B) is obtained by applying subdivision Type C. The new structure is composed of vertex polygons similar to those in 391 and various rectangles. 393 (FIG. 16C) is obtained by applying subdivision technique Type I; the parent zonohedron 18 is shown in dotted lines. The structure is composed of skewed vertex polygons surrounded by triangles. 394 (FIG. 16D) is obtained by applying the subdivision 354 shown in FIG. 15S by inserting mid-edges 382 on every rhombic face. The new structure is like a zonohedral parquet tiling. 395 (FIG. 16E) is obtained by applying subdivision 338 of FIG. 15B. In this case, only the alternating parent vertices are truncated while in 391 all parent vertices are truncated. The derived structure is composed of hexagonal faces 370', 370" and 370''', and four types of vertex polygons. 396 (FIG. 16F) shows the application of subdivision 355 by introducing diagonals 258 and 258' producing an all triangulated non-convex zonohedron.

15. Structures with Digonal Faces

This section describes a special class of structures derived from subdivisions described earlier. Though the method described here extends to all types of subdivision, the special focus is on Types G, H, I. The latter three are the only examples where the parent parallelogram face has been transformed to an edge. In space-fillings of derivative structures, which are here based on space-fillings of zonohedra packed face-to-face, the derived structures must pack edge-to-edge since the derivative edges lie on parent faces. Thus when Type G, H or I derivatives are used as modules for space-fillings, edge-to-edge packings result. Though this may be advantageous in some cases, a face-to-face contact between adjacent cells is usually more desirable. It facilitates an area of contact between two cells thus permitting better force transmission and stability, and allows the possibility of connecting the interior spaces of two adjacent cells with an opening through the face of contact. For subdivision Types G, H and I, this can be achieved by converting the edges of contact into digonal faces; 'digons' are two-sided and two-vertexed polygons with convex edges, like the shape of an eye or the section of a lens.

FIGS. 17A–T show examples of five different classes of structures composed of digonal faces co-planar with the parent faces. In the derivative structures, all digons of one type are marked alike disregarding the differences in the vertex-to-vertex lengths (i.e. diagonals of digons) and curvatures of edges. This will vary from face to face, and from structure to structure.

In 397 (FIG. 17A), a digon 397 is shown. The face angle of the digon, i.e. the angle between the two edges 418, is any angle greater than 0°. When this angle is less than 180°, the digon has "pointed" ends. When this angle is 180°, the digon is a continuous closed curve like an ellipse. When this angle is greater than 180°, the digon has a foliate look resembling a 2-leaf clover.

397 is based on subdivision Type G. The diagonal 256 (dotted line) is converted into a digon 417 bound by two vertices 257 and two curved edges 418. Applying this over the faces of the 3-zonohedron 14 generates 398 (FIG. 17B) which is a derivative of 250. It is an edge-truncated non-regular curved tetrahedron composed of six digonal faces 417 and four triangles 419. 399 (FIG. 17C), a derivative of 251, is a non-regular octahedron composed of twelve digonal faces 417 and eight curved triangles 420. 400 (FIG.

17D), a derivative of 254, is a non-regular hexahedron composed of twleve digons 417 and six curved 4-sided polygons 421.

401 (FIG. 17E), based on subdivision Type H has a shrunken digon 422 placed along the diagonal 256 (dotted line). The vertices 287 of the digon correspond to the vertices of polyhedra in FIGS. 13K–M. Applying this over the faces of the 3-zonohedron 14 generates 402 (FIG. 17F) which is a derivative of 280. It is an edge-truncated non-regular curved truncated tetrahedron composed of six digonal faces 422, four concave triangles 423 and four saddle hexagons 424. 403 (FIG. 17G), a derivative of 281, is a non-regular truncated octahedron composed of twelve digonal faces 422, six concave 4-sided polygons 425, and saddle hexagons 426. 404 (FIG. 17H), a derivative of 284, is a non-regular vertex-truncated hexahedron composed of twelve digons 422, eight concave triangles 427 and six saddle octagons 428.

405 (FIG. 17I), based on subdivision Type I has a shrunken digon 429 placed along the diagonal 382 (dotted line). The vertices 324 of the digon correspond to the vertices of polyhedra in FIGS. 14H–J. Applying this technique over the faces of the 3-zonohedron 14 generates 406 (FIG. 17J) which is a derivative of 314. It is an edge-truncated non-regular curved icosahedron composed of six digonal faces 429, eight concave triangles of the type 326c and twelve triangles 325 related to 325c in 320. 407 (FIG. 17K), a derivative of 315, is a non-regular edge-truncated snub hexahedron composed of twelve digonal faces 429, six concave 4-sided polygons 334'c, eight triangles 330c and twenty-four triangles 329 related to 329c in 321. 408 (FIG. 17L) is topologically identical to 407; it has the opposite handedness and is composed of the alternate set of digons 329'.

409 (FIG. 17M), based on subdivision 348 of FIG. 15L has a rotated digon 430 placed along the rotated line 381 (shown dotted). It is bound by vertices 431 lying on the parent edges. 410–412 (FIGS. 17N–P) are topologically identical to 402–404, respectively, and have the same element count. The corresponding faces in 410–412 are marked with a suffix "r". The digons are arranged cyclically around the other curved faces, and saddle polygons have a rotary twist.

413 (FIG. 17Q) is a rotary variant of 410 and 405. The rotated digon 432, bound by vertices 433, is placed along the inclined line 434. 414–416(FIGS. 17R–T) are topologically identical to 402–404, and 410–412, respectively. The corresponding faces here are marked with a suffix "s".

16. Other Curved Variants

FIGS. 18A–K shows an assortment of examples which extend the scope of the invention. Examples shown include curved variants of structures described earlier.

433–440 are curved variants of structures shown earlier. 433 (FIG. 18A) is a curved variant of 251 (FIG. 12L) where the edges are curved by arcs 444 joining a pair of opposite parent vertices. 434 (FIG. 18B) is a curved variant of 250 (FIG. 12K) where each edge 445 is an S-shaped curve. 435 (FIG. 18C) is a curved variant of 251 and is also composed of S-shaped edges 445. 436 (FIG. 18D), a variant of 435, is a structure composed of a combination of curved triangles 446 and flat triangles 447. 437 (FIG. 18E), a variant of 314 or 320 (FIG. 114H), is composed of straight and curved edges where the straight edges 323 are co-planar with the parent faces. 438 (FIG. 18F), a variant of 219 (FIG. 11L), is composed of octagons 448 having concave and convex edges.

439 (FIG. 18G), derived from the 5-zonohedron 16, is composed of digons 449 having edges with two areas of negative curvature and with face angles of 0°. 440 (FIG. 18H), a variant of 112 or 115 (FIG. 7L or 7O), is composed of six 4-sided polygons 450 having a combination of convex and concave edges, along with eight hexagons. 441 (FIG. 18I) is a curved variant of 164 (FIG. 9O) and has no straight edges. 442 (FIG. 18J) is a derivative of 441, and has additional faces 451 in the middle of the parent faces. 443 (FIG. 18K) is a variant of 164 where the straight edges 167 of 164 have been converted into digons 452.

17. Space-Fillings

This section described a variety of space-fillings obtained by using many replicas of the polyhedral structures obtained by subdivisions. These structures act as cells of the space-filling. Space-fillings are useful in architecural layouts where modular units are used and in the design of space frames. Here, the space-fillings of parallelopipeds and zonohedra described in Section 3, and shown in FIGS. 3a and 3b, provide an underlying geometric framework for deriving such configurations. In these parent space-fillings, the zonohedra are packed face-to-face leaving no gaps. The parent space-fillings are composed of four types of elements: zonohedral parent cells, parallelogram parent faces, multi-valent parent edges where more than two cells meet, and multi-valent parent vertices where more than three edges meet. When subdivided polyhedra are used as modules for space-fillings, they replace every parent cell and are thus termed 'cell-polyhedra'. Similarly, the parent vertices are converted into new polyhedra termed 'vertex-polyhedra', the parent edges are converted into 'edge-polyhedra' and the faces are converted into 'face-polyhedra'. The space-fillings comprising the combination of these four types of polyhedra are correspondingly notated with a prefix C, V E or F, or a combination CF, VEF, etc. For example, C-space-filling is composed only of cell polyhedra, CF is composed of cell-polyhedra and face-polyhedra, VEF is composed of vertex-polyhedra, edge-polyhedra and face-polyhedra, and so on. In all there are fifteen distinct combinations of space-fillings from the four basic types of cells. The presence or absence of any combination of these four types of cells in a space-filling depends on the type of subdivision of the cell-polyhedron.

The examples shown here are restricted to cell obtained from the the nine types of subdivisions described earlier. Space-fillings using subdivided cells of Types A, B, C, D, H comprise cell-polyhedra and vertex-polyhedra (VC-spacefilling). Space-fillings using cells of Types E, F and I comprise cell-polyhedra, vertex-polyhedra and edge-polyhedra (VEC-space-filling). Space-fillings composed of cells of Type G comprise cell-polyhedra and alternating vertex-polyhedra corresponding to the alternating parent vertices (VC-spacefilling, alternate type). For each type, the derived space-fillings are periodic, non-periodic, or periodic in one direction and non-periodic in another, as in the parent space-fillings.

The next five sets of figures show miscellaneous examples of packings of a few cell-polyhedra. The vertex- and edge-polyhedra are not shown, and face-polyhedra are not used in these space-fillings. The face-polyhedron in such space-fillings has degenerated to a face-polygon. The types of face-polygons depend on the type of subdivided structures used and range from 2-sided digons, to 4-sided and 8-sided polygons. The vertex- and edge-polyhedra, are formed automatically as "left-over" spaced. In the description below, the same cell prefix has different suffixes, "a", "b", . . . indicating the differences in the geometry and proportion of the cells. This difference traces back to the differences between parent cells.

FIGS. 19A–F show six examples of portions of periodic space-fillings of n=3 structures based on space-fillings of 3-zonohedra (shown in FIGS. 3A–E). 453 (FIG. 19A) repeats the cell-polyhedron 185 of Type E as per the periodic lattice 21. 454 (FIG. 19B) repeats the curved variant 160 of Type D as per the periodic space-filling 23. Only three stacked cells are shown and it is easy to see how this stacking can be translated; the cells 160 zig-zag by reflections in the vertical direction. 455 (FIG. 19C) is a portion of a periodic zig-zag space-filling composed of cell-polyhedra 108a and 108b of Type B (shown here with 4-sided open faces), and arranged in a manner similar to 24. 456 (FIG. 19D) is a stacking of two cell-polyhedra 47 and 47a of Type A and can be repeated as per the lattice 23. 457 (FIG. 19E) is a periodic packing of cells 406 of Type I (earlier FIG. 17J) as per the lattice 21. 458 (FIG. 19F) is also based on the lattice 21 and is composed of digonal variants 458 of Type F.

FIGS. 20A–F shows six examples of portions of periodic space-fillings of n=4 structures based on space-filling 31 of 4-zonohedra (shown in FIG. 4A). 459 (FIG. 20A) uses 112 of Type B as the cell-polyhedra. 460 (FIG. 20B) is composed of cells 48 of Type B (earlier FIG. 5E). 461 (FIG. 20C) is composed of 164 of Type D. 462 (FIG. 20D) is composed of 219a of Type F used as cell-polyhedra (shown here with open octagonal faces). 463 (FIG. 20E) is composed of cell-polyhedra 186 of Type E. 464 (FIG. 20F) is composed of cell-polyhedra 216 of Type F.

FIGS. 21A–F show six examples of portions of non-periodic space-fillings based on the space-filling 30 of FIG. 3J. All cell-polyhedra are n=3 derivatives. 465 (FIG. 21A) is composed of cell-polyhedra 88a and 88b of Type A. 466 (FIG. 21B) is composed of cell-polyhedra 114a and 114b of Type B. 467 (FIG. 21C) is composed of cell-polyhedra 134a and 134b of Type C. 468 (FIG. 21D) is composed of cells 137a and 137b of Type C. 469 (FIG. 21E), a variant of 466, is composed of cells 440a and 440b of Type B. 470 (FIG. 21F) is composed of cell-polyhedra 185a and 185b of Type E.

FIGS. 22A–F show portions of six non-periodic space-fillings based on 27 in FIG. 3G. All cells are n=3 derivatives. 471 (FIG. 22A), taken from the parent application, is composed of saddle polyhedra 48a–d of Type A (from FIG. 5D) used as cell-polyehdra. 472 (FIG. 22B), also taken from the parent application, is composed of cell 57a–d of Type B (shown here with open elliptic faces). 473 (FIG. 22C) is composed of cells 114c–f of Type B and is topologically identical to 472. 474 (FIG. 22D) is composed of cells 108a–d of Type B (also shown with open square faces) and is also topologically identical to 472. 475 (FIG. 22E) is composed of cells 134c–f of Type C. 476 (FIG. 22F) is composed of cells 138c–f of Type C.

FIGS. 23A–H show five additional examples of, four non-periodic and one periodic configuration. 477 (FIG. 23A) is based on 38 of FIG. 4H and is composed of cells 158, 158a and 158b of Type D. These three can be repeated periodically or non-periodically. 478 (FIG. 23B) is based on 40 of FIG. 4J and is composed of cells 160b–d, 161a and 162 of Type D. 479 (FIG. 23C) is based on 32 of FIG. 4B and is composed of digonal variants 403 and 402 of Type G (FIGS. 17G and 17F). 480 is based on the non-periodic multi-layered space-filling of parallelopipeds corresponding to 29 of FIG. 3I. It is composed of cells 406a–d which are variants of 406 of FIG. 17J. 481–484 (FIGS. 23E–H) show an example of a layer from a honeycomb structure based on subdivision Type B applied to a multi-layered space-filling of rhombic prisms based on the Penrose tiling. The top and bottom faces of the rhombic prism are converted into ellipses to derive the cell 483 (FIG. 23G) such that the mid-plane rhombus is retained. 481 (FIG. 23F) shows units composed of the top half of 483, and 482 (FIG. 23F) shows the plan view. 484 (FIG. 23H) shows an alternative unit from the multi-layered honeycomb which is obtained by stacking units 483 or 484. Applications include tensile roof structures or honeycomb structure for sandwich panels.

18 Space Labyrinths

Labyrinths are a special class of space structures that are defined by a continuous polygonal surface without self-intersections which divides space into two complimentary spaces. The surface is space-filling. Plane-faced labyrinths are also called 'infinite polyhedra'.

Here three different classes of labyrinths are described. These will be termed Class I, Class II and Class III labyrinths. All three classes of labyrinths use cells from the nine types of subdivisions and are obtained from the space-fillings described in the last section by using different techniques.

18.1 Labyrinths, Class I

Labyrinths of Class I has a continuous space which connects the interior space of two adjacent cell-polyhedra through an opening. This opening can either be (i) an open-polygon (or an open face) lying on the plane of contact between the two adjacent cells, or (ii) an open-ended p-sided prism which connects two adjacent cells, or (iii) an open-ended p-sided antiprism which connects two adjacent cells. The connector prism is composed of p-sided polygons on the two ends joined by 4-sided polygonal sides and has the two ends open. The connector anti-prism is composed of p-sided polygons on the two ends in a rotated orientation with respect to one another and joined by triangular faces. These three types will be referred to as labyrinths of Class Ia, Ib and Ic, respectively.

The network defined by labyrinths of Class I is obtained by joining the centroids of the parent zonohedra or the derivative cell-polyhedra. The complementary space of the labyrinth can be visualized by connecting the interior space of two adjacent vertex-polyhedra of a space-filling and appropriately removing faces. The complimentary network is defined by the edges of the zonohedra and the space-filling. The labyrinth is a continuous surface that separates these two complimentary networks. The two networks superimposed define the "axes" of the space labyrinth.

Class Ia

Labyrinths of Class Ia are obtained by replacing each parent cell of a space-filling by an open-faced cell of Types B, E, F and Types G-I composed of digonal faces. Open-faced cells have selected open (or empty) faces which act as openings in the surface of a polyhedron. In this class, p-gonal faces, i.e. p-sided polygons which are co-planar with the parent zonohedral faces, are removed from each cell-polyhedron. Since the packing of parent cells is face-to-face, these co-planar p-gonal openings are shared with adjacent cells of in a space-filling such that the interior space of one cell continues to the other. When the entire space-filling is constructed from such open cells, a space labyrinth of Class 1a is obtained. All space-fillings composed of cells having 2-, 4-, or 8-sided polygons co-planar with the faces of the parent zonohedra can be converted into space labyrinths by this technique. For the nine types of subdivisions, p is restricted to values of 2, 4 and 8.

In previous figures only four examples (FIGS. 19C, 20D, 22B and 22D) were drawn with open faces thus showing the labyrinth. Other space-fillings can be similarly converted into labyrinths by converting all faces co-planar with the parent face into openings. (Note that in the following description and the associated figures, the face suffix """ has been dropped for brevity; this means that the geometric differences between the same type of faces is ignored for the purposes here).

In FIG. 19A, 453 can be converted into a periodic plane-faced labyrinth by removing faces 196a from the cell of Type E. 455 (FIG. 19C) is shown with 4-gonal faces 69a (p=4) open and is a portion of a periodic zig-zag plane-faced labyrinth composed of two different cells 108a and 108b of Type B. In 457 (FIG. 19E), the digonal faces 429 (p=2) must be made into openings to make a periodic curved space labyrinth.

Figure 20A:
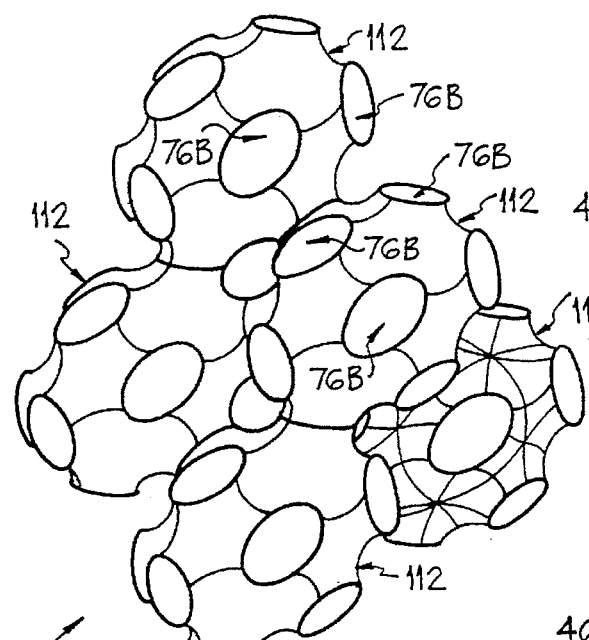
Figure 20B:
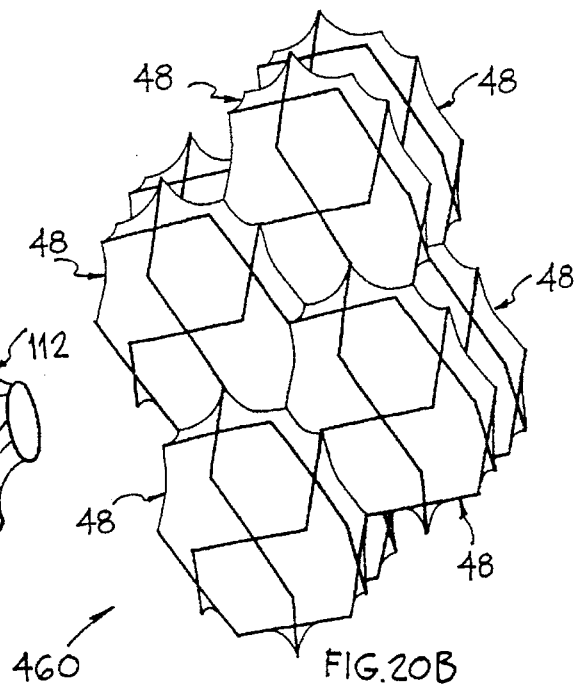
Figure 20C:
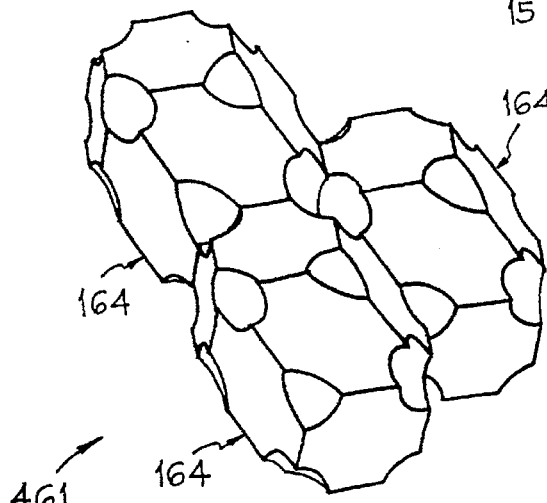
Figure 20D:
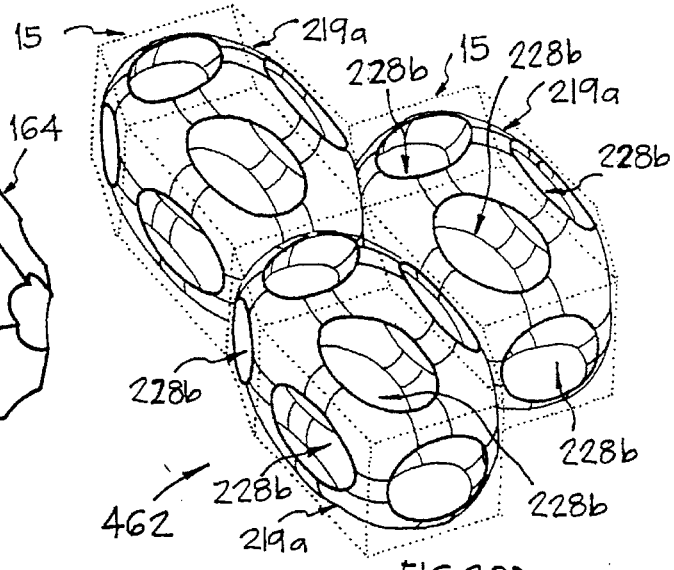
Figure 20E:
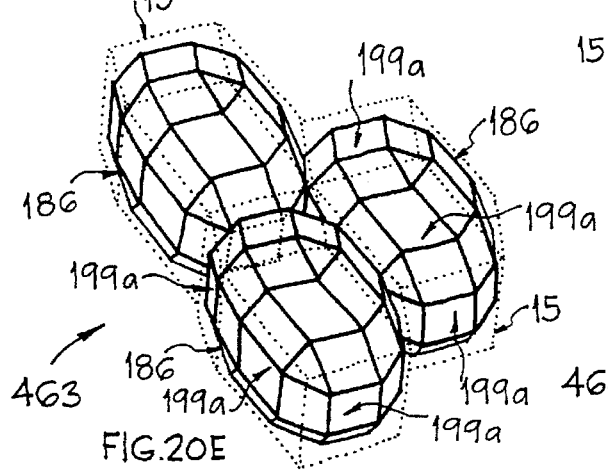
Figure 20F:
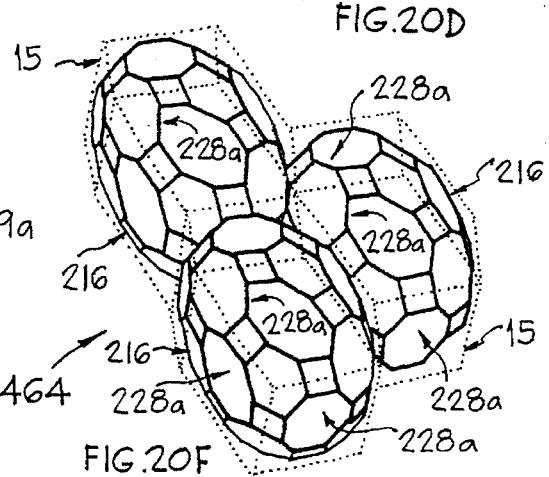
Figure 21A:
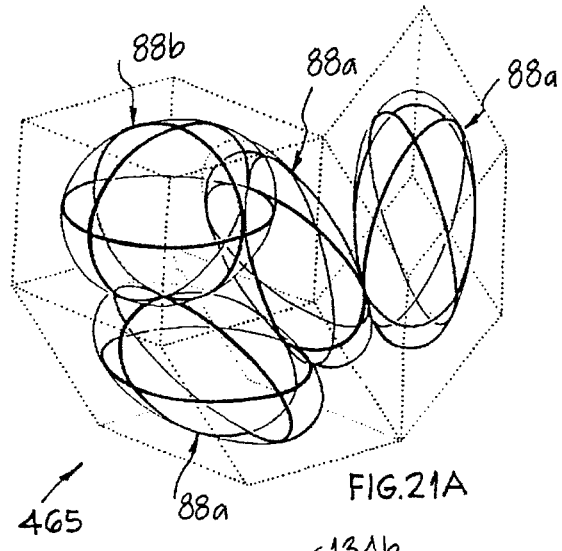
Figure 21B:
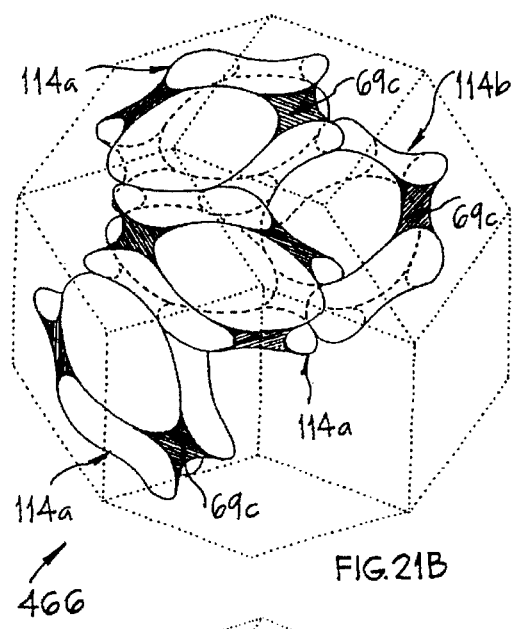
Figure 21C:
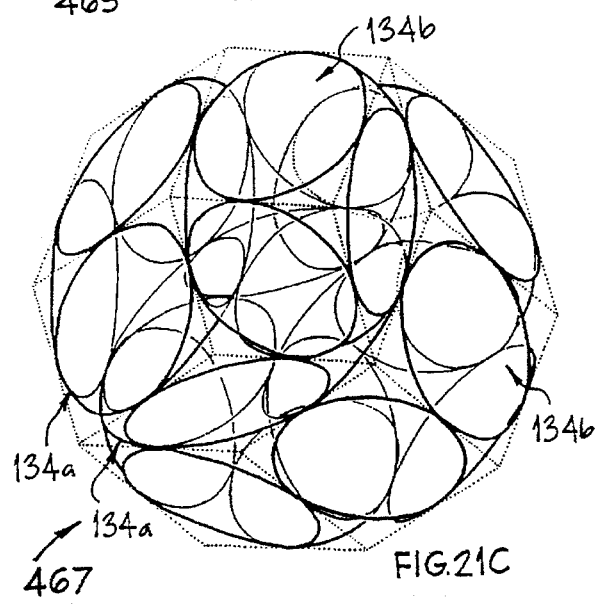
Figure 21D:
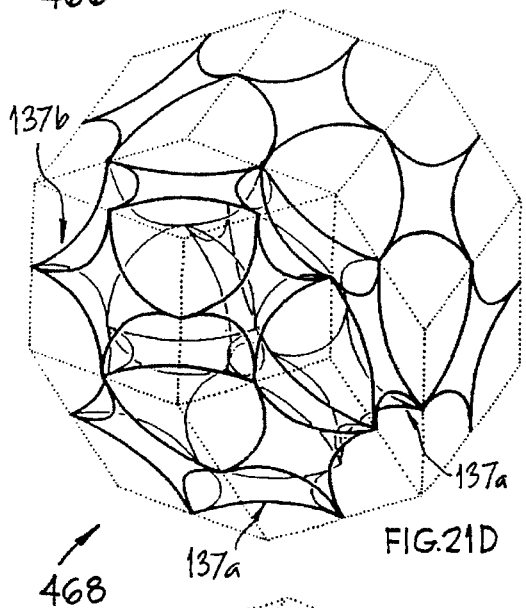
Figure 21E:
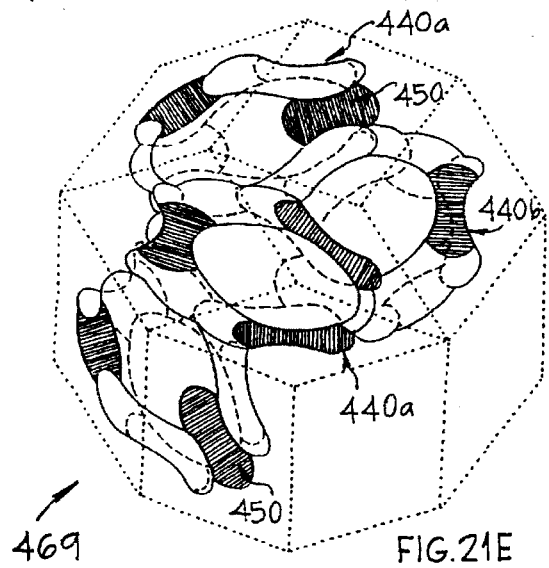
Figure 21F:
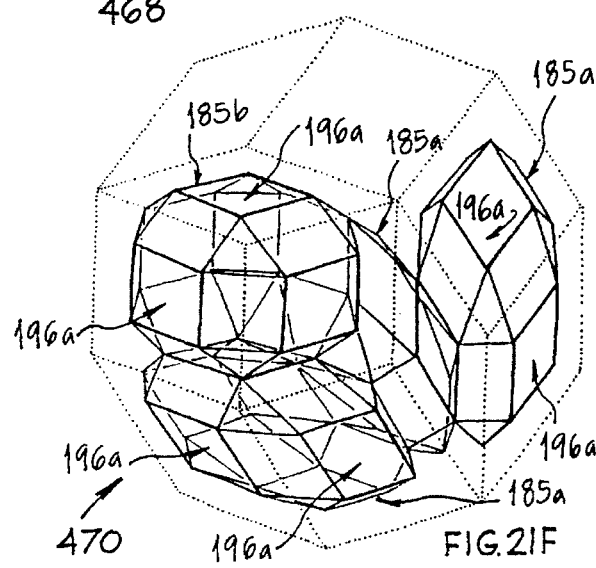
Figure 28A:
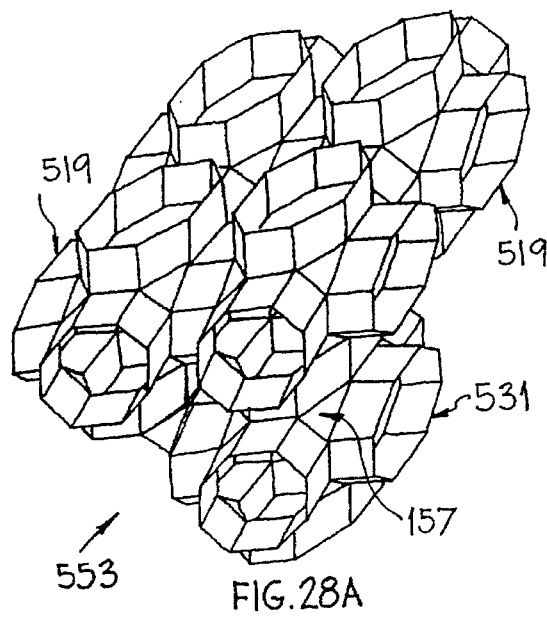
Figure 28D:
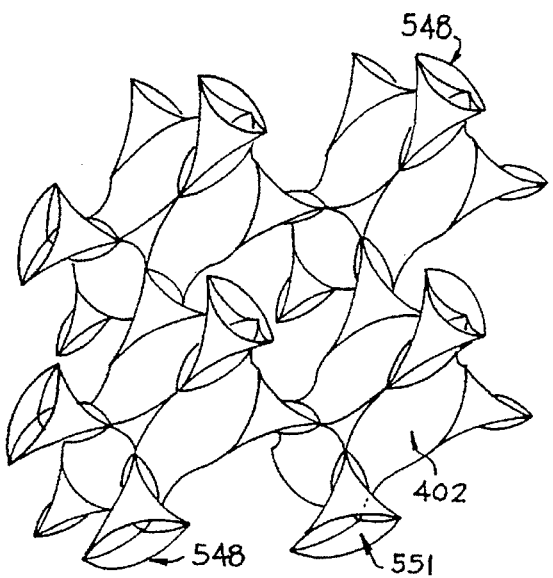
Figure 28B:
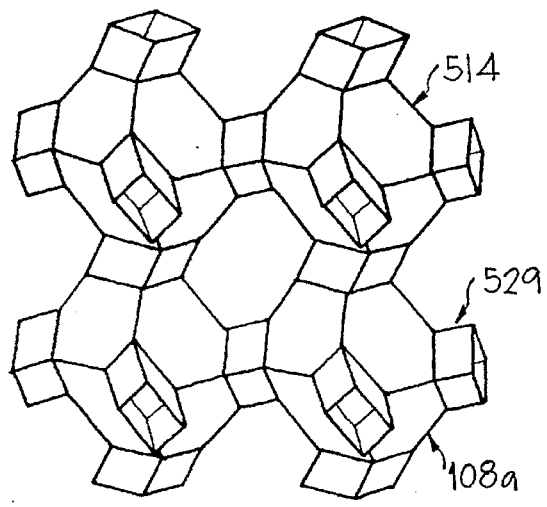
Figure 28C:
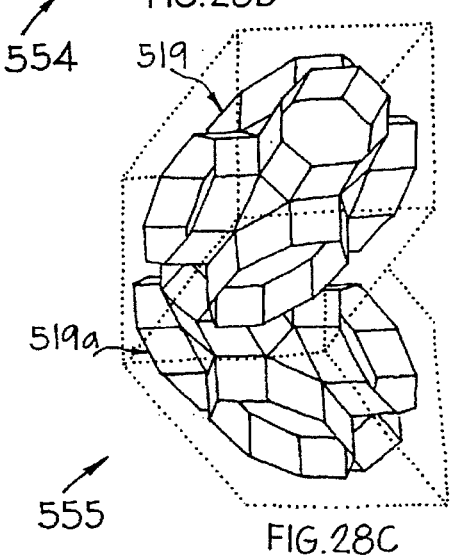
Figure 28E:
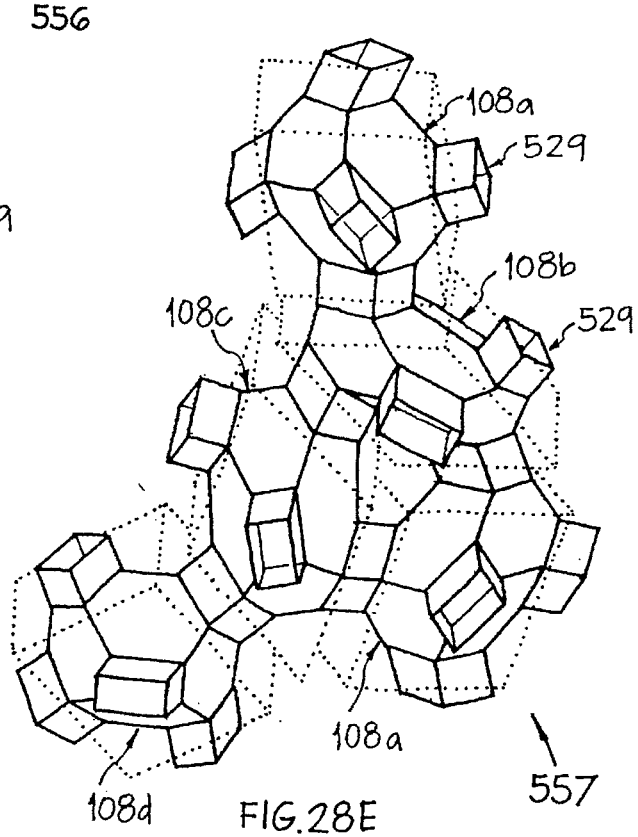

In FIG. 20A, 459 the 4-sided ellipses 76b (p=4) can be made into openings to make a periodic curved space labyrinth composed of n=4 cell-polyhedra 112 of Type B derived from a 4-zonohedron. In 462 (FIG. 20D), the open faces 228b are octagons (p=8). 462 is a portion of a curved space periodic labyrinth composed of n=4 cell polyhedra 219a of Type F. 464 (FIG. 20F), with faces 228a removed, is a plane-faced, straight-edged variant of 462. 463 (FIG. 20E) can be converted into a plane-face periodic labyrinth by removing faces 199a.

In FIGS. 21B and 21E, 466 and 469 are variants of one another. 466 can become a non-periodic curved space labyrinths when the shaded 4-sided faces 69c (p=4) of cells 114a,b of Type B are made into openings. Similarly, in 469, the faces 450 must be converted into openings. 470 (FIG. 21F), composed of cell-polyhedra of Type E, can become a labyrinth when the parallelogram faces 196a (p=4) become openings.

In FIG. 22B, 472, taken from the parent application, is a non-periodic curved space labyrinth composed of cells 57a–d of Type B. The open faces 69b are 4-sided ellipses (p=4). 473 (FIG. 22C) is a variant of 472 and is composed of cells 114c–f of Type B with open faces 69c. 474 (FIG. 22D), composed of cells 108a–d of Type B having open faces 69a, is also topologically identical to 472 and is an example of a plane-faced labyrinth.

In FIGS. 23C and 23D, 479 and 480 can be converted into labyrinths with digonal openings 422 and 429 (p=2), respectively. The honeycomb 481 (FIG. 23E) is an example of a single-layered planar labyrinth with open faces 485. The cells 484 and 484 are cells of a multi-layered labyrinth obtained from 481.

Class Ib

In labyrinths of Class Ib, the cell-polyhedra having p-gonal open faces are connected to adjacent cells by a p-gonal prism having open ends. Here too, p is restricted to values 2, 4 and 8, the connector prisms are digonal, 4-sided or 8-sided prisms, respectively, and each prism is attached to the corresponding p-gonal faces of the two adjacent cells.

An alternative way to describe the derivation of such labyrinths is shown in FIGS. 24A–M and is based on the concept described in the parent application. In 486 (FIG. 24A), the 3-zonohedron 14' is imploded to a zonohedron 498 of a similar shape but smaller size. It has all its six parallelogram faces (p=4) removed and is a completely open cell. In 487 (FIG. 24B), the procedure is applied to two adjacent cells 14' and 14" to generate th two imploded cells 498 and 500, both with all faces open. The two cells can be connected in two ways as shown in 488 and 489. In 488 (FIG. 24C), the connector piece is a "bent" tube 502 and consists of two smaller tubes joined on end, where each small tube is an open-ended 4-sided prism (p=4). The dotted parallelogram 501 is the area of contact on the common face. In 489 (FIG. 24D), the two cells are connected directly by an open-ended 4-sided prism 503. In 490 (FIG. 24E), the procedure is extended to three adjacent cells 14', 14" and 14'" that fit together. The new imploded cell 504 is connected to the other two through two additional open-ended prisms 505 and 506. Clearly the procedure can be continued as new cells are added. The resulting structure is a space labyrinth defined by a continuous surface composed of open-ended parallelopipeds meeting at the imploded parallelopipeds. The imploded parallelopipeds are "holes" in space connected by prisms.

In 491 (FIG. 24F), the six protruding open-ended parallelopipeds 507 (p=4 prism) protrude from the hollow center. The inclinations of the prism can be along the vectors joining the centroids of 14 to its six neighbours with each of which it shares one of its faces. Alternatively, the inclination can be along a new vector joining the mid-point of the face 487 to the mid-point of the corresponding face in the adjacent cell, as in 489. A variant would be have the inclination along a new vector direction. 492 (FIG. 24G) is a curved variant of 491.

493–494 (FIGS. 24H–I) and 496–498 (FIGS. 24K–M) show the extension of the concept to the n=4 and 5 cases, respectively, starting with the 4-zonohedron 15 and the 5-zonohedron 16. In 493 (FIGS. 24H), the imploded 4-zonohedron 508 is first generated. In 494 (FIG. 24I), the 4-gonal prismatic protrusions (p=4) are added, and in 495 (FIG. 24J), the protrusions are curved. The n=5 case has the corresponding protrusions 511a (FIG. 24L) and 512b (FIG. 24M) around the core 510. In both cases, when the protrusions are open-ended prisms and the core cell hollow as in the n=3 case, the cells can be connected to other cells to construct a labyrinth.

Instead of imploding zonohedra, any related polyhedron could be imploded within a parent zonohedron and the procedure of labyrinth generation continued. In FIGS. 25A—O, various n=3 derivative cells are shown with appropriate prisms attached on the open ends. The connector prisms on the opposite ends of the cells are shown collinear in all cases except one. When the connectors are collinear, the cells pack periodically to generate periodic labyrinths corresponding to a lattice of parallelopipeds 21. 513, 516, 519, 522 and 525 are examples of such cells shown here with connector prisms affixed.

513 (FIG. 25A) is composed of cell 108 of Type B with the 4-sided open-ended prisms 528 connected to its 4-sided open faces. The dotted line shows the parent parallelopiped within which 108 has imploded. 514 (FIG. 25B) is a variant of 513 with connectors 529 tilted at various angles to the faces of 108a. 515 (FIG. 25C) is a concave curved variant of 513. 516 (FIG. 25D) is composed of cell 131 of Type C and has 4-sided faces (p=4) open. It requires 4-sided prisms 530 (p=4) as connectors. 517 (FIG. 25E) and 518 (FIG. 25F) are convex aand concave curved variants of 516. 519 (FIG. 25G) is composed of cell 157 of Type D with octagonal faces (p=8) open and requires octagonal prisms 531 as connectors. 520 (FIG. 25H) is a curved variant with concave and convex edges. 522 (FIG. 25J) is composed of cell 185 of Type E with parallelogram faces (p=4) open and requires 4-sided prisms 532 as connectors. 523 (FIG. 25K) is a curved variant of 522. 525 (FIG. 25M) is composed of cell 215 of Type F with octagonal faces (p=8) open and requires octagonal prisms 533 as connectors. 526 (FIG. 25N) is its curved variant and has convex and concave edges. 521 (FIG. 25I) is composed of cell 398 of Type G with digonal faces (p=2) open and requires digonal prisms 534 as connectors. 524

(FIG. 25L) is composed of cell 402 of Type G with digonal faces (p=2) open and requires digonal prisms 535 as connectors. 527 (FIG. 25O) is composed of cell 405 of Type G with digonal faces (p=2) open and requires digonal prisms 536 as connectors.

FIGS. 26A–D show n=4 cell with p-gonal connectors affixed. 537 (FIG. 26A) is composed of cell 109 of Type B with 4-sided faces (p=4) open and requires 4-sided prisms 541 as connectors. 538 (FIG. 26B) is its curved variant. 539 (FIG. 26C) is composed of cell 216 of Type F with 8-sided faces 228 (p=8) open and requires 8-sided prisms 542. 540 (FIG. 26D) is its curved variant composed of straight and curved edges.

Class Ic

This class of labyrinths has p-sided anti-prismatic connectors. For the examples described here, the values of p are restricted to 2 and 4. Except in cells with digonal faces, anti-prisms are needed when two different types of cells are connected. Any combination of n=3 polyhedra can be used as a pair. The two cells occupy alternating positions in the labyrinth. Seven examples are shown in FIGS. 27A–G. Note that the examples are shown with varying size polyhedra. Polyhedral cells composed of a few restricted lengths would be useful to make the cells inter-changeable.

543 (FIG. 27A) is composed of alternating cells 108 of Type B and 185 of Type E. Both have their 4-sided polygonal faces (p=4) open and require 4-sided anti-prisms 550 (p=4) as connectors. 544 (FIG. 27B) is composed of cells 131 of Type C and 185 of Type E connected by the anti-prism 550. 546 (FIG. 27D) is composed of cells 108 of Type B and 131 of Type C connected by a 4-sided prism 528 (p=4). 545 (FIG. 27C) is composed of cells 157 of Type D and 215 of Type F with octagonal faces (p=8) open and connected by the octagonal prism 533 (p=8). 547 (FIG. 27E) is composes of cells 14a, a parent 3-zonohedron, and 131 of Type C connected by the anti-prism 550. 548 (FIG. 27F) shows the cell 402 with digonal (p=2) anti-prisms 551 through which it can connect to another 402. 549 (FIG. 27G) shows the cell 410 with one digonal anti-prism 552 affixed to one of its digons. This anti-prism is twisted.

FIGS. 28A–E show a few examples of labyrinths of Class 1. 553 (FIG. 28A) is a periodic plane-faced labyrinth composed of units 519. The connector prisms line up in example. 554 (FIG. 28B) is a portion of a layer from a periodic labyrinth composed of units 514. In this example, the connectors are arranged in a zig-zag manner. 555 (FIG. 28C) shown two units of the type 519. The connector piece is a bent octagonal prism and can be replaced by a straight piece joining the open octagonal faces of the two cell directly. 556 (FIG. 28D) is a portion of a periodic curved space labyrinth composed of units like 548 of Type H, which have digonal faces as openings. The connectors are digonal anti-prisms 551. 557 (FIG. 28E) is a portion of a non-periodic labyrinth composed of units like 514. It is derived from 474 (of FIG. 22D) by inserting the connectors 529 between adjacent cells.

18.2 Labyrinths, Class II

Labyrinths of Class II are obtained by connecting the interior space between the cell-polyhedra and the vertex-polyhedra. This makes one network which can be visualized by connecting the centroid of each parent zonohedron to its vertices. The complimentary network is obtained by joining the center of the faces to the mid-points of the edges of parent zonohedra. The surface separating these two networks is a labyrinth of Class II. The opening between a cell-polyhedron and a vertex-polyhedron can be (i) an open q-sided or 2q-sided polygon, (ii) an open-ended q- or 2q-sided prism with its q-sided or 2q-sided faces open, (iii) a q-sided anti-prism. In the n=3 case, q=3. All examples shown here are withn=3 cell-polyhedra. In higher values of n, the several types of connectors can be used. Or, two different labyrinths can be derived by taking the alternating set of vertices; n=4 is an interesting example.

In the examples in the next three sets of figures, various n=3 cell polyhedra with their connectors are shown. In n=3 case, the vertex-polyhedra and cell-polyhedra reciprocate. Thus all examples shown are also vertex-polyehdra. From these examples, affine and non-regular counterparts of the known regular-faced infinite polyhedra can be obtained.

In FIGS. 29A–M, 558 (FIG. 29A) shows the cell 108, a non-regular truncated octahedron, with hexagonal connectors 521. 559 (FIG. 29B) is its curved variant. 560 (FIG. 29C) shows the cell 131, a non-regular cuboctahedron, with triangular anti-prismatic connectors 572. 561 (FIG. 29D) is its curved variant. 562 (FIG. 29E) shows the cell 157, a non-regular truncated cube, with triangular anti-prismatic connectors 573. 563 (FIG. 29F) is its curved variant. 564 (FIG. 29G) and 565 (FIG. 29H) are stretched variants of 562, and 566 (FIG. 29I) has connectors of varying sizes. 567 (FIG. 29J) shows the cell 185, a non-regular rhombicuboctahedron, with triangular anti-prismatic connectors 574. 568 (FIG. 29K) is its curved variant. 569 (FIG. 29L) shows the cells 215, a non-regular truncated cuboctahedron, with hexagonal connectors 575. 570 (FIG. 29M) is its curved variant.

In FIGS. 30–F, 576 (FIG. 30A) shows the cell 282, a non-regular octahedron, with triangular anti-prismatic connectors 582. 577 (FIG. 30B) shows the cell 314, a non-regular icosahedron, with triangular anti-prismatic connectors 574. 578 (FIG. 30C) is the same as 577 with only four of the eight connectors. 579 (FIG. 30D) shows the cell 280, a non-regular truncated tetrahedron, with hexagonal connectors 584. 580 (FIG. 30E) shows the cell 250, a non-regular tetrahedron, with triangular anti-prismatic connectors 585. 581 (FIG. 30F) shows the cell 85, a non-regular octahedron, with triangular anti-prismatic connectors 586.

FIGS. 31A–F show six examples of cell-polyhedra (or vertex-polyehdra in n=3 space-filling) for labyrinths which use two types of cell-polyhedra. All the connectors here are triangular prisms. 587 (FIG. 31A) shows the tetrahedron 250 with connectors 593, 588 (FIG. 31B) shows the octahedron 85 with connectors 594, 589 (FIG. 31C) shows the truncated tetrahedron 283 with connectors 595, 590 (FIG. 31D) is the cuboctahedron with connectors 594, 591 (FIG. 31E) is the truncated cube with connectors 597, and 592 (FIG. 31F) is the rhombicuboctahedron 185 with connectors 597. All the polyhedra shown here are non-regular and thus different from the known infinite polyhedra.

FIGS. 32A–F shows some examples of how these cell-polyhedra are joined to others. 599 (FIG. 32A) connects two truncated tetrahedra with anti-prisms 582. This particular configuration, when extended will produce a non-regular diamond lattice. 600 (FIG. 32B) connects truncated cubes with triangular prisms in a non-regular body-centered periodic array. 601–604 (FIGS. 32C–F) are examples with two different polyhedra aa marked. These can be infinitely extended in a manner analgous to the non-regular diamond lattice or a non-regular body-centred cubic lattice. These examples are sufficient to show the scope of the invention and other examples can be derived in a similar way.

19. Nodes and Strut Systems for Space Frames

All examples of periodic and non-periodic space-fillings shown in this application can be converted into space frames by using the cell-polyhedra of the nine types of subdivision, and their variants, as nodes, and stretching the connector polyhedra of previous seven groups of figures into struts. FIGS. 33A,B show two examples. 605 (FIG. 33A) is derived from 599 by stretching 582 into a strut 582a which connects the nodes 280 and 283. 606 (FIG. 33B) is derived from 604 by stretching 595 into a triangular-prismatic strut 595a which connects two different nodes 283 and 253. Other examples can be similarly derived. The method applies to all examples shown here.

I claim:

1. A polyhedral building system comprising:

a plurality of polyhedral structures connected to each other, each said structure having a plurality of vertices, edges and faces, wherein said vertices, edges and faces are joined to one another by attachment means, said faces comprise a first set and a second set of polygonal faces, wherein at least one said face in either said set is a non-regular polygon, wherein said first set comprises 4-sided polygons, said second set comprises even-sided polygons having at least six sides, wherein each said polygon of said first set shares each edge with one of said polygon of said second set, each said polygon of said second set shares alternating edges with one of said polygon of said first set and one of said polygon of said second set, and wherein said plurality of said polyhedral structures comprises at least one said structure having more than six said faces belonging to said first set.

2. A polyhedral building system as per claim 1, wherein the said plurality of said structures includes periodic configurations.

3. A polyhedral building system as per claim 1, wherein the said plurality of said structures includes non-periodic configurations.

4. A polyhedral building system comprising:

a plurality of polyhedral structures connected to each other, each said structure having a plurality of vertices, edges and faces, wherein said vertices, edges and faces are joined to one another by attachment means, said faces comprise a first set and a second set of polygonal faces, wherein at least one said face in either said set is a non-regular polygon, wherein said first set comprises six 4-sided polygons, said second set comprises eight 6-sided polygons, wherein each said polygon of said first set shares each edge with one of said polygon of said second set, each said polygon of said second set shares alternating edges with one of said polygon of said first set and one of said polygon of said second set, and said plurality of said polyhedral structures makes non-periodic configurations.

5. A polyhedral building system as per claims 1 or 4 in which said plurality of said structures includes layered configurations composed of one or more layers.

6. A polyhedral building system as per claims 1 or 4, wherein the said plurality includes configurations which are periodic in one direction and non-periodic in another.

7. A polyhedral building system as per claims 1 or 4 in which said plurality of said structures includes multi-directional configurations without layers.

8. A polyhedral building system as per claims 1 or 4 in which said plurality of said structures defines a space labyrinth wherein said first set of faces are openings.

9. A polyhedral building system as per claim 8, wherein said plurality of said structures defines a space labyrinth wherein said first set of faces of adjacent said structures are spaced apart and connected by additional four faces, each said additional face joining one said edge of one said face of said first set to a corresponding said edge of adjacent said face of said first set of faces of adjacent said structure.

10. A polyhedral building system comprising:

a polyhedral structure having a plurality of vertices, edges and faces, wherein said vertices, edges and faces are joined to one another by attachment means, said faces comprise a first set and a second set of polygonal faces, wherein at least one said face in either said set is a non-regular polygon, wherein said first set comprises more than six 4-sided polygons, said second set comprises even-sided polygons having at least six sides, wherein each said polygon of said first set shares each edge with one of said polygon of said second set, and each said polygon of said second set shares alternating edges with one of said polygon of said first set and one of said polygon of said second set.

11. A polyhedral building system as per claims 1, 4 or 10 in which said edges of said structure are straight.

12. A polyhedral building system as per claims 1, 4 and 10 in which said faces of said structure are flat planar faces.

13. A polyhedral building system as per claims 1, 4 or 10 in which said edges are curved, and wherein said curved edges are convex or concave.

14. A polyhedral building system as per claims 1, 4 or 10 in which said edges are combinations of straight and curved edges.

15. A polyhedral building system as per claims 1, 4 or 10 in which said faces of said structure are curved non-planar polygons, and wherein said curved faces include saddle-shaped polygons.

16. A polyhedral building system as per claims 1, 4 or 10 in which said faces of said structure are curved non-planar polygons.

* * * * *